United States Patent
Etzelsberger et al.

(10) Patent No.: US 9,873,476 B2
(45) Date of Patent: Jan. 23, 2018

(54) FOLDABLE ELECTRIC VEHICLE

(71) Applicant: URBAN626, LLC, Pasadena, CA (US)

(72) Inventors: Sven Etzelsberger, Pasadena, CA (US); Grant Delgatty, Pasadena, CA (US)

(73) Assignee: URBAN626, LLC, Pasadena, CA (US)

( * ) Notice: Subject to any disclaimer, the term of this patent is extended or adjusted under 35 U.S.C. 154(b) by 0 days.

(21) Appl. No.: 15/169,474

(22) Filed: May 31, 2016

(65) Prior Publication Data
US 2016/0347397 A1 Dec. 1, 2016

Related U.S. Application Data

(60) Provisional application No. 62/168,663, filed on May 29, 2015, provisional application No. 62/233,147, (Continued)

(51) Int. Cl.
*B62K 15/00* (2006.01)
*B60K 1/00* (2006.01)
(Continued)

(52) U.S. Cl.
CPC .............. *B62K 15/006* (2013.01); *B60K 1/00* (2013.01); *B62H 1/12* (2013.01); *B62J 1/04* (2013.01); *B62J 9/001* (2013.01); *B62K 5/06* (2013.01); *B62K 19/02* (2013.01); *B62K 2015/003* (2013.01); *B62K 2204/00* (2013.01)

(58) Field of Classification Search
None
See application file for complete search history.

(56) References Cited

U.S. PATENT DOCUMENTS 1,359,329 A * 11/1920 Carson ..................... B62J 9/003
220/485
2,135,257 A 11/1938 Manton
(Continued)

FOREIGN PATENT DOCUMENTS

| CN | 3232356 D | 4/2002 |
|---|---|---|
| CN | 3346886 D | 4/2004 |

(Continued)

OTHER PUBLICATIONS

International Search Report and Written Opinion for International Application No. PCT/US2016/035093, Search completed Jul. 26, 2016, dated Aug. 25, 2016, 8 Pgs.
(Continued)

*Primary Examiner* — Nicole T Verley
(74) *Attorney, Agent, or Firm* — KPPB LLP

(57) ABSTRACT

Foldable electrical vehicles and related charging infrastructure are described. The foldable electrical vehicle generally includes three structural members (front and rear wheel-bearing structural members and a seat-bearing structural member) that are pivotally interconnected along their lengths such that they may be pivoted between a closed position wherein the three structural members are disposed roughly parallel to each other in a compact folded configuration, and an open riding configuration wherein an angular relation is formed between the structural members. The rear wheel-bearing structural member may comprise one or more foldable wheels pivotably interconnected thereto.

8 Claims, 44 Drawing Sheets

Related U.S. Application Data filed on Sep. 25, 2015, provisional application No. 62/244,064, filed on Oct. 20, 2015.

(51) Int. Cl.
| | | |
|---|---|---|
| *B62J 1/04* | (2006.01) | |
| *B62H 1/12* | (2006.01) | |
| *B62J 9/00* | (2006.01) | |
| *B62K 5/06* | (2006.01) | |
| *B62K 19/02* | (2006.01) | |

(56) References Cited

U.S. PATENT DOCUMENTS

| | | | |
|---|---|---|---|
| 3,486,765 A | 12/1969 | Turner | |
| 3,695,496 A * | 10/1972 | Humlong | B62J 9/003 224/420 |
| 4,067,589 A * | 1/1978 | Hon | B62K 15/006 280/278 |
| 4,282,993 A * | 8/1981 | Humlong | B62J 9/003 224/425 |
| 4,598,923 A | 7/1986 | Csizmadia et al. | |
| 4,653,767 A | 3/1987 | Gajewski | |
| D338,433 S | 8/1993 | Crooks, Sr. | |
| D457,197 S | 5/2002 | Arie | |
| D464,379 S | 10/2002 | Lin | |
| D466,839 S | 12/2002 | Ou | |
| 6,588,787 B2 | 7/2003 | Ou | |
| D483,821 S | 12/2003 | Yang | |
| D487,908 S | 3/2004 | Mayer et al. | |
| D503,362 S | 3/2005 | Zhu et al. | |
| D511,719 S | 11/2005 | Chung | |
| D513,629 S | 1/2006 | Sramek | |
| D513,772 S | 1/2006 | Otis et al. | |
| 6,986,522 B2 | 1/2006 | Sinclair et al. | |
| D522,076 S | 5/2006 | Casey | |
| D586,265 S | 2/2009 | Lin et al. | |
| D641,667 S | 7/2011 | Ryan et al. | |
| D650,724 S | 12/2011 | Chiang | |
| D654,403 S | 2/2012 | Kyu | |
| D668,586 S | 10/2012 | Golias et al. | |
| 8,376,383 B1 * | 2/2013 | Lee | B62J 7/06 280/288.4 |
| D695,156 S * | 12/2013 | Jessie | D12/117 |
| D726,592 S | 4/2015 | Zhang | |
| D735,812 S | 8/2015 | Delgatty | |
| D735,813 S | 8/2015 | Delgatty | |
| 9,205,889 B2 | 12/2015 | Paick | |
| D746,924 S | 1/2016 | Delgatty | |
| 9,227,687 B2 * | 1/2016 | Delgatty | B62K 5/06 |
| D750,711 S | 3/2016 | Delgatty | |
| 9,283,848 B2 | 3/2016 | Parienti | |
| D767,469 S * | 9/2016 | Liu | D12/407 |
| 9,440,699 B1 * | 9/2016 | Wittorf | B62K 15/006 |
| D774,979 S | 12/2016 | Delgatty et al. | |
| 9,694,868 B2 | 7/2017 | Delgatty et al. | |
| 2003/0051934 A1 | 3/2003 | Ou et al. | |
| 2004/0026147 A1 | 2/2004 | Kao et al. | |
| 2005/0035570 A1 | 2/2005 | Chu | |
| 2006/0243507 A1 | 11/2006 | Huber | |
| 2007/0258758 A1 * | 11/2007 | Ho | F16B 2/10 403/398 |
| 2008/0061528 A1 | 3/2008 | Musabi et al. | |
| 2008/0217085 A1 | 9/2008 | Wernli et al. | |
| 2008/0224441 A1 * | 9/2008 | Lu | B62K 15/006 280/278 |
| 2009/0240858 A1 | 9/2009 | Takebayashi et al. | |
| 2009/0289434 A1 | 11/2009 | Lin | |
| 2010/0006721 A1 * | 1/2010 | Lien | B62J 9/001 248/201 |
| 2010/0224662 A1 * | 9/2010 | Crum, Jr. | B62J 7/04 224/419 |
| 2010/0295264 A1 * | 11/2010 | Denais | B60C 7/10 280/260 |
| 2010/0320717 A1 | 12/2010 | Huang | |
| 2011/0193313 A1 | 8/2011 | Yun | |
| 2012/0043148 A1 | 2/2012 | Brady et al. | |
| 2012/0152993 A1 * | 6/2012 | Chen | B62J 9/00 224/419 |
| 2012/0273287 A1 | 11/2012 | Song et al. | |
| 2014/0225348 A1 * | 8/2014 | Wu | B62K 15/008 280/278 |
| 2014/0326525 A1 | 11/2014 | Doerksen | |
| 2015/0068828 A1 * | 3/2015 | Delgatty | B62K 5/06 180/210 |
| 2015/0321722 A1 * | 11/2015 | Dadoosh | B62K 3/002 180/208 |
| 2016/0083039 A1 | 3/2016 | Delgatty et al. | |
| 2017/0259871 A1 | 9/2017 | Delgatty et al. | |

FOREIGN PATENT DOCUMENTS

| | | | |
|---|---|---|---|
| CN | 3377320 D | 7/2004 | |
| CN | 300832206 D | 9/2008 | |
| CN | 302232853 S | 12/2012 | |
| CN | 302709415 S | 1/2014 | |
| CN | 302729747 S | 2/2014 | |
| CN | 105416481 A | 3/2016 | |
| CN | 105722752 A | 6/2016 | |
| DE | 19516763 A1 | 11/1996 | |
| EP | 3063056 A1 | 9/2016 | |
| FR | 1249891 A | 1/1961 | |
| GB | 2427392 B | 7/2007 | |
| JP | 04358984 A * | 12/1992 | |
| JP | 07052857 A * | 2/1995 | B62J 9/003 |
| JP | 1155291 D | 10/2002 | |
| KR | 30358808 | 8/2004 | |
| WO | 9801334 A1 | 1/1998 | |
| WO | 2011098887 A1 | 8/2011 | |
| WO | 2015038674 A1 | 3/2015 | |
| WO | 2016045318 A1 | 3/2016 | |
| WO | 2016196510 A1 | 12/2016 | |

OTHER PUBLICATIONS

Extended European Search Report for European Application No. 14843829.4, Search completed Mar. 9, 2017, dated Mar. 16, 2017, 10 Pgs.

International Preliminary Report on Patentability for International Application PCT/US2014/055033, Report issued Mar. 15, 2016, dated Mar. 24, 2016, 5 Pgs.

International Search Report and Written Opinion for International Application PCT/US2014/055033, Report Completed Nov. 16, 2014, dated Dec. 19, 2014.

"ILY-A", Ars Electronica 2015, Sep. 7, 2015, Retrieved from the Internet URL:http://www.aec.at/postcity/en/ily-a/ on Jul. 8, 2016.

Crook, "Urb-E, the Fold-Up Electric Scooter, Goes Live on Indiegogo", Feb. 10, 2014, Retrieved from the Internet URL: https://techcrunch.com/2014/02/10/urb-e-the-fold-up-electric-scooter-goes-live-on-indiegogo/ on Apr. 30, 2017.

Mok, Kimberley, "Halfbike: Upright simplified bike combines biking with jogging (Video)", Tree Hugger, Mar. 21, 2014, Retrieved from the Internet URL: http://www.treehuggercom/bikes/halfbike-kolelinia-upright-simplified-bike-combines-biking-with-jogging.html on Jul. 8, 2016.

Prigg, "Is this the future of commuting? Worlds smallest e-vehicle revealed—and it is controlled by an app", Daily Mail, Feb. 25, 2014, Retrieved from the Internet <URL: http://www.dailymail.co.uk/sciencetech/article-2567972/Is-future-commuting-Worlds-smallest-e-vehicle-revealed-controlled-app.html on Jul. 8, 2016.

Seth, Radhika, "Get a Jiffy Ride", YD—Yanko Design, Feb. 9, 2010, Retrieved from the Internet URL: http://www.yankodesign.com/2010/02/09/get-a-jiffy-ride/ on Jul. 8, 2016.

International Search Report and Written Opinion for International Application No. PCT/US2017/043175, Search completed Sep. 10, 2017, dated Sep. 28, 2017, 14 Pgs.

\* cited by examiner

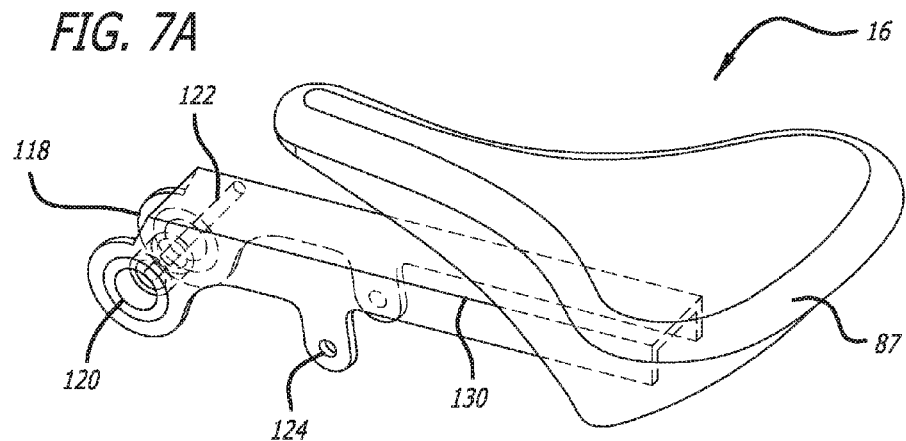
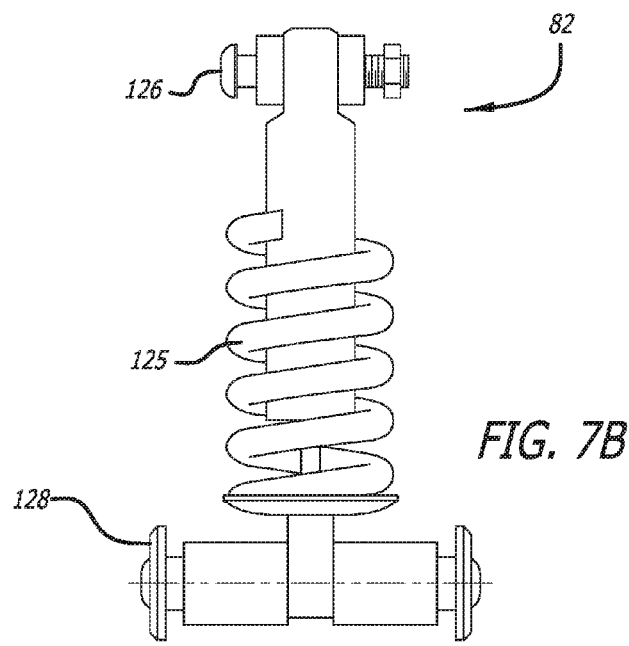

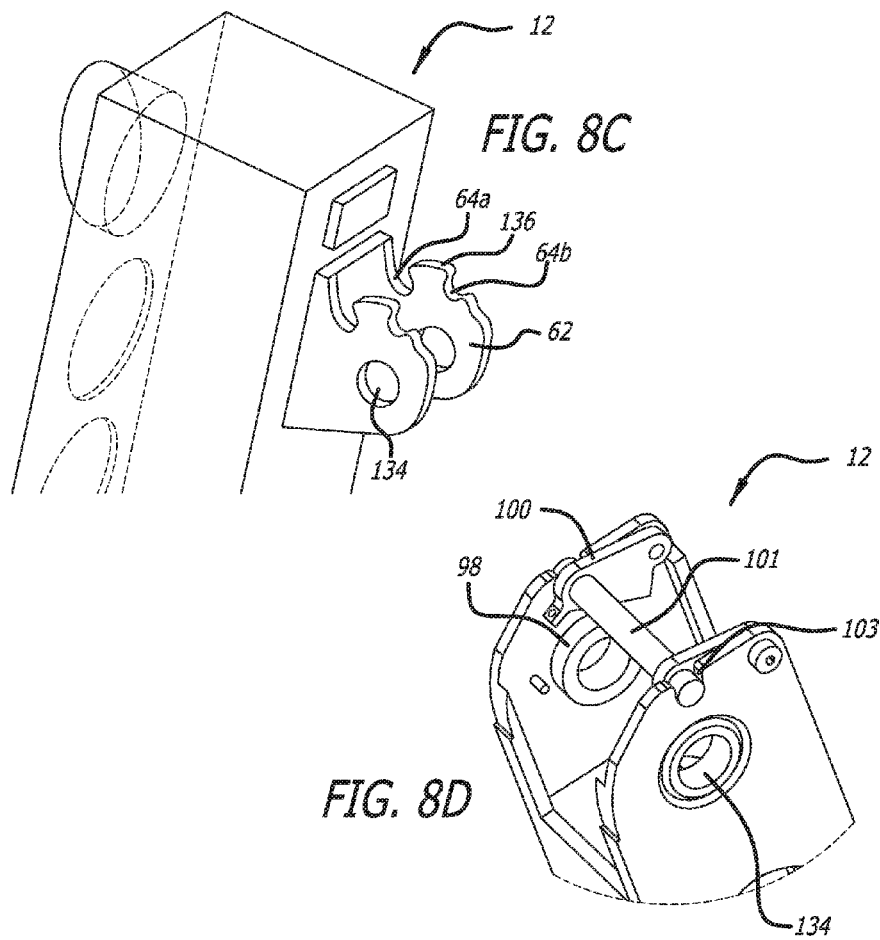
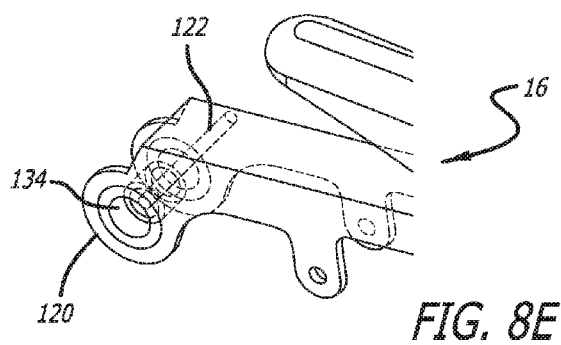

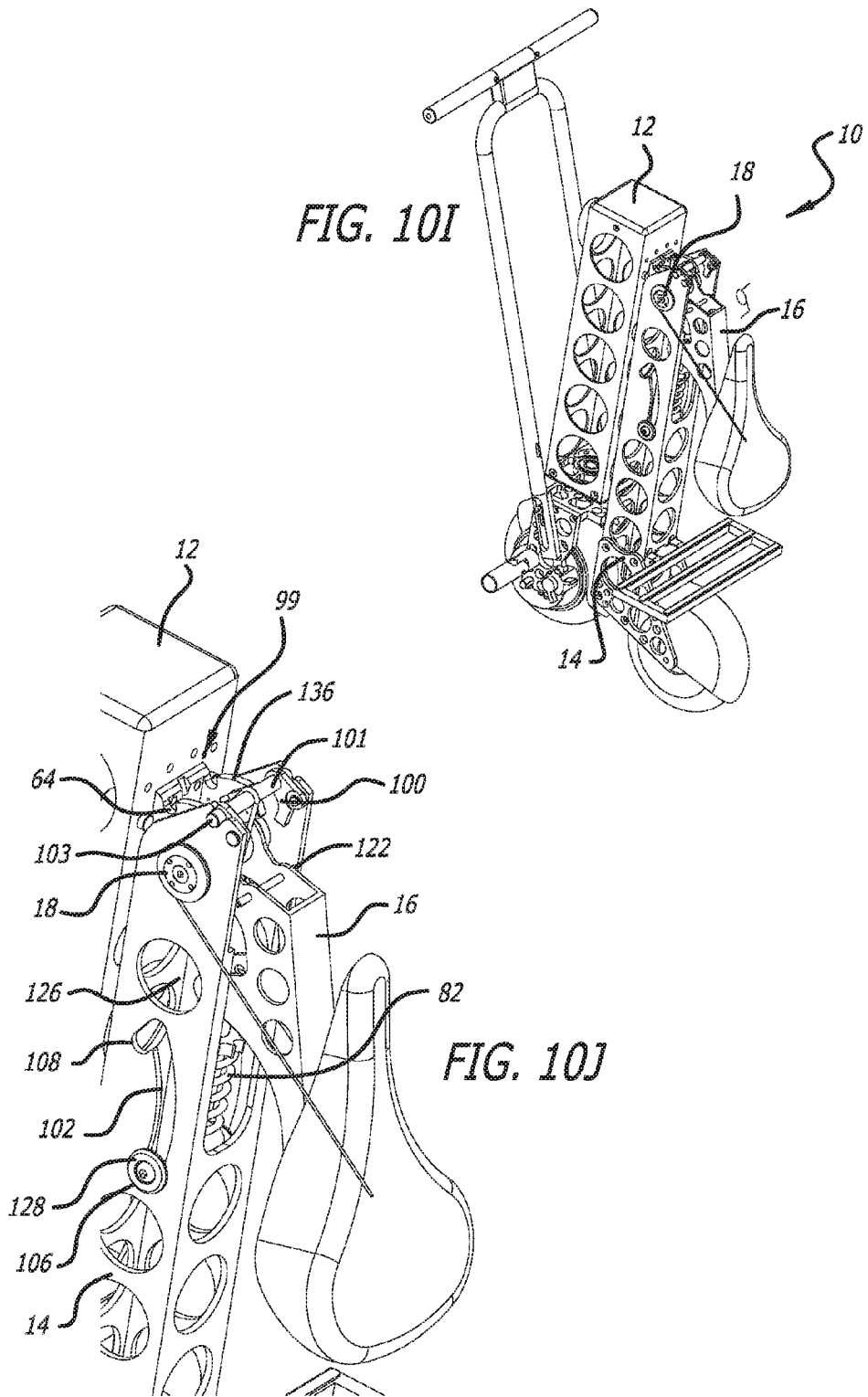

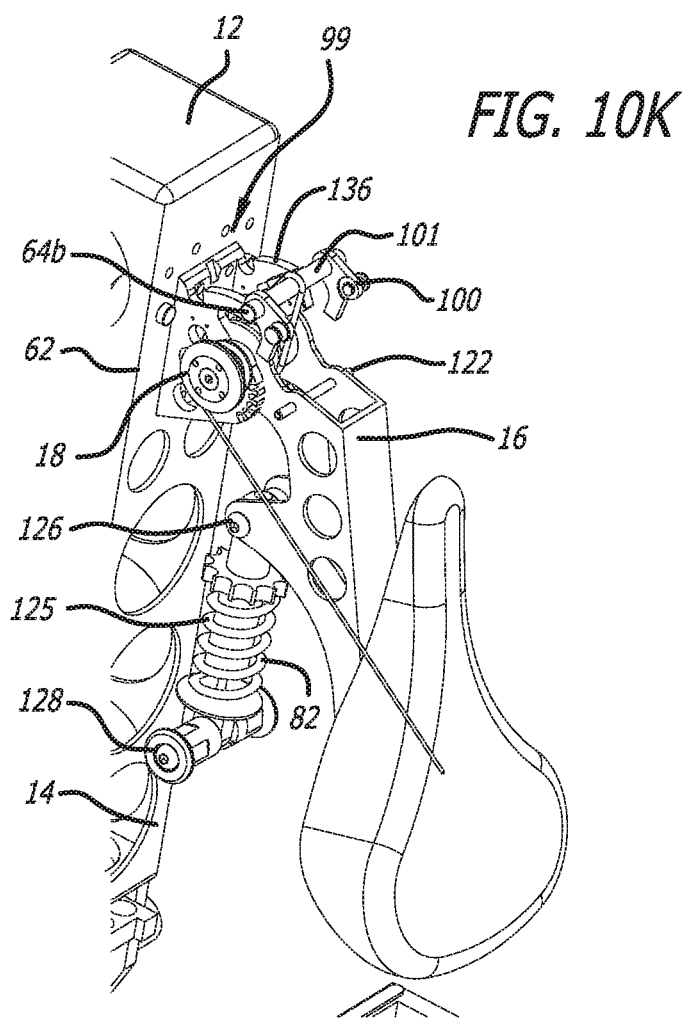

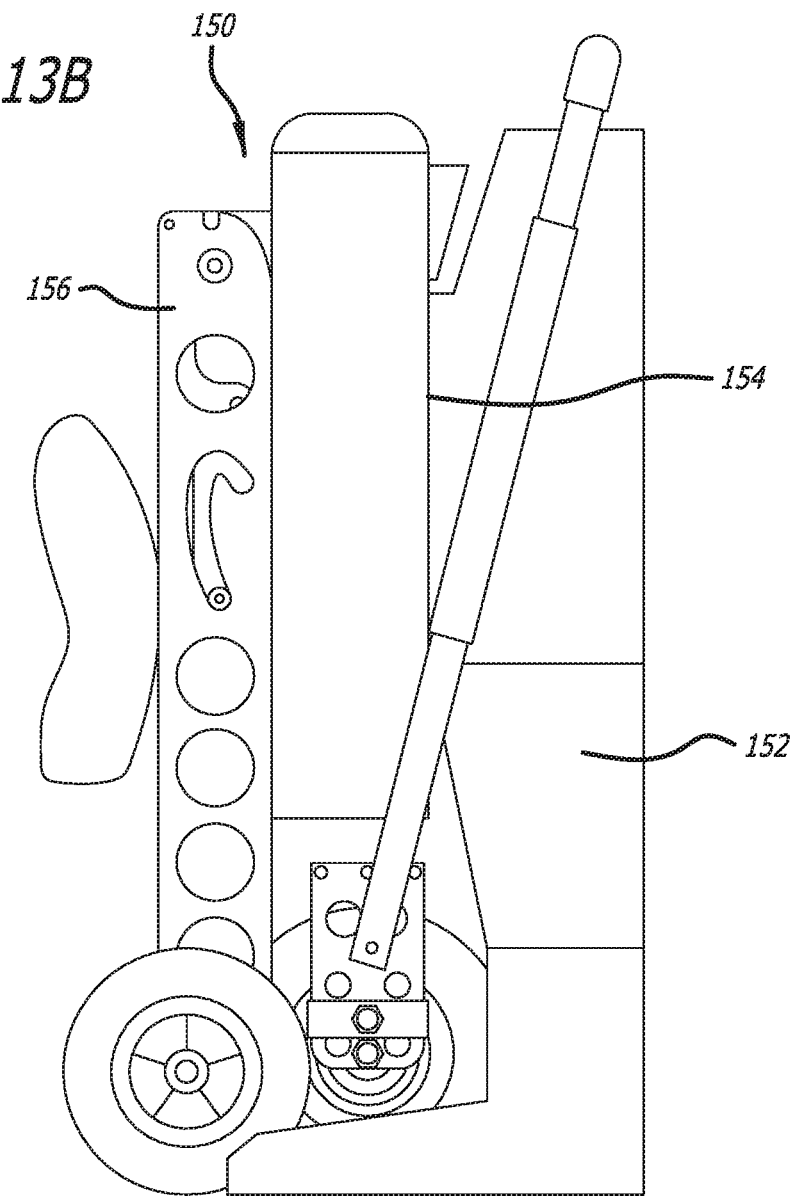

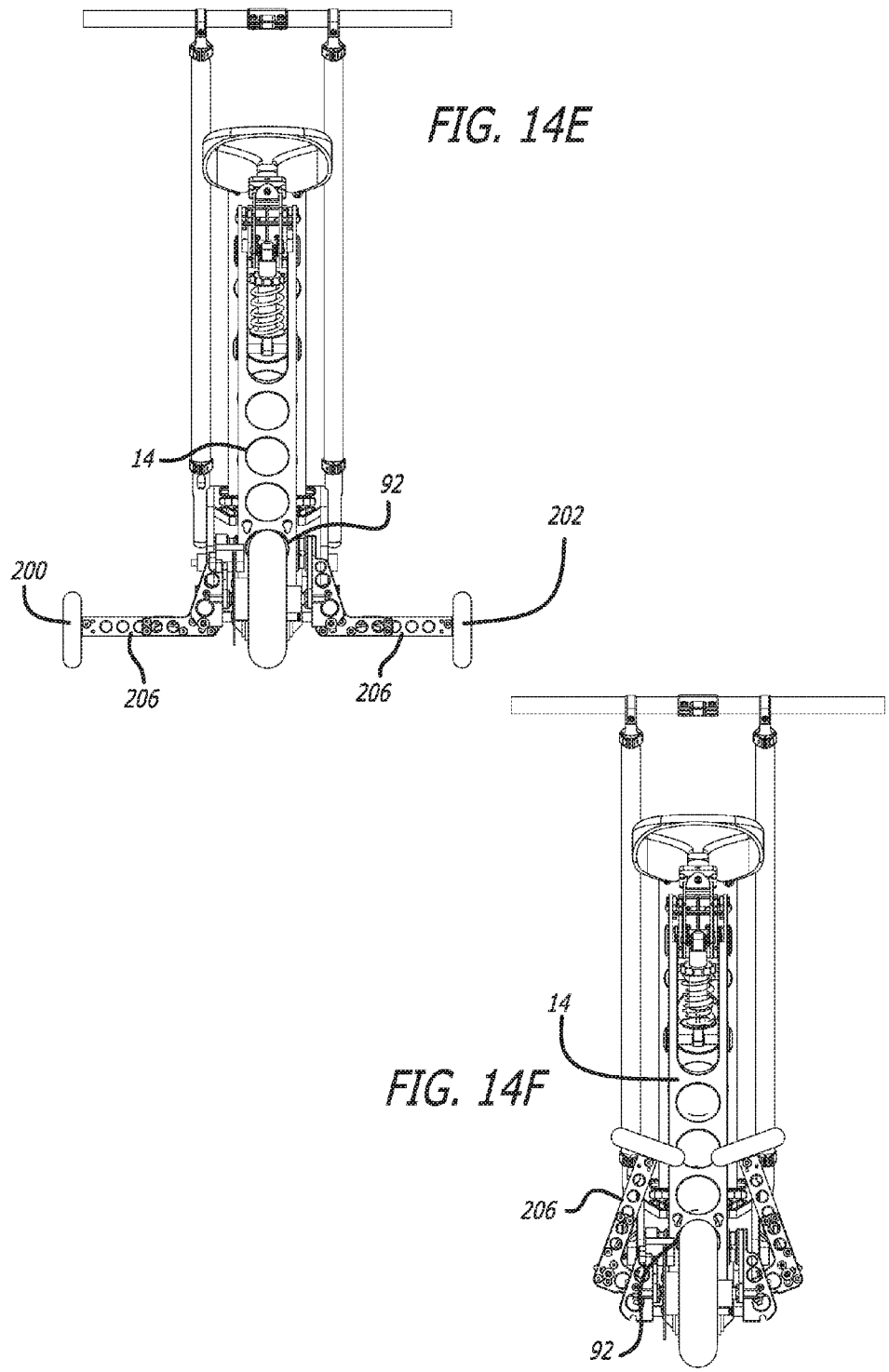

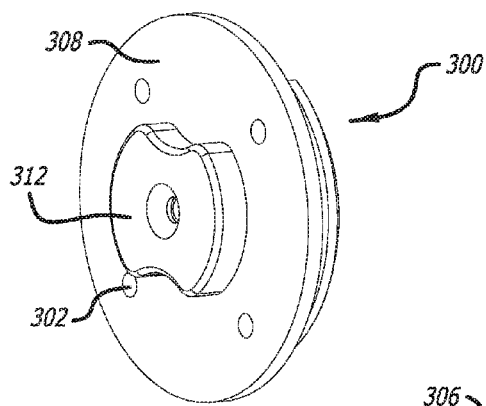
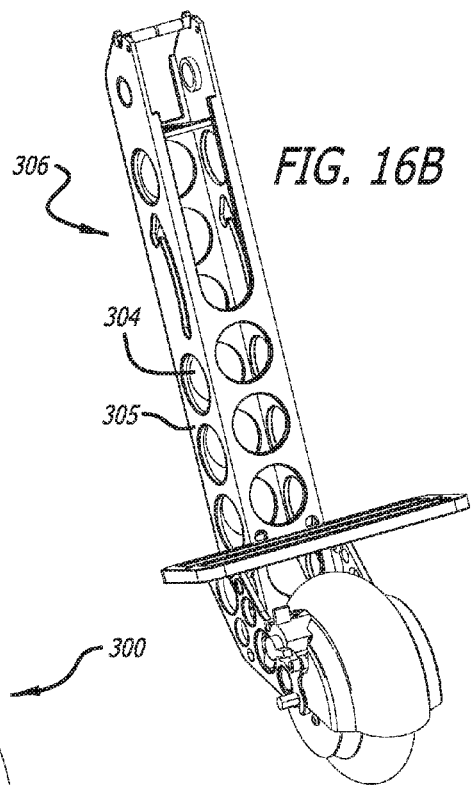
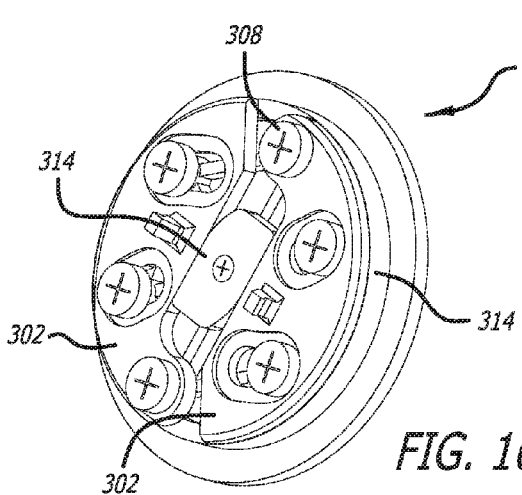

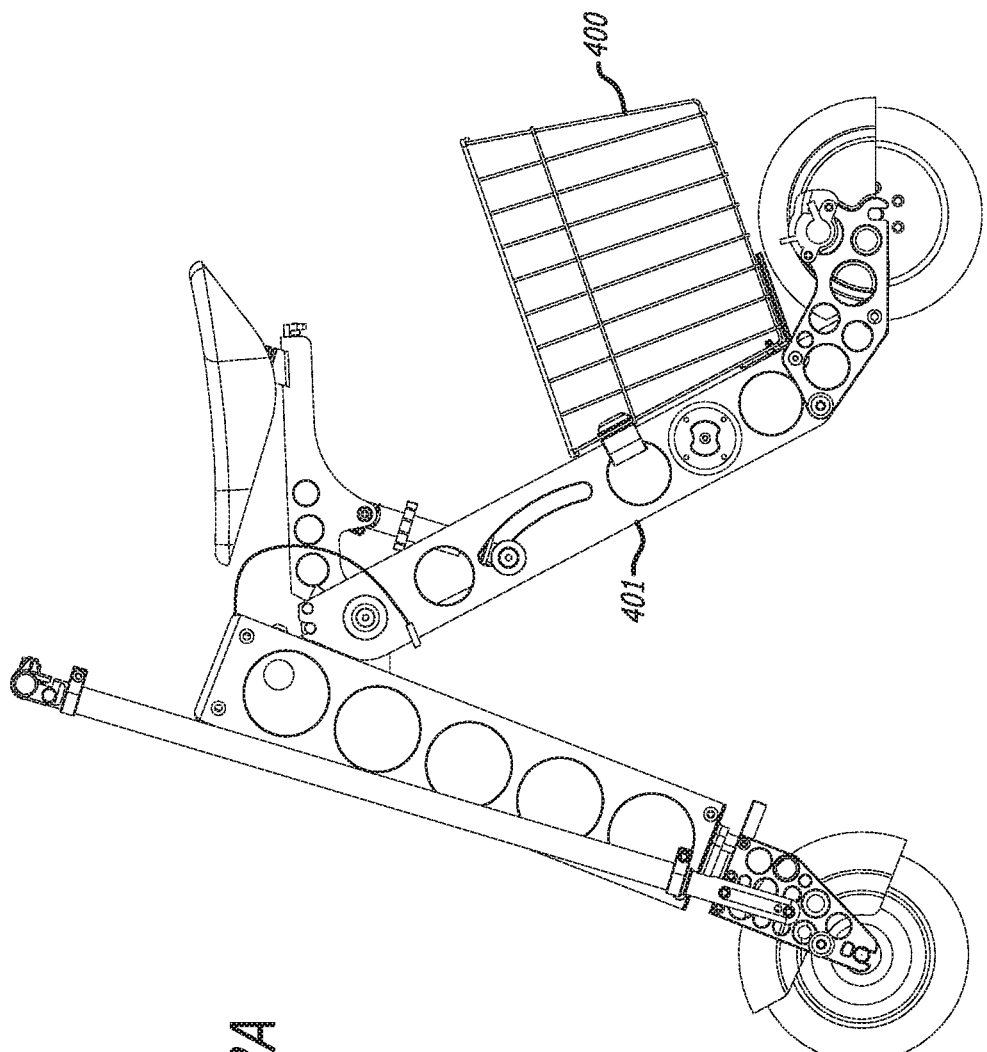

FOLDABLE ELECTRIC VEHICLE

RELATED APPLICATIONS

The present application claims priority to U.S. Provisional Patent Application No. 62/168,663, filed May 29, 2015, U.S. Provisional Application No. 62/233,147 filed Sep. 25, 2015, and U.S. Provisional Application No. 62/244,064 filed Oct. 20, 2015, the disclosures of which are incorporated herein by reference.

FIELD OF THE INVENTION

Compact, foldable electric vehicles and charging stations for said vehicles are described.

BACKGROUND OF THE INVENTION

A common difficulty encountered in public transport is in trying to move people from a transportation hub, like a railway station, bus stop, etc. to their desired destination, or from their origination point to a transport hub. These problems are referred to as the 'last mile' or 'first mile' problem, respectively. Where the population of a place is not dense, like in areas where there are extensive suburbs and exurbs, this difficulty can become chronic making public transport impractical. A number of solutions have been proposed to overcome this problem, including community transportation such as feeder transport and ride or car sharing programs, however, these methods require a social infrastructure that is often either not available or not extensive enough to meet commuter needs. Other solutions involve various forms of portable transport, such as bicycles. Most of these personal forms of transportation are relatively bulky and present challenges in storage at both ends of the commute, as well as transport within most public transport systems.

Accordingly, a need exists for personal transport devices and infrastructure capable of addressing the 'last mile'/'first mile' challenge.

BRIEF SUMMARY OF THE INVENTION

The application is directed to portable electric vehicles and infrastructure for portable electric vehicles.

Many embodiments are directed to a foldable vehicle including:
- at least two wheel-bearing structural members having first and second ends and defining a wheel-bearing structural member longitudinal axis, each of said wheel-bearing structural members having at least one wheel assembly interconnected to the second end thereof and a wheel-bearing structural member pivot hinge bracket disposed along the length thereof;
- at least one seat-bearing structural member having first and second ends and defining a seat-bearing structural member longitudinal axis, the seat-bearing structural member having a seating platform interconnected to the second end thereof and a seat-bearing pivot hinge bracket disposed along the length thereof; and
- wherein the at least two wheel-bearing structural member pivot hinge brackets and the seat-bearing pivot hinge bracket are configured to cooperatively interconnect to form a vehicle pivot hinge such that the structural members are pivotably interconnected about a single vehicle pivot point to move between at least two configurations:
  - a first riding configuration wherein the longitudinal axes of the two wheel-bearing structural members and the seat-bearing structural members have angular offsets relative to each other, and
  - a second folded configuration wherein the longitudinal axes of the two wheel-bearing structural members and the seat-bearing structural member are roughly parallel.

In other embodiments, the foldable vehicle includes a steering mechanism interconnected with at least one of said wheel-bearing structural members and configured to change to directional orientation of at least one wheel assembly relative to the vehicle. In some such embodiments the vehicle includes a front wheel-bearing structural member and a rear wheel-bearing structural member, and wherein the steering mechanism is pivotably interconnected with the wheel assembly of the front wheel-bearing structural member to move between at least two configurations:
- a first riding configuration wherein the longitudinal axes of the front wheel-bearing structural member and the steering mechanism have angular offsets relative to each other, and
- a second folded configuration wherein the longitudinal axes of the front wheel-bearing structural member and the steering mechanism are roughly parallel.

In still other embodiments, the foldable vehicle includes a front wheel assembly lock configured to prevent changes to the directional orientation of the wheel assembly of the front wheel-bearing structural member when in the folded configuration. In some such embodiments the front wheel-bearing structural member defines an internal volume having an energy storage device disposed therein.

In yet other embodiments, the steering mechanism is at least one handlebar, and wherein the height and angle of the handlebar relative to the vehicle is adjustable.

In still yet other embodiments, the wheel-bearing pivot hinge brackets and the seat-bearing pivot hinge bracket are disposed proximal to the first end of their respective structural members.

In still yet other embodiments, the foldable vehicle includes a pivot locking mechanism configured to disengageably lock the structural members in one of the at least two configurations. In some such embodiments, the pivot locking mechanism includes a plurality of locking grooves and a cooperative locking pin configured to engage said locking grooves, said locking grooves being disposed on at least one of the at least two wheel-bearing structural members, and said cooperative locking pin being disposed on at least another of the at least two wheel-bearing structural members such that when the cooperative locking pin is engaged within the locking grooves the at least two wheel-bearing structural members are prevented from pivoting relative to each other.

In still yet other embodiments, the foldable vehicle includes a locking mechanism disengagement element disposed on the seat-bearing structural member and configured to disengage the pivot locking mechanism when the seat-bearing structural member is pivoted upward relative to the axial alignment of the seat-bearing structural member in one of either the first riding configuration or the second folded configuration.

In still yet other embodiments, the foldable vehicle includes a seat support element pivotably engaged at a first end thereof along the length of the seat-bearing structural member and slidingly engaged at a second end thereof along the length of one of the at least two wheel-bearing structural members such that a roughly triangular configuration is formed between the seat-bearing structural member, the at least one wheel-bearing structural member and the seat support element. In some such embodiments, the axis of the seat support element is roughly orthogonal with the axis of the seat-bearing structural member. In some such embodiments, the seat support element slidingly engages a channel disposed along a portion of the wheel-bearing structural member, the channel delineating a curve-linear path between at least two configurations:
- a first riding configuration wherein the longitudinal axes of the wheel-bearing structural member and the seat-bearing structural member and the seat support element have angular offsets relative to each other, and
- a second folded configuration wherein the longitudinal axes of the wheel-bearing structural member and the seat-bearing structural member and the seat support element are roughly parallel.

In still yet other embodiments, the seat support element comprises a resilient member. In some such embodiments the seat support element is configured such that when the seat-bearing structural member is pivoted into the second folded configuration the resilient member is placed into tension such that a resilient locking force is applied to the seat-bearing structural member to urge said seat-bearing structural member into position in the second folded configuration.

In still yet other embodiments, at least one additional resilient element is disposed in relation to said seat support element to apply a force thereto, thereby urging said seat support element into at least one of either the first riding configuration or the second folded configuration.

In still yet other embodiments, the vehicle includes two wheel-bearing structural members, a front wheel-bearing element having a front wheel assembly with a single wheel, and a rear wheel-bearing element having a rear wheel assembly with at least one wheel. In some such embodiments the rear wheel assembly comprises at least two wheels interconnected via a fixed axle. In still other such embodiments, the rear wheel assembly comprises at least two wheels interconnected via an axle pivotable about a point perpendicular to the axis of the rear wheel-bearing structural member.

In still yet other embodiments, the foldable vehicle includes at least one luggage rack disposed on at least one of the wheel-bearing structural members, said luggage rack being pivotable between at least two configurations:
- a first riding configuration wherein the longitudinal axes of the wheel-bearing structural member and the luggage rack have angular offsets relative to each other, and
- a second folded configuration wherein the longitudinal axes of the wheel-bearing structural member and the luggage rack are roughly parallel.

In still yet other embodiments, the foldable vehicle of claim 1, includes at least one electric motor disposed within at least one of the wheel assemblies and an energy storage device interconnected therewith.

In still yet other embodiments, the foldable vehicle includes an electronics interconnection disposed thereon, the electronics interconnection in signal communication with at least one sensor configured to deliver information on at least one vehicle parameter and deliver information from the at least one sensor to the personal electronic device. In some such embodiments, the at least one vehicle parameter is selected from the group consisting of vehicle speed, energy consumption, energy reserve, mileage, and direction.

In still yet other embodiments, the foldable electric vehicle includes at least one attachable accessory attached thereto, the attachable accessory including a body having:
- at least one weight-bearing attachment point disposed on a lower portion of the attachable accessory and cooperatively attachable to a structural member, that at least one weight-bearing attachment point configured to carry the downward load from the attachable accessory; and
- at least one secondary attachment clip rotatably interconnected with an upper portion of the attachable accessory, the at least one secondary attachment clip having a first linkage releasably interconnecting the secondary attachment clip to the attachable accessory and a second linkage interconnecting the secondary attachment clip within at least one of the fenestration.

In still yet other embodiments, the foldable electric vehicle includes at least one fender disposed to partially enclose at least an upper portion of one of either the front or rear wheels, the at least one fender including at least one attachment linkage configured to engage at least one fenestration in one of either the front or rear support arms such that the at least one fender is stably disposed in relation to at least the support arm and wheel to which the at least one fender is related.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 7a and 7b provide perspective views of a seat-bearing structural member (7a) and a seat resilient member (7b) in accordance with embodiments of the invention.

FIGS. 8a to 8e provide perspective views of cooperative main hinge components for a front wheel-bearing structural member (8a), a rear wheel-bearing structural member (8b), a seat-bearing structural member (8c) in accordance with embodiments of the invention, a side assembly view (8d) of the main pivot hinge of the vehicle, and a cross-sectional view (8e) of the main pivot hinge assembly along view A1 of FIG. 8d in accordance with embodiments of the invention.

FIGS. 10a to 10k provide perspective views of a foldable electric vehicle and the folding mechanism in an open riding configuration (10a & 10b), in a series of intermediate positions between an open riding configuration and a compact folded configuration (10c to 10h), and in a compact folded configuration (10i to 10k) in accordance with embodiments of the invention.

FIGS. 13a and 13b provide schematic views of an exemplary charging station for use in association with an exemplary foldable electric vehicle in accordance with embodiments of the invention.

FIGS. 14a to 14f provide schematic views of a foldable electric vehicle having rear foldable wheels in accordance with embodiments of the invention.

FIGS. 16a to 16c provide schematic views of a detachable accessory anchor mechanism in accordance with embodiments of the invention.

FIGS. 18a and 18b provide schematic views of an attachable accessory interconnected with a foldable electric vehicle in accordance with embodiments of the invention.

DETAILED DESCRIPTION OF THE INVENTION

Figure 1A:
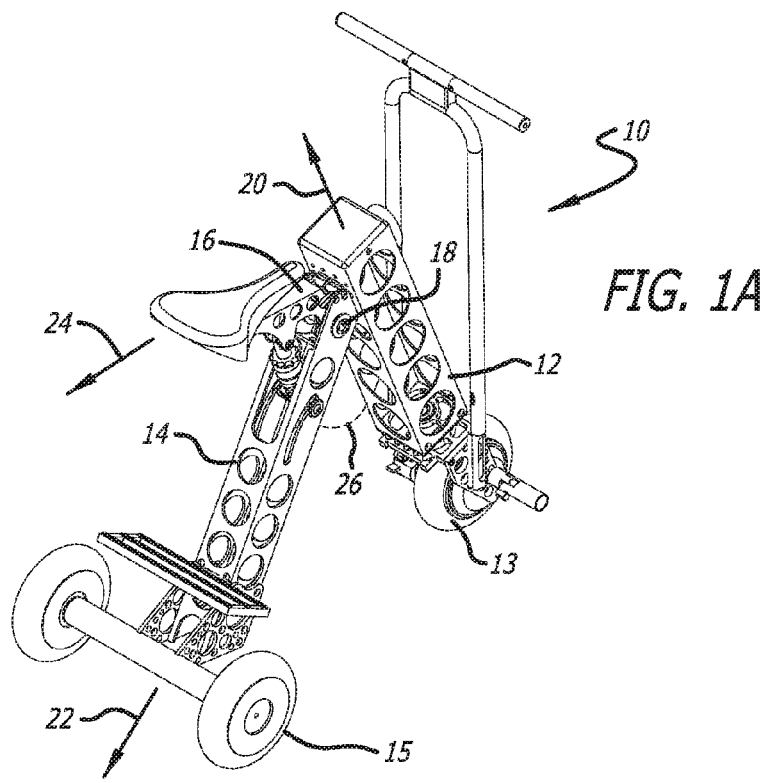
FIGS. 1a and 1b provide perspective views of a three-wheeled foldable electric vehicle in an open riding configuration (1a), and a compact folded configuration (1b) in accordance with embodiments of the invention.

Turning now to the drawings, foldable electric vehicles and devices for charging such electric vehicles are described. In many embodiments, the foldable electric vehicle generally comprises a plurality of structural members all cooperatively moveable between a folded position wherein the structural members are in a compact configuration suitable for storing and transporting the vehicle, and an open position wherein the structural members are in a riding configuration suitable for the operation of the vehicle. In many such embodiments the pivotable structural members may have disposed thereon wheels, motors, charge storage devices, power distribution and control circuits, motor and vehicle controls and instruments, accessories and all other necessary devices and structures for the operation of the vehicle.

In some embodiments, the vehicle comprises two structural wheel-bearing structural members (front and rear structural members), and a seat structural member that are all pivotally interconnected along their lengths such that they may be moved between a closed position wherein the three structural members are disposed roughly parallel to each other in a compact folded configuration, and an open riding configuration wherein a downward acute angle is formed between the two structural wheel-bearing structural members, and the seat structural member is disposed in a position to support a rider atop the vehicle.

In many embodiments, the pivot point between the three structural members is disposed at the upper ends of the structural members distal to the wheels and seat bearing ends thereof, to form an overall 'A-frame' configuration for the vehicle. In many other embodiments one of the structural structural members is configured to enclose a power source, such as, for example, a battery or plurality of batteries. In many embodiments this power source enclosing structural member is disposed as the front structural member of the vehicle, and bears the front wheel thereof. In many embodiments, the pivotable second wheel-bearing structural member includes one or more rear wheels at the distal end thereof. In some embodiments these wheels may be interconnected to the structural member on either end of a truck assembly that is pivotable about a horizontal axis perpendicular to the axis of the rear structural member such that the rider of the vehicle is capable of steering the vehicle by leaning in the desired direction of the turn. It will be understood that the rear wheel assembly may include a single wheel or multiple wheels interconnected via an axle.

The folding and locking mechanism of the vehicle, in many embodiments, interconnects the three structural members of the vehicle in a configuration that allows the disengagement of the locking mechanism and the folding of the structural members of the vehicle via the manipulation of one of the structural members of the vehicle. In some such embodiments, the locking mechanism is disengaged by manipulating the seat-bearing structural member of the vehicle. In other embodiments the locking mechanism of the vehicle includes a resilient member interconnected with the seat-bearing structural member that urges the seat-bearing structural member into the open and closed positions when the vehicle is placed into such configurations.

Figure 1B:
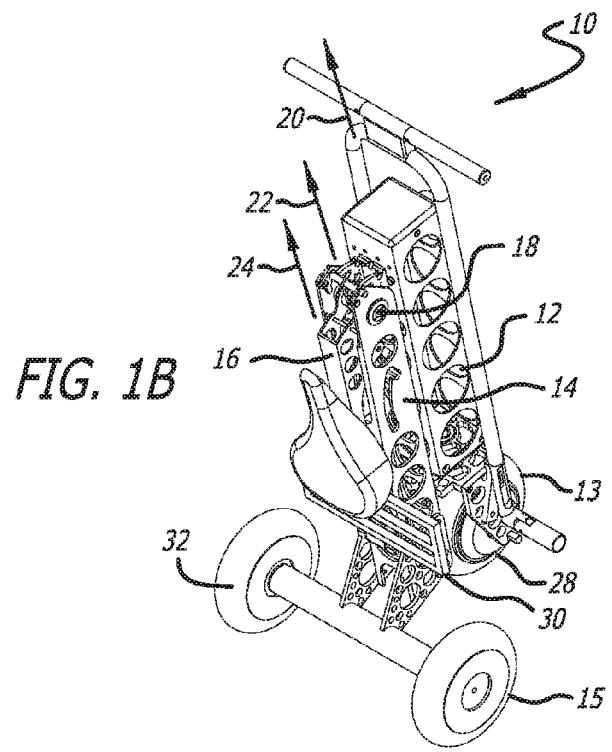
Figure 1C:
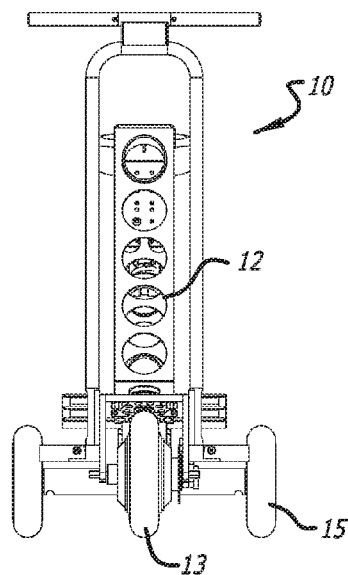
FIGS. 1c and 1d provide front views of a three-wheeled foldable electric vehicle in an open riding configuration (1c), and a compact folded configuration (1d) in accordance with embodiments of the invention.
Figure 1D:
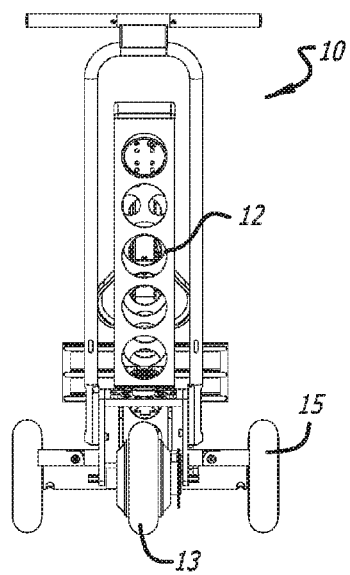
Figure 1E:
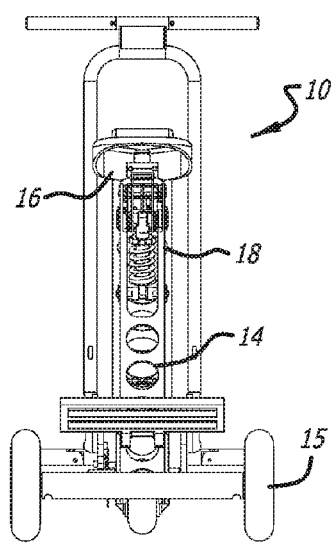
FIGS. 1e and 1f provide back views of a three-wheeled foldable electric vehicle in an open riding configuration (1e), and a compact folded configuration (1f) in accordance with embodiments of the invention.
Figure 1F:
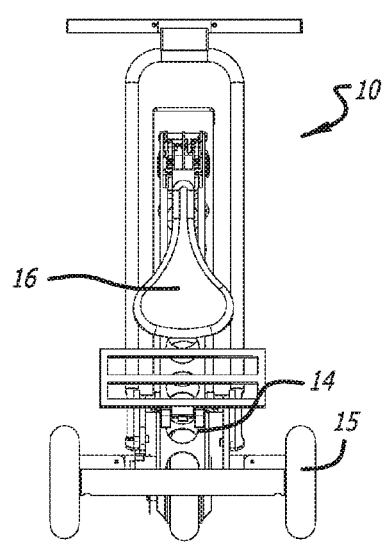
Figure 1G:
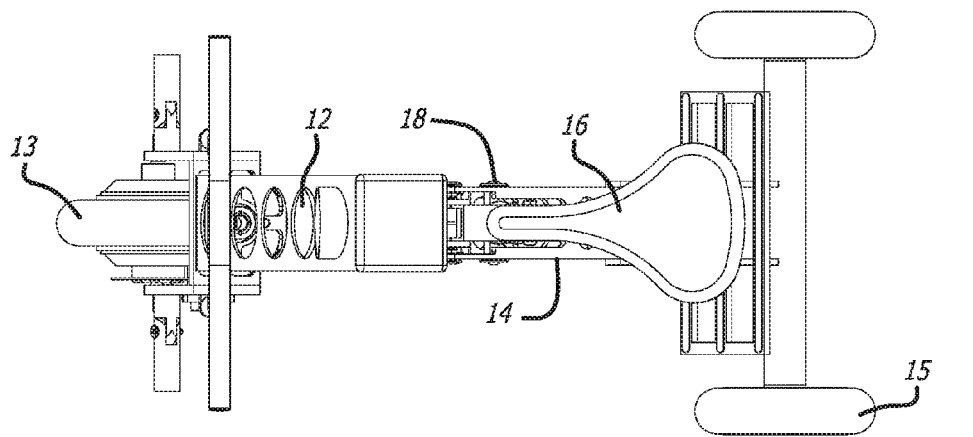
FIGS. 1g and 1h provide top views of a three-wheeled foldable electric vehicle in an open riding configuration (1g), and a compact folded configuration (1h) in accordance with embodiments of the invention.
Figure 1H:
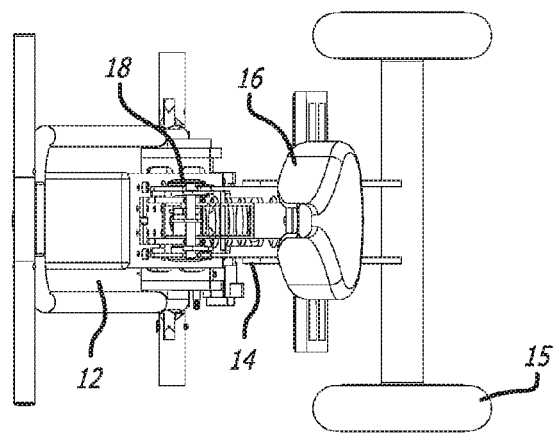
Figure 2A:
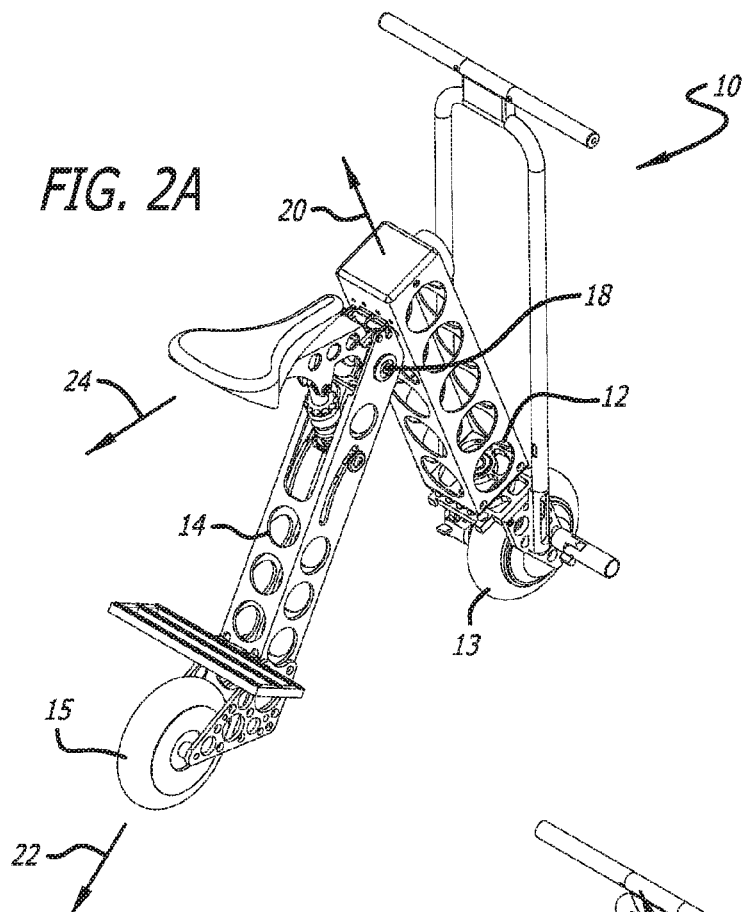
FIGS. 2a and 2b provide perspective views of a two-wheeled foldable electric vehicle in an open riding configuration (2a), and a compact folded configuration (2b) in accordance with embodiments of the invention.
Figure 2B:
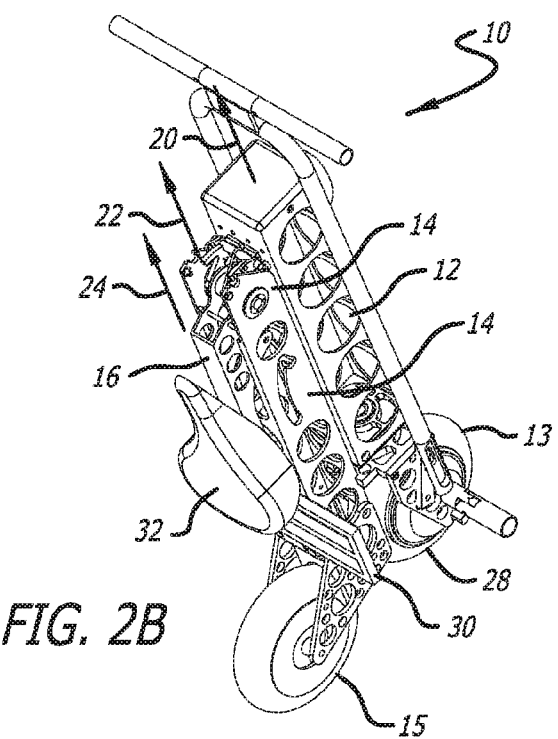
Figure 2C:
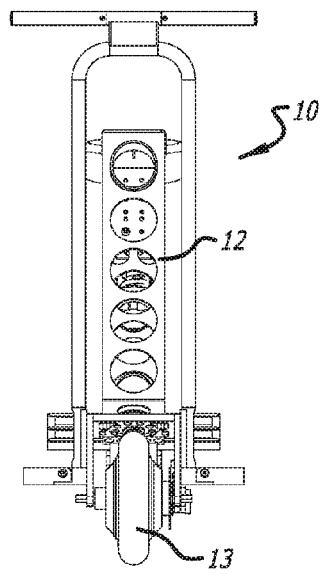
FIGS. 2c and 2d provide front views of a two-wheeled foldable electric vehicle in an open riding configuration (2c), and a compact folded configuration (2d) in accordance with embodiments of the invention.
Figure 2D:
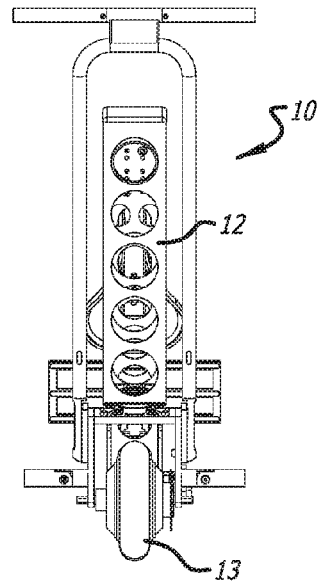
Figure 2E:
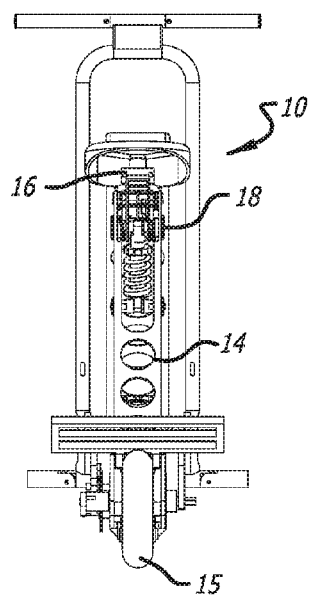
FIGS. 2e and 2f provide back views of a two-wheeled foldable electric vehicle in an open riding configuration (2e), and a compact folded configuration (2f) in accordance with embodiments of the invention.
Figure 2F:
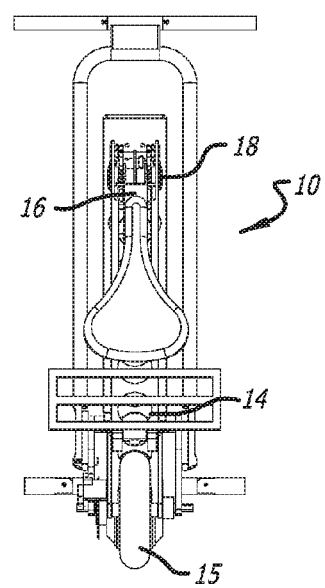
Figure 2G:
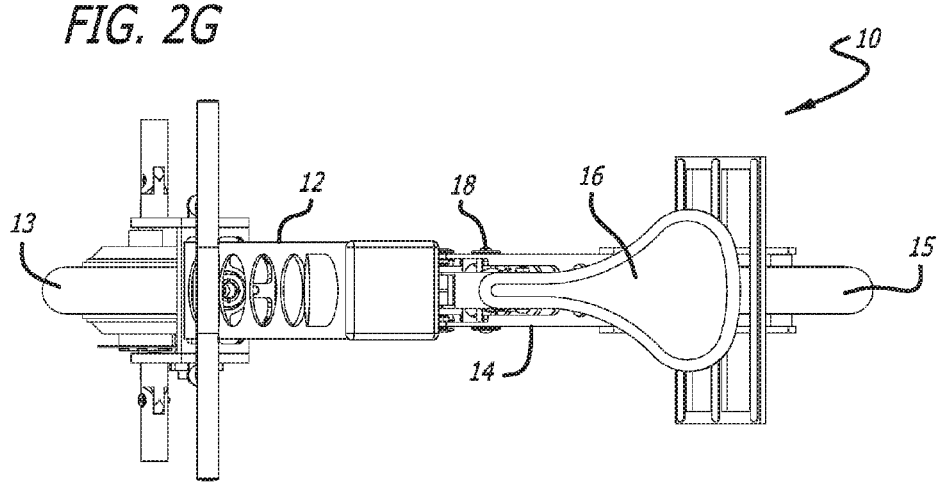
FIGS. 2g and 2h provide top views of a two-wheeled foldable electric vehicle in an open riding configuration (2g), and a compact folded configuration (2h) in accordance with embodiments of the invention.
Figure 2H:
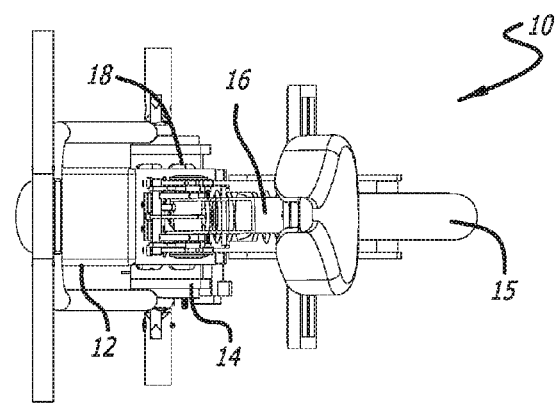

As shown in FIGS. 1a and 1b, in many embodiments a three-wheeled foldable vehicle is provided comprising at least three structural members: a front wheel-bearing structural member (12) having disposed at the distal end thereon at least a front wheel assembly (13), a rear wheel-bearing structural member (14) having disposed at the distal end thereon at least a rear wheel assembly (15), and a seat-bearing structural member (16) for supporting a rider while operating the vehicle. These structural members are pivotally connected about a single pivot hinge (18) that allows movement of the structural members from an open riding configuration, shown in one exemplary embodiment in FIG. 1a, to a folded compact configuration, shown in one exemplary embodiment in FIG. 1b.

As shown, in FIG. 1a, the relative arrangement of the structural members of the vehicle in these configurations may be defined by the axial arrangement of the structural members around the pivot hinge (18), wherein each structural member is defined by an axis (20, 22 and 24). In some embodiments in the open riding configuration the front and rear structural members (12 & 14) are positioned such that a downward acute angle (26) is created between the axes (20 & 22) of the two wheel-bearing structural members. Although a particular angular arrangement is provide in FIG. 1a, it should be understood that any angle suitable to form a usable riding configuration may be formed depending on the specific arrangement and geometry of the wheels and structural members desired. For example, a suitable angle may be determined by factors such as the distance between the wheels of the vehicle, the height of the seat to the ground, etc.

In addition, in some embodiments of this open riding configuration the seat-bearing structural member (16) is pivoted such that its axis (26) is disposed at an angle relative to the ground such that a riding platform (28) is formed on which a rider may be seated to operate the vehicle. As shown in FIG. 1a, in some embodiments the riding platform (28) may be configured such that its axis (26) is roughly parallel to the ground. In other embodiments adjustment mechanisms may be provided to adjust the position of the riding platform relative to the wheel-bearing structural members as desired by the rider. In such embodiments adjustments might include height relative to the ground, distance relative to the handlebars, angle relative to the pivot hinge (18), etc. Although one embodiment of a riding platform (28) comprising a bicycle-style seat is shown in FIG. 1a, it will be understood that the riding platform may take any form, style or shape suitable to support a rider.

As shown in FIG. 1b, in many embodiments, in the compact folded configuration the front, rear and seat structural members (12, 14 & 16) are all pivoted about the pivot hinge (18) such that their axes (22, 24 & 26) are disposed roughly parallel to each other. In some embodiments of the vehicle, such as the one shown in FIG. 1b, the axes (22, 24 & 26) of the structural members are disposed parallel on to the other, and the structural members (12, 14 & 16) themselves are moved into a configuration in which they are positioned adjacent to one another. In one such embodiment, the pivoting of the structural members comprises a scissoring motion about the pivot hinge such that the distal ends of each of the structural members (28, 30 & 32) come together to face in a single direction, again as shown in FIG. 1b.

Additional views of the vehicle (10) of FIGS. 1a and 1b, in open and closed positions, including: front views (1c & 1d), rear views (1e and 1f), and top views (1g and 1h) are provided showing the elements described above.

Although the above description and the embodiments of the vehicle shown in FIGS. 1a to 1h, describe an electric vehicle having a three-wheel configuration (in which the front wheel assembly (13) comprises a single wheel and the rear wheel assembly (15) comprises two wheels), it will be understood that other wheel configurations may be provided that have considerably the same elements and operate in a manner commensurate to that described above. For example, FIGS. 2a to 2h provide perspective views (2a and 2b), front views (2c and 2d), rear views (2e and 2f), and top views (2g and 2h) of an electric vehicle (10) having substantially the same structure and function as described above with respect to FIGS. 1a to 5 comprising a two-wheel configuration (in which both the front (13) and rear (15) wheel assemblies comprises a single wheel).

Turning now to the detailed construction of the vehicle, several of the elements comprising the vehicle will be described, including the front and rear wheel-bearing structural members, and the seat-bearing structural member and all attendant structures and accessories. Examining first the front wheel-bearing structural member, FIGS. 3a to 3e provide illustrations of embodiments of the vehicle (10) and the front wheel-bearing structural member (12).

Figure 3A:
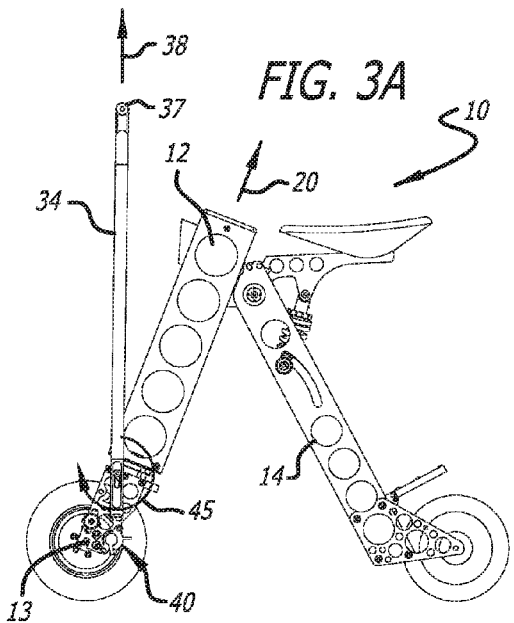
FIGS. 3a to 3d show side views of a foldable electric vehicle and the front wheel assembly and handlebar in an open riding configuration (3a & 3c), and a compact folded configuration (3b & 3d) in accordance with embodiments of the invention.
Figure 3B:
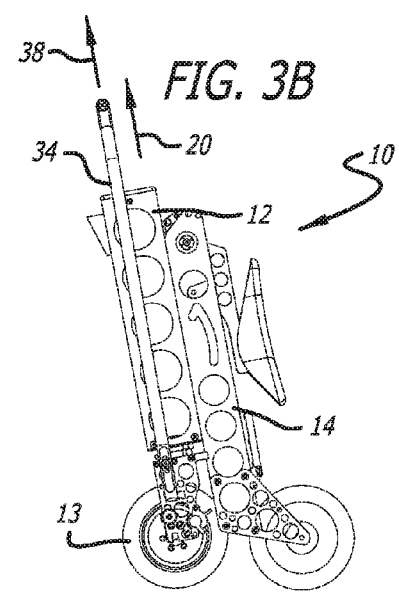

As shown in FIGS. 3a to 3d, in many embodiments the vehicle (10) comprises a front wheel-bearing structural member (12) having at least one front wheel assembly (13) mounted thereto, and a steering mechanism, such as a handlebar or other suitable structure (34) interconnected therewith. In some such embodiments, the steering mechanism (34) can be used to alter the orientation of the front wheel assembly (13) relative to the vehicle, and thus to steer the vehicle when in the open/riding position (FIG. 3a), and to maneuver the vehicle when in the closed/compact position (FIG. 3b). Although in the embodiments shown in FIGS. 3a to 3d, the wheel assembly (13) is pivotally interconnected to the front wheel-bearing structural member (12) through a rotatable pivot interconnection (36), in other embodiments the wheel assembly might be fixedly attached to the front wheel-bearing assembly, and the entire front wheel-bearing assembly could be pivotable relative to the remaining vehicle structure. Regardless, in many embodiments the steering mechanism may be interconnected relative to the wheel assembly and front wheel-bearing structural member such that the orientation of at least the front wheel relative to the remainder of the vehicle may be altered.

Although a "T"-shaped handlebar steering mechanism (34) is shown in the figures, it will be understood that the steering mechanism may be of any shape suitable and dimension such that a rider may use the mechanism to alter the directional motion of the vehicle. For example, a "U"-shaped handle bar steering mechanism may be contemplated. In addition, in some embodiments the height of the steering mechanism may also be adjustable, such as, for example, via a telescoping mechanism, for convenience and comfort of use, and in some embodiments to allow the steering mechanism to be collapsed for storage such that the height of the handle bars do not extend above the height of the remainder of the vehicle. In embodiments, such as those shown in FIGS. 3a to 3e, having handles (37) that extend out from the sides of framework, such as in a "T" configuration the handle extensions may retract or fold into a more compact form.

In many embodiments, as shown schematically in FIGS. 3a to 3d, the steering mechanism (34) may be pivoted between an open position (FIGS. 3a and 3c), in which the axis (38) of the steering mechanism is angled away from the axis (20) of the front wheel-bearing structural member (12), and a closed compacted position (FIGS. 3b and 3d), in which the axis of the steering mechanism is aligned along the vertical axis of the front wheel-bearing structural member. In many embodiments, as shown in detail in FIGS. 3c and 3d, the steering mechanism (34) may be moved between the open and closed positions by sliding the lower end (40) of the steering mechanism along a locking channel (42) disposed on the wheel assembly (13) of the front wheel-bearing structural member (12). In some such embodiments, the steering mechanism (34) may be interconnected with the wheel assembly (13) via an upper pivot pin (44) that is disposed within a pivot channel (46) formed in the steering mechanism, and a lower locking pin (48) disposed on the steering mechanism that moves within the locking channel (42) of the wheel assembly. Although the pins and channels are disposed in the illustrated embodiment in a particular configuration, it should be understood that pins and channels may be distributed between the wheel assembly and steering mechanism such that there is a constrained pivotable interconnection therebetween. In many embodiments, the lower locking pin (48) is configured to slide within the locking channel (42) and move up and down therein between various positions therealong thus causing the steering mechanism (34) to pivot about the upper pivot pin (44) relative to the wheel assembly (13) and the front wheel-bearing structural member (12), as shown by the dashed arrows (45) in FIG. 3a.

In many embodiments, to allow the steering mechanism to move within the channel and lock into a desired position, an internal tension spring (not shown) may be provided in association with the steering mechanism (34) and one or more of the pins (44 and 48) such that the steering mechanism may be securely locked into a desired position. In some such embodiments, both locked positions of the handlebar may be disengaged by either pressing downwards or pulling upwards on the handlebar, as appropriate for the design and arrangement of the locking channel and pins, and then rotated to the desired lock position about the upper pivot pin (44) along the locking channel (42). For example, in the embodiments shown in FIGS. 3a to 3d, the locking positions of the locking channel (42) comprise a series of notches (50) formed along the lower edge of the locking channel. Accordingly, in such an embodiment a spring may be provided to resiliently urge the locking pin (48) into the notch (50) of the locking channel (42). Finally, although only a two-position angular arrangement is shown between the steering mechanism (34) and the front wheel-bearing structural member (12), it should be understood that other angles may be formed, or the angle of the steering mechanism relative to the vehicle may be made continuously or incrementally adjustable to allow the rider to adjust the riding position of the vehicle. In many embodiments, such a function may be provided by forming different locking positions (50) along the locking channel (42).

In many embodiments, it may be desirable to prevent motion of the front wheel assembly relative to the vehicle in the compact folded or closed position, i.e., to lock the orientation of the wheel relative to the vehicle. In such embodiments a wheel locking mechanism may be provided to prevent the wheel and/or wheel assembly (13) from changing orientation relative to the vehicle in such a folded closed configuration. Although any suitable wheel locking mechanism may be provided, in some embodiments a tab (52) is provided on the pivotable portion of the wheel or wheel assembly (13) such that in the close folded configuration (FIGS. 3b and 3d) the tab engages the adjacent rear wheel-bearing assembly (14) or other immobile portion of the vehicle to prevent independent motion of the wheel or wheel assembly, and thereby a change in the orientation of the wheel and/or wheel assembly relative to the vehicle.

Figure 3C:
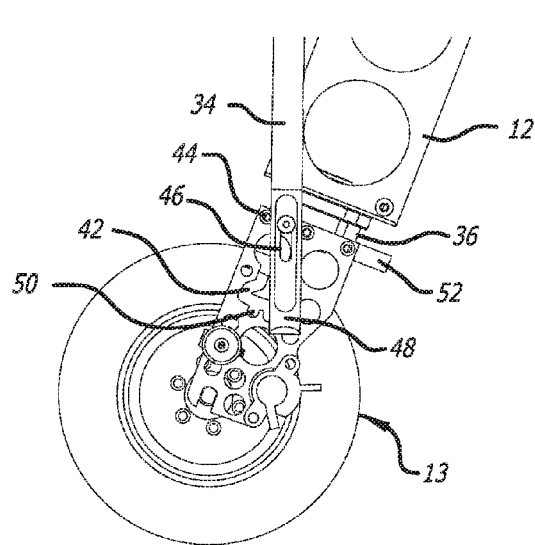
Figure 3D:
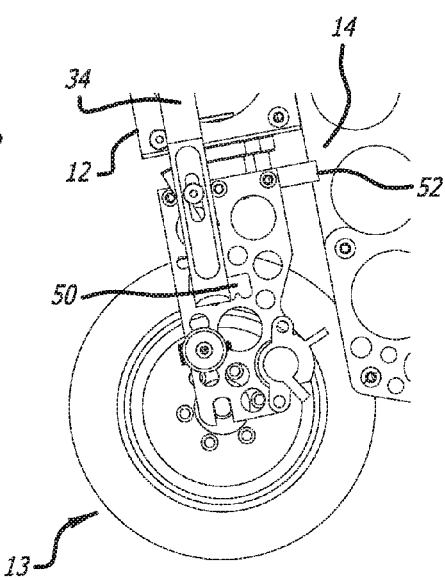
Figure 3E:
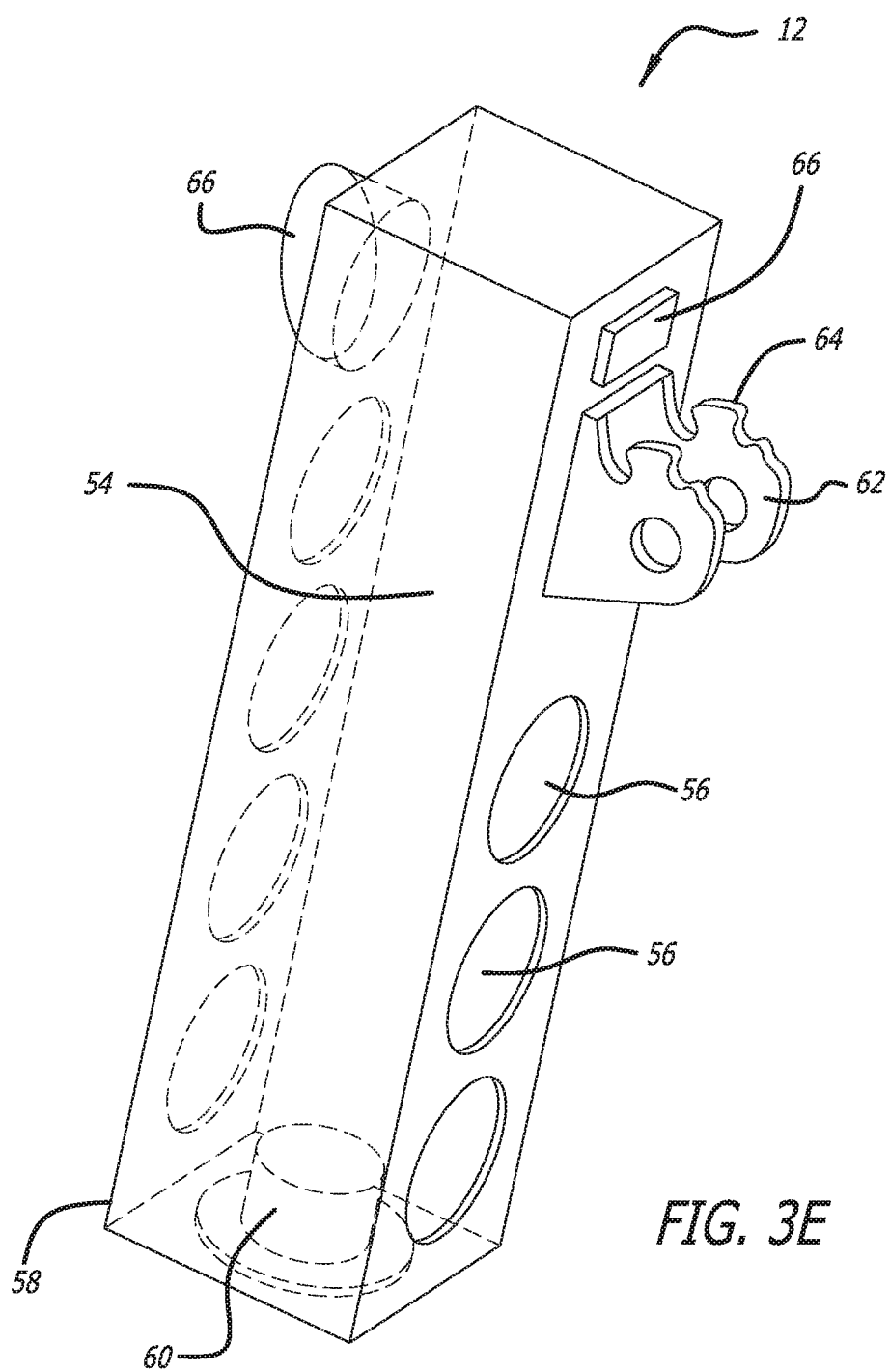
FIG. 3e provides a view perspective transparent view of a front structural structural member (3e) in accordance with embodiments of the invention.

Turning now to the construction of the front wheel-bearing assembly (12), as shown in FIG. 3e, in many embodiments the front wheel-bearing structural member is formed of an elongated body that may be made hollow such that the body defines an interior volume (54). The structural member may be formed from any material suitable to provide sufficient structural support to the vehicle, such as, for example, a metal, composite, or polymer. In many embodiments, as shown in FIG. 3e, the weight of the front wheel-bearing structural member (12) may be lightened by including fenestrations (56) along the elongated body. Although certain fenestrations are shown in the figures, the number and configuration of such fenestrations may take any geometry or shape suitable to lighten the structural member while maintaining the structural integrity of the structural member.

In many embodiments, the front wheel-bearing structural member (12) may comprise, at its lower end (58), an interconnection point (60) such that a wheel assembly may be interconnected therewith. In some such embodiments, such an interconnection may be pivotable such that the wheel assembly may pivot relative to the front wheel-bearing assembly.

In many embodiments, the front wheel-bearing structural member (12) may further comprise a front main pivot hinge bracket (62) disposed along its length and configured such that the front main pivot hinge bracket may be cooperatively coupled with the main pivot hinge brackets provided on the rear wheel-bearing structural member (14) and the seat-bearing structural member (16) to form the vehicle main pivot hinge (18) to allow the front wheel-bearing structural member (12) to pivot relative to the other structural members (14 and 16) that form the structure of the vehicle. Such a front main pivot hinge bracket (62) may also comprise front locking mechanism elements (64) for engaging a cooperative locking mechanism on one or more of the other structural members (14 and 16) of the vehicle to prevent unintended movement of the structural members relative to one another. In some embodiments, as shown in FIG. 3e, the locking mechanism (64) comprises a series of locking grooves that are configured to engage with a cooperative locking pin disposed on the rear wheel-bearing structural member (14).

The front wheel-bearing structural member may also comprise certain accessories, such as, for example, lights (66), charging connections (68), personal electronic docking connections, (not shown), etc. Although the energy storage and vehicle propulsion systems may be distributed across the various structural members and elements of the vehicle, in many embodiments the energy storage elements, such as, for example, one or more batteries may be disposed within the internal volume (54) of the front wheel-bearing structural member along with any required electronics, electric interconnections, etc. necessary for the operation of the electric vehicle.

Figure 3F:
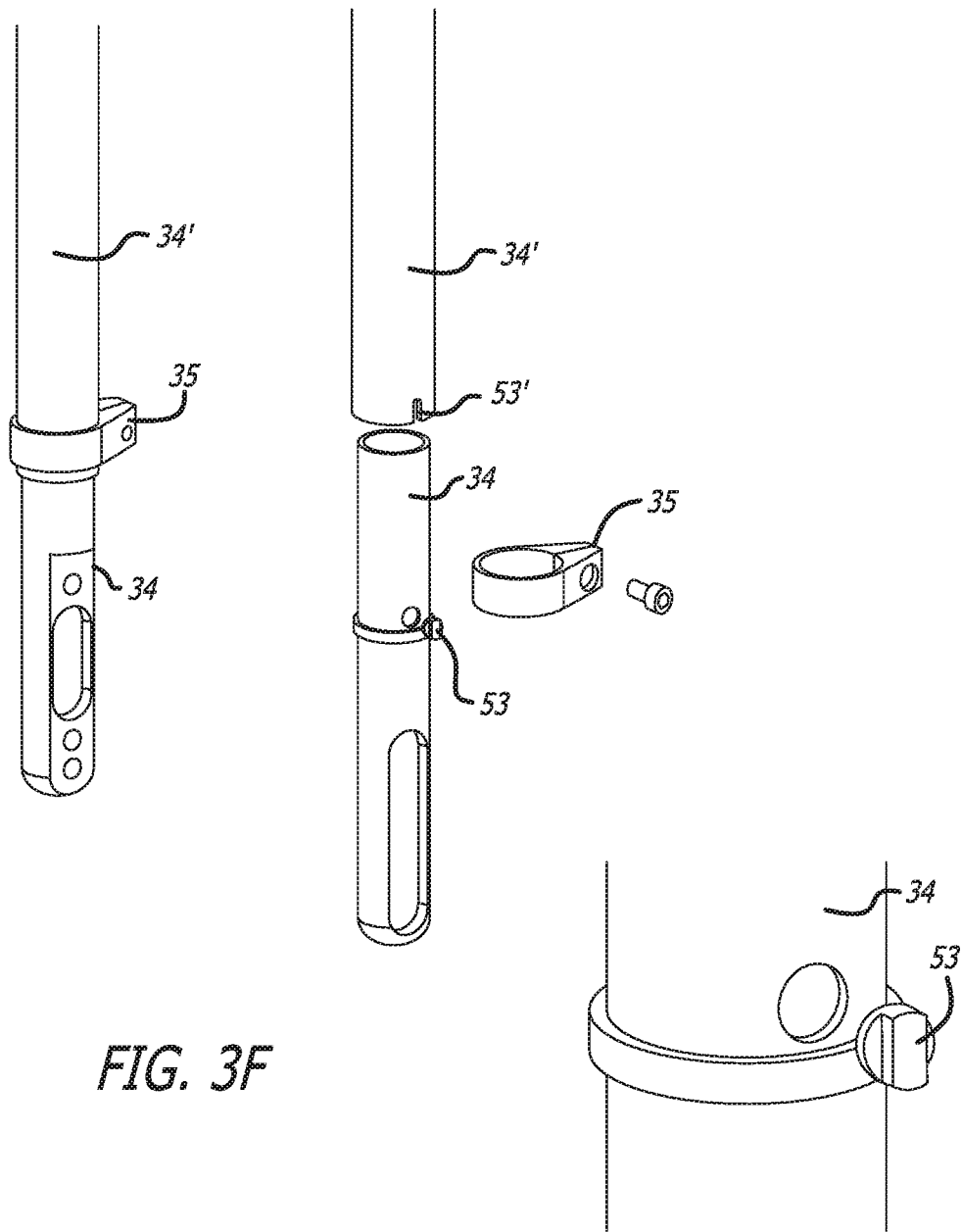
FIG. 3f provides perspective views of a two-piece handlebar and anti-rotation mechanism in accordance with embodiments of the invention.

Although the steering mechanism in FIGS. 3b to 3d is shown as comprising a pair of integral elongated members (34), it should be understood that these elongated members (34) may be formed of one or more elongated members (34 & 34') that may be interconnected, as shown in FIG. 3f. In many such embodiments the composite structures may be interconnected via a suitable interconnection (35) (e.g., a clamp, bracket or fastener). In many embodiments, to prevent relative rotation of the elongated members (34 & 34'), an anti-rotation mechanism, such as a pin (53) and slot (53') disposed cooperatively between the two elongated members (34 and 34') may be provided. Although the pin (53) is shown to be formed on a first elongated member (34) and the cooperative slot (53') on a second elongated member (34') it should be understood that the disposition of these elements may be reversed without departing from the proposed anti-rotation mechanism.

Figure 4:
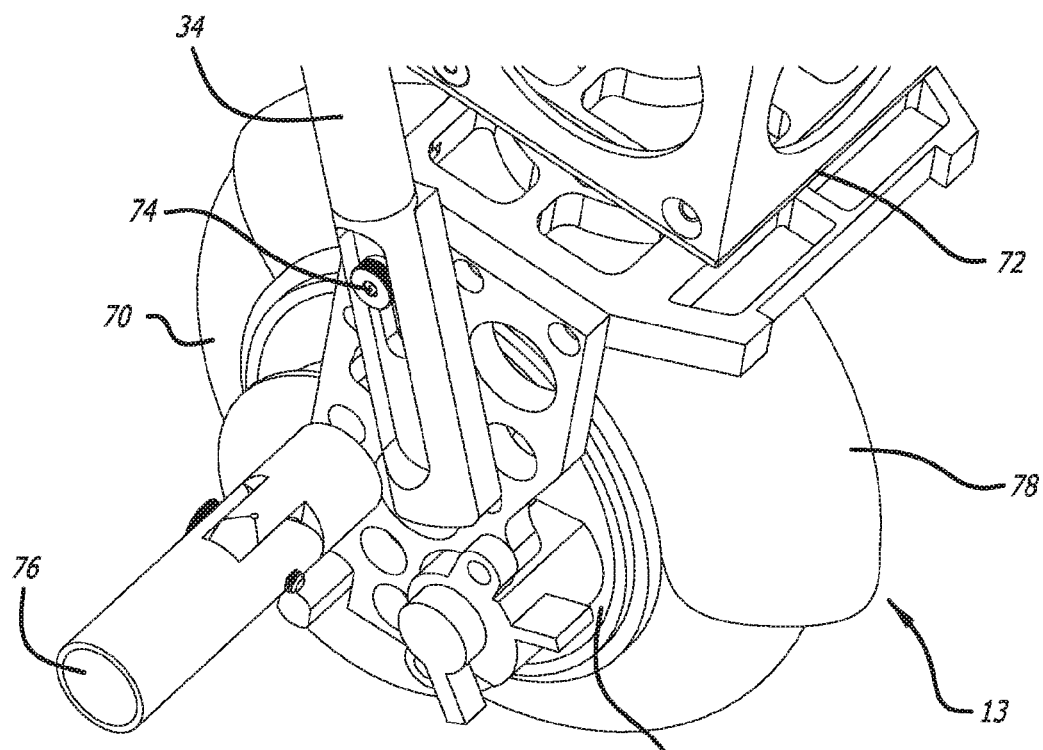
FIG. 4 provides a perspective view of a front wheel assembly in accordance with embodiments of the invention.

As shown in FIG. 4, the front wheel assembly (13) generally comprises a wheel (70) rotatable interconnected with the assembly, such as via an axle or other suitable rotatable interconnection. As described in relation to FIGS. 3a to 3e, the wheel assembly in many embodiments may also include a pivotable interconnection (72) to pivotally interconnection the wheel assembly to the front wheel-bearing structural member (12). In many embodiments, the wheel assembly (13) may also comprise a steering mechanism interconnection (74) that may be configured to allow the steering mechanism (34) to pivot about the wheel assembly, thereby allowing the axis of the steering mechanism to be repositioned relative to the front wheel-bearing structural member, and in turn the other structural members of the vehicle. The front wheel assembly may also include front footrests (76), which may take any suitable form, such as, for example, a peg or pedal. Such a footrest may be foldable or retractable to reduce the profile of the footrest relative to the wheel assembly. Finally, the wheel assembly may include other accessories, such as, for example, a fender or mud-flap (78) mounted about the wheel (70) to decrease water or other debris from being splattered against the rider during operation. Although the motor or other propulsion means may be distributed across the vehicle and interconnected via suitable drive interconnections, in many embodiments the vehicle propulsion mechanism (not shown) may be disposed within the wheel assembly, such as within the hub (79) of the wheel (70) to provide motive force to the vehicle. In many such embodiments the propulsion mechanism may include an electric motor disposed within the hub of the wheel (79) of the wheel assembly (13) and electrically interconnected with the energy storage elements disposed elsewhere in the vehicle.

Figure 5A:
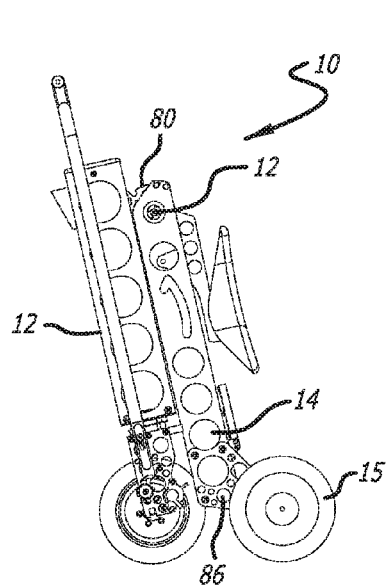
FIGS. 5a and 5b show side views of a foldable electric vehicle in a compact folded configuration (5a), and an open riding configuration (5b) in accordance with embodiments of the invention.
Figure 5B:
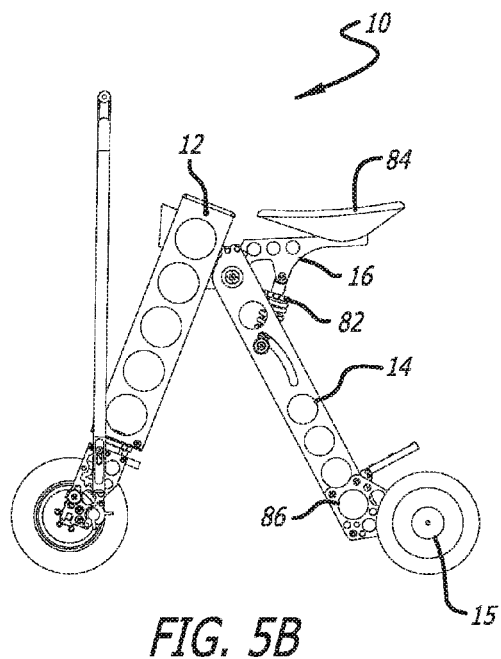

Examining now the rear wheel-bearing structural member, FIGS. 5a to 5f provide views of embodiments of the vehicle (10) and the rear wheel-bearing structural member (14). As shown in FIGS. 5a and 5b, in many embodiments the vehicle (10) comprises a rear wheel-bearing structural member (14) having a seat-bearing assembly (16) interconnected therewith. In such embodiments, the rear wheel-bearing structural member (14) and seat-bearing structural members (16) are both pivotally interconnected at a first end (80) with the front wheel-bearing assembly (12) via a pivot hinge assembly (18) about which both of the wheel-bearing structural structural members and the seat-bearing post may all pivot relative to each other. The seat-bearing structural member (16) in some such embodiments may be further interconnected with the rear wheel-bearing structural member (14) through a fourth structural member referred to herein as a or seat support element (82) to provide further weight-bearing support to the seating platform (84) of the seat-bearing structural member during operation of the vehicle. The rear wheel-bearing structural member (14) further comprises a rear wheel assembly (15) at a second end (86) distal from the pivot hinge assembly (18), as will be described in greater detail below.

Figure 5C:
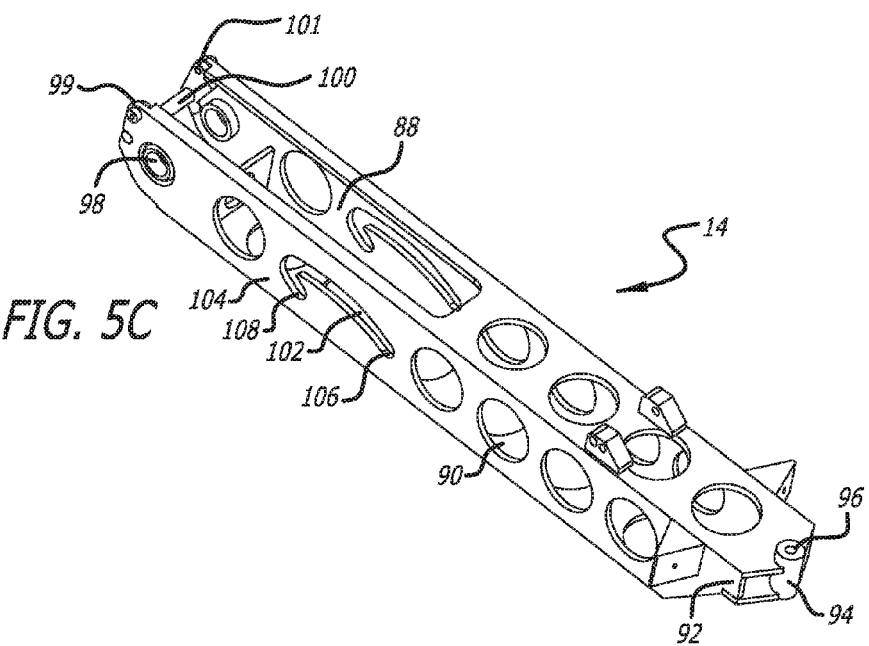
FIG. 5c provides a perspective view of a rear structural structural member in accordance with embodiments of the invention.

Turning now to the construction of the rear wheel-bearing assembly (14), as shown in FIG. 5c, in many embodiments the rear wheel-bearing structural member is formed of an elongated body that may be made hollow such that the body defines an interior volume (88). The structural member (14) may be formed from any material suitable to provide sufficient structural support to the vehicle, such as, for example, a metal, composite, or polymer. In many embodiments, as shown in FIG. 5c, the weight of the rear wheel-bearing structural member (14) may be lightened by including fenestrations (90) along the body thereof. Although certain fenestrations are shown in the figures, the number and configuration of such fenestrations may take any geometry or shape suitable to lighten the structural member while maintaining the structural integrity of the structural member.

As further shown in FIGS. 5a to 5c, in many embodiments, the rear wheel-bearing structural member (14) may comprise, at its lower end (92), an interconnection point (94) such that a wheel assembly may be interconnected therewith. In some such embodiments, such an interconnection may comprise a pivot point (96) such that the wheel assembly may pivot relative to the rear wheel-bearing assembly, as will be described in greater detail below.

In many embodiments, as shown in FIGS. 5a to 5c, the rear wheel-bearing structural member (14) may further comprise a rear main pivot hinge bracket (98) disposed along its length and configured such that the rear main pivot hinge bracket may be cooperatively coupled with the main pivot hinge brackets on the other structural members (12 and 16) to combine to form the vehicle main pivot hinge (18) to allow the rear wheel-bearing structural member (14) to pivot relative to the other structural members (12 and 16) that form the structure of the vehicle. Such a rear main pivot hinge bracket (98) may also comprise a locking mechanism (99) configured to engage a cooperative locking mechanism on one or more of the other structural members (12 and 16) of the vehicle to prevent unintended movement of the structural members relative to one another. In some embodiments, as shown in FIG. 5c, the locking mechanism (99)

may comprise a movable pin (100) and structural member (101) configured to engage cooperative locking grooves on the rear wheel-bearing structural member (103), front wheel-bearing structural member and cooperative locking portions on the seat-bearing structural member, as will be described in greater detail below.

In many embodiments the rear wheel-bearing structural member (14) also comprises a seat-bearing structural member support groove (102) configured to cooperatively and slidingly engage the seat-bearing structural member support (82). In some embodiments, as shown in FIG. 5*c*, the seat-bearing structural member support groove (102) delineates a curved path along which the seat-bearing structural member support (82) may slidingly travel between a first position (104) at which the seat-bearing structural member (16) is locked into a riding position where the seat-bearing structural member is extended outward away from the rear wheel-bearing structural member, and a second position (106) at which the seat-bearing structural member is locked into a compact position where the seat-bearing structural member is folded against or flush with the rear wheel-bearing structural member. In some such embodiments, the path includes locking positions, formed for example of notches (108) at either end of the groove (102) where the riding position is engaged when the supporting member is locked into position in the slot higher up along the structural structural member (104), and where the compacted position is engaged when the supporting member is locked into position in the slot lower down along the structural structural member (106). As will be discussed in greater detail below, the seat-bearing structural member support (82) may be formed of a resilient member (125), and configured such that when said seat-bearing structural member (16) is pivoted into the locking position (106) of the groove (102) the resilient member is placed into tension such that a resilient locking force is applied to lock the seat-bearing structural member into position against the adjacent wheel-bearing structural member. In addition, although not shown, in some embodiments a resilient spring may be provided to restrain the seat-bearing structural member support within the groove and notches and to assist in directing it along the groove during operation.

Although not shown, other accessories may be included with the rear wheel-bearing structural member, including lights, charging connections, personal electronic docking connections, luggage racks, etc. Although the energy storage and vehicle propulsion systems may be distributed across the various structural members and elements of the vehicle, in many embodiments the energy storage elements, such as, for example, one or more batteries may be disposed within the internal volume (88) of the rear wheel-bearing structural member along with any required electronics, electric interconnections, etc. necessary for the operation of the electric vehicle.

Figure 6A:
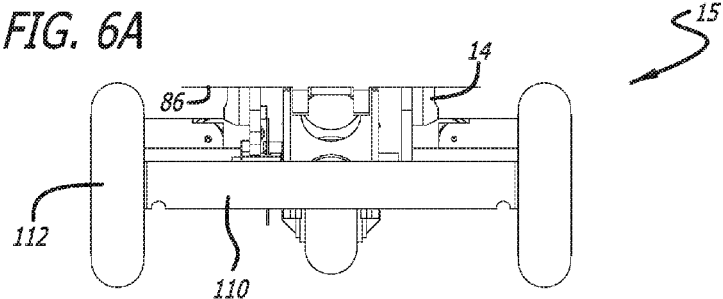
FIGS. 6a to 6d provide views of exemplary rear wheel assemblies and components in accordance with embodiments of the invention.
Figure 6B:
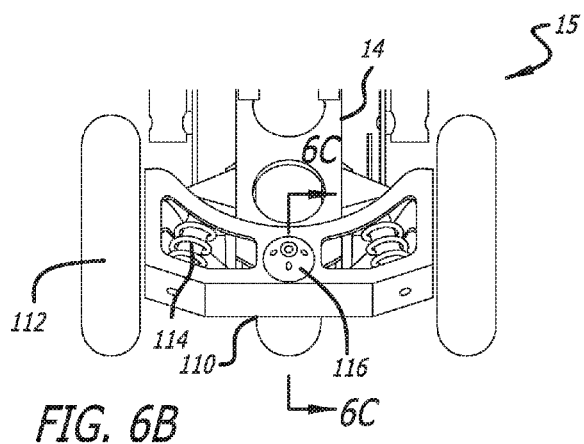
Figure 6C:
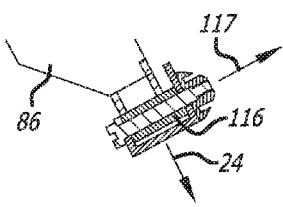
Figure 6D:
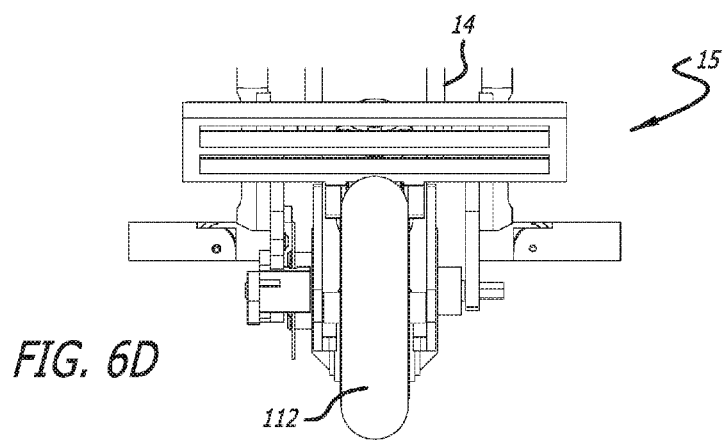
Figure 8A:
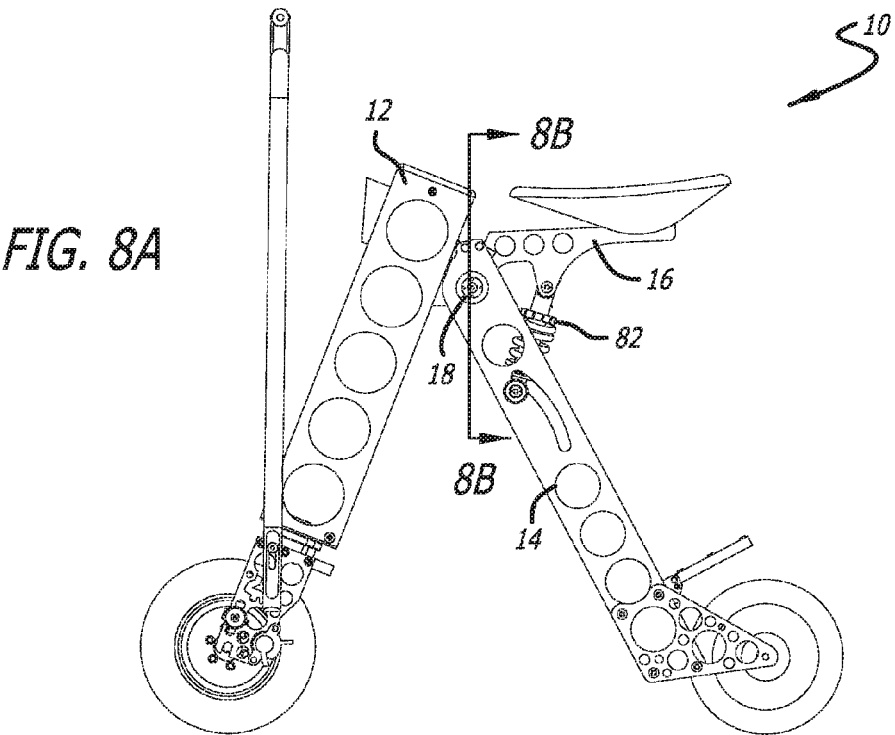
Figure 8B:
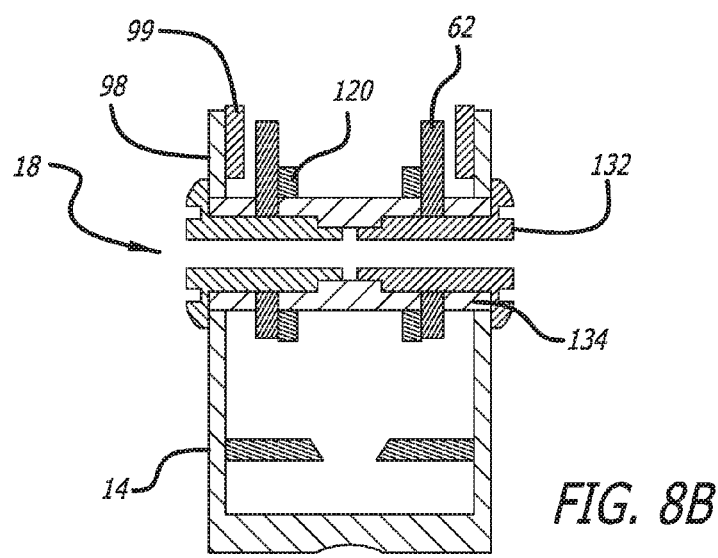
Figure 9A:
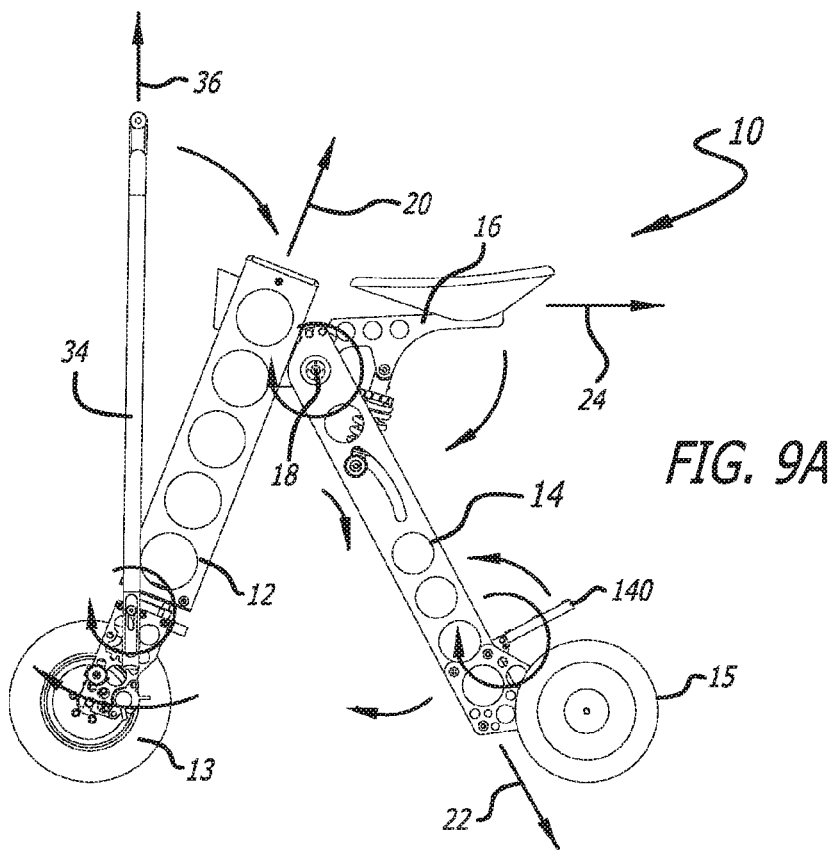
FIGS. 9a and 9b provide side views of a three-wheeled foldable electric vehicle in an open riding configuration (9a), and a compact folded configuration (9b) in accordance with embodiments of the invention.
Figure 9B:
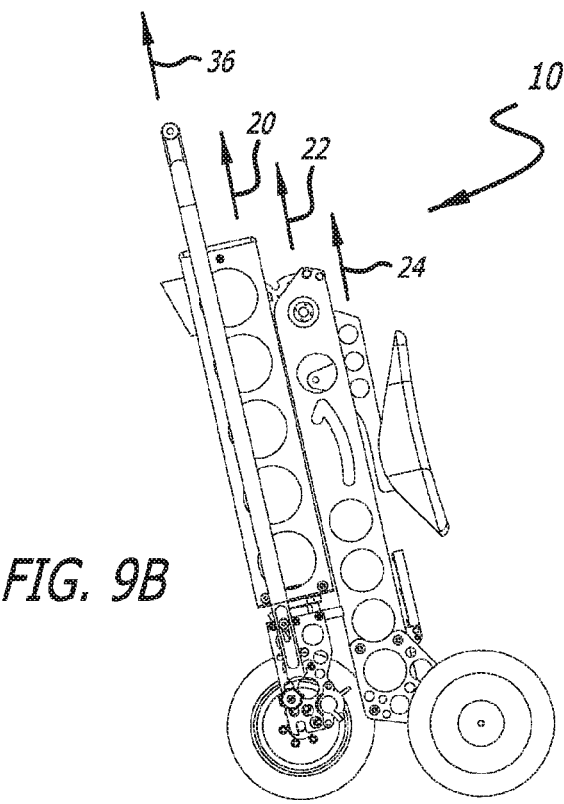
Figure 9C:
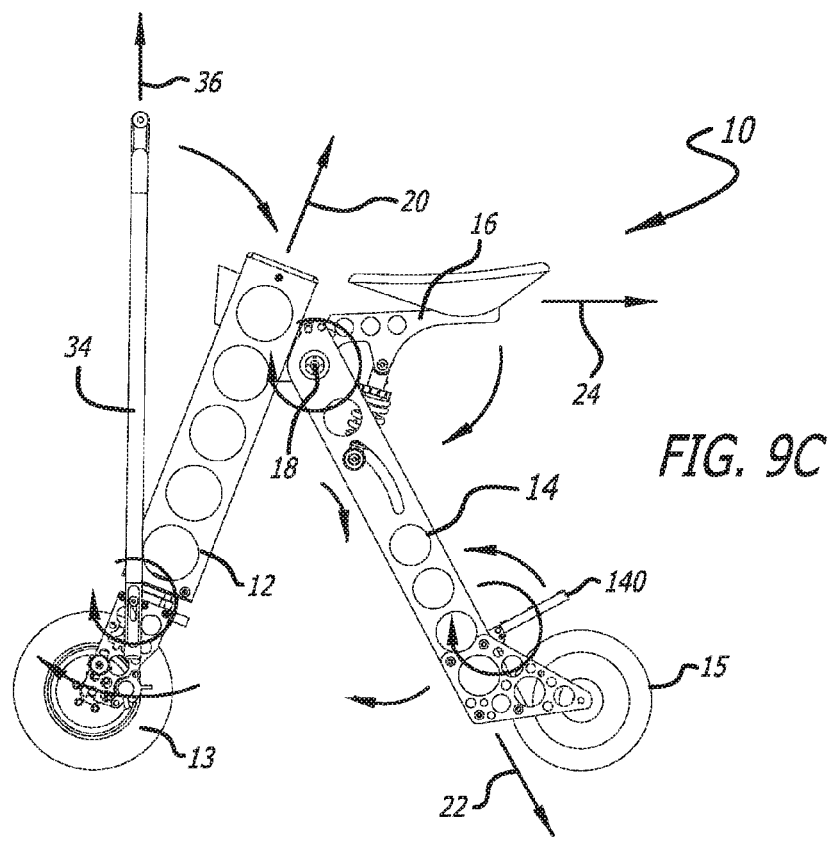
FIGS. 9c and 9d provide side views of a two-wheeled foldable electric vehicle in an open riding configuration (9c), and a compact folded configuration (9d) in accordance with embodiments of the invention.
Figure 9D:
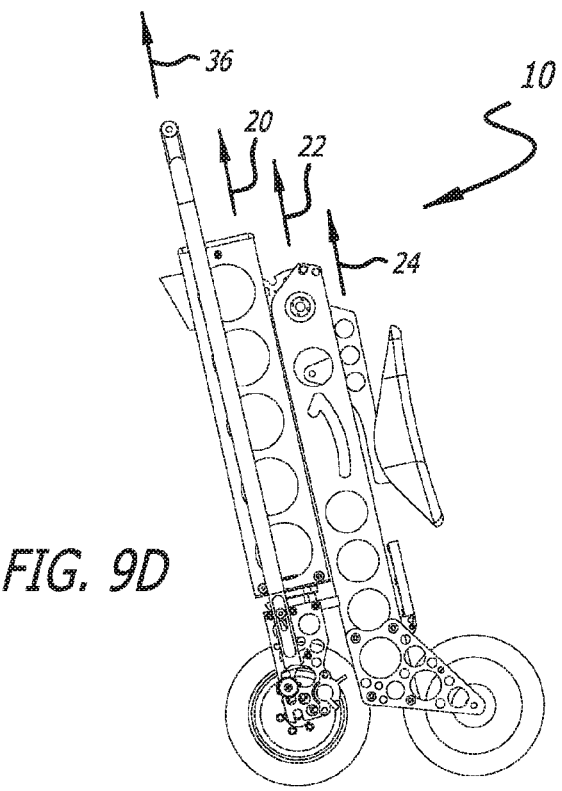

As described above a rear wheel assembly (15) is mounted to the lower end (86) of the rear wheel-bearing structural member (14). As shown in FIGS. 6*a* to 6*d*, this rear wheel assembly may comprise one or multiple wheels in accordance with embodiments of the vehicle. In many embodiments the rear wheel assembly (15) comprises an axle (110) fixedly attached at the lower end (86) of the rear wheel-bearing structural member (14). In some embodiments this fixed axle may comprise a plurality of wheels (112) as shown in FIG. 6*a*, or a single wheel as shown in FIG. 6*d*. In some embodiments the rear wheel assembly (15) may include resilient members (114), such as shock absorbing springs, to provide a shock dampening to the vehicle. In some such embodiments, the wheels of the rear wheel assembly may also be affixed to the rear wheel-bearing structural member (14) in a configuration that would allow the wheels to move relative to the rear wheel-bearing structural member. In one such embodiment, illustrated in FIGS. 6*b* and 6*c*, the rear wheel assembly (15) is pivotally interconnected to the rear wheel-bearing structural member (14) via a rear wheel pivot hinge (116) such that the wheels (112) of the rear wheel assembly are pivotable about a horizontal axis (117) perpendicular to the axis (24) of the rear structural member such that the rider of the vehicle is capable of steering the vehicle by leaning in the desired direction of the turn. (A cross section of such a pivotable interconnection is shown in FIG. 6*c*. This is cross-section AL of FIG. 6*b*.)

Finally, it will be understood that in many embodiments the either the front or rear wheel assemblies may be configured as a removable and/or interchangeable structure, such that the wheels of the vehicle may be removed and the vehicle can be reconfigured between a single or dual-wheel design as desired by the user. This interchangeability can be accomplished by interconnecting one or both of the front or rear wheel assemblies (whether single or dual wheel design) via removable bolts, or a quick-connect attachment, such as, for example, a spring-loaded pin, latch, or other coupling. In embodiments where a two-wheel vehicle design is desired, the vehicle may further include a kickstand or otherwise retractable support, such that the vehicle may stand when unattended by the user.

Examining now the seat-bearing structural member, FIGS. 7*a* and 7*b* provide perspective views of the seat-bearing structural member (16) and the seat-bearing structural member support (82), respectively. As shown in FIG. 7*a*, in many embodiments the seat-bearing structural member (16) generally comprises an elongated structural member having at one end (118) a seat main pivot hinge bracket (120) and a seating platform (84) at an opposite end thereof. In some embodiments the seat main pivot hinge bracket (120) is configured to cooperatively interconnect with the main pivot hinge brackets of the front and rear wheel-bearing structural members (12 and 14) to form the main vehicle hinge pivot (18) to allow the seat-bearing structural member (16) to pivot relative to the other structural members (12 and 14) that form the structure of the vehicle. Such a seat pivot hinge bracket (120) may also comprise a locking mechanism configured to engage a cooperative locking mechanism on one or more of the other structural members (12 and 16) of the vehicle to prevent unintended movement of the structural members relative to one another. In some embodiments, as shown in FIG. 7*a*, the locking mechanism may comprise a movable lock disengagement pin (122) configured to engage cooperative locking structural members on the rear wheel-bearing structural member such that the engagement and disengagement of the locking mechanism is activated by manipulating the seat-bearing structural member, as will be described in greater detail below.

In many embodiments, the seat-bearing structural member (16) also comprises a seat-bearing structural member support bracket (124) for pivotally interconnecting the seat-bearing structural member with a seat-bearing structural member structural member (82). In some embodiments the seat-bearing structural member structural member may be formed of a resilient member (125), such as, for example, a shock absorber, as shown in FIG. 7*b*. In such embodiments, the resilient seat-bearing structural member supporting member (82) is pivotally interconnected with the seat-bearing structural member (16) at one end through a seat-bearing support pin (126) (or other suitable cooperative pivotable interconnection element), and slidingly interconnected with the rear wheel-bearing structural member (14) at its second end through a sliding pin (128) (or other suitable cooperative sliding interconnection element), to form a triangulated support structure that cantilevers the seat-bearing structural member (16) into a riding position in the open/riding configuration of the vehicle to dampens the shocks or bumps of the road such that the rider experiences a smoother ride. In addition, as will be discussed in greater detail below, the resilient member (125) of the seat-bearing structural member support (82) may also be configured such that when said seat-bearing structural member (16) is pivoted into the locking position the resilient member is placed into tension such that a resilient locking force is applied to lock the seat-bearing structural member into position against the adjacent wheel-bearing structural member.

The front wheel-bearing structural member (16) may also comprise certain accessories, such as, for example, lights, charging connections, personal electronic docking connections, (not shown), etc. Although the energy storage and vehicle propulsion systems may be distributed across the various structural members and elements of the vehicle, in many embodiments the energy storage elements, such as, for example, one or more batteries may be disposed within the internal volume (130) of the front wheel-bearing structural member along with any required electronics, electric interconnections, etc. necessary for the operation of the electric vehicle. The structural member may be formed from any material suitable to provide sufficient structural support to the vehicle, such as, for example, a metal, composite, or polymer. Although not shown, in many embodiments the weight of the front wheel-bearing structural member may be lightened by including fenestrations along the elongated body thereof. Any number and configuration of such fenestrations may take any geometry or shape suitable to lighten the structural member while maintaining the structural integrity of the structural member. The position of the seat-bearing structural member (16) and/or the seat platform (84) may be adjustable relative to the remainder of the vehicle. In such embodiments adjustments might include height relative to the ground, distance relative to the handlebars, angle relative to the main vehicle pivot hinge (18), etc. Although one embodiment of a seating platform (84) comprising a bicycle-style seat is shown in FIG. 7a, it will be understood that the riding platform may take any form, style or shape suitable to support a rider.

As shown in FIGS. 8a to 8e, in many embodiments the vehicle (10) includes a main vehicle pivot hinge assembly (18) about which both of the wheel-bearing structural structural members (12 and 14) and the seat-bearing (16) structural members are pivotally connected. In addition, the seat-bearing structural member support (82) may also be configured such that when said seat-bearing structural member (16) is pivoted into the locking position the resilient member is placed into tension such that a resilient locking force is applied to lock the seat-bearing structural member into position against the adjacent wheel-bearing structural member.

As shown in detail in FIGS. 8b to 8e, each of the structural members includes a cooperative pivot hinge bracket (62, 98 and 120), each of which engage and pivot about a main pivot pin (132). An exemplary embodiment of the assembly of these elements into the main vehicle pivot hinge assembly (18) is shown in cross-section in FIG. 8b. As shown, in many embodiments the cooperative pivot hinge brackets are disposed in a nested arrangement forming a hollow pivot passage (134), wherein the seat pivot hinge bracket (120) forms the innermost element, the rear pivot hinge bracket (98) the outermost element, and the front pivot hinge bracket (62) is disposed therebetween, although this configuration may be reordered without effecting the operation or function of the folding function of the vehicle. The main pivot pin (132) is inserted through the hollow pivot passage (134) to interconnect the three structural members in a pivotable arrangement.

In many embodiments, as will be described in relation to FIGS. 8c to 8e, the main vehicle pivot hinge assembly (18) may further comprise a cooperative locking mechanism configured to be moved between a first locking position where the vehicle, including structural structural member and seat-bearing post, are disposed and secured in the open/riding position, and a second locking position where the vehicle is disposed and secured in the closed/compacted position. Although such a cooperative locking mechanism may take any suitable form, in some embodiments, as shown in the figures, the mechanism may take the form of a pin and groove arrangement. In one such embodiment, a pivotable structural member (100) and pin (101) disposed in association with the rear pivot hinge bracket (98) is configured to disengage and engage locking grooves (64) formed into the seat pivot hinge bracket (62) through the action of seat lock disengagement pin (122) disposed on the seat-bearing structural member (16) such that the structural members (12 and 14) are prevented from pivoting in relation to each other while the pin (101) is engaged in one of the locking grooves (64). As shown, two positions are described (64a and 64b). As will be described in greater detail below, in embodiments the locking pin (101) is disengaged from the open/riding position (groove 64a) and the closed/compacted position (groove 64b) by pulling up on the seat-bearing structural member (16) such that disengagement pin (122) engages structural member (100), thereby lifting pin (101) out of groove (64). In some such embodiments, the locking pin (101) moves between the locking positions (64a and 64b) by sliding along the top edge (136) of the rear pivot hinge assembly (62). Again, it should be understood that although a specific arrangement of cooperative locking elements are described, any suitable locking mechanism and arrangement of elements may be provided. In many embodiments, such locking mechanisms and arrangements are configured such that the locking mechanism is disengaged by lifting the seat-bearing structural member. Likewise, although only two locking positions are described above, it will be understood that intermediary locking positions may be defined such that desirable vehicle configurations may be stably formed.

FIGS. 9a to 9d provide schematics showing the movement (arrows) of the various elements of the vehicle (10) relative to one another. As shown, in addition to the wheel and seat-bearing structural members (12, 14 & 16), other elements of the vehicle may be provided which cooperate in forming the open and compacted forms of the vehicle, including steering mechanism (34), in which the axis (36) of the handlebars may be pivoted between a position having an angular offset (38) from the axis (20) of the front wheel-bearing structural member (12), and a position where the axis of the handlebars is parallel to the axis of the front wheel-bearing structural member. The seat-bearing structural member (16), which may also be configured such that when said seat-bearing structural member support (82) is pivoted into the locking position the resilient member (125) is placed into tension (as shown by arrows in FIGS. 9b and 9d) such that a resilient locking force is applied to lock the seat-bearing structural member into position against the adjacent wheel-bearing structural member. Additionally, a storage rack (140) or other similar accessories could be provided that would be pivotable between an open position where a platform is provided suitable for holding objects, and a compacted position where the platform is folded against the body of the vehicle. It should be understood that though the luggage rack is shown disposed on the rear wheel-bearing structural member, a similar structure could be disposed on other portions of the vehicle.

Turning now to the operation of the folding mechanism of the electric vehicle (10), as described above, and as will be discussed in relation to FIGS. 10*a* to 10*k*, in many embodiments the two wheel-bearing structural members (12 and 14), and the seat-bearing structural member (16) of the vehicle (10) are all pivotally interconnected at the same pivot point (18) such that a single folding mechanism operates to moveably reposition all the structural members of the vehicle cooperatively. As shown, in many embodiments the folding mechanism comprises a central hinge pin (18) about which each of the structural members (12, 14 and 16) are pivotally interconnected. A locking mechanism (99) comprising, in many embodiments, a pin and groove arrangement, disposed at the proximal end of the rear wheel-bearing structural member (14) may also be provided to lock the structural members of the vehicle into open and compact configurations. In many such embodiments the locking mechanism (99) is disengaged by manipulating the seat-bearing structural member (16), such as, for example, by lifting upward on the structural member.

Figure 10A:
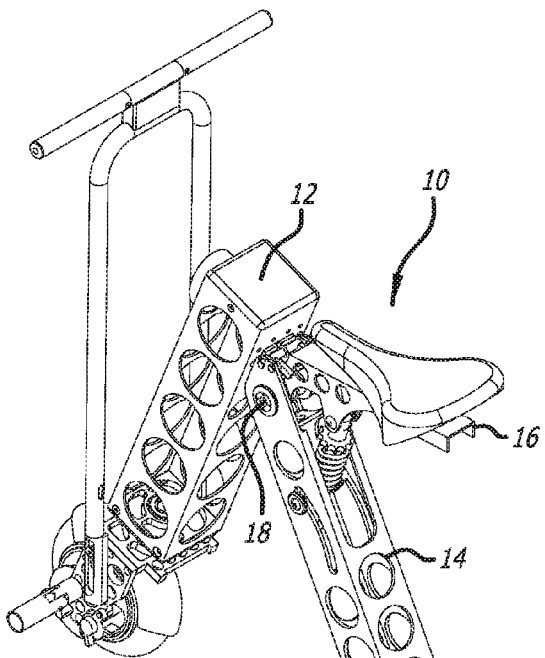
Figure 10B:
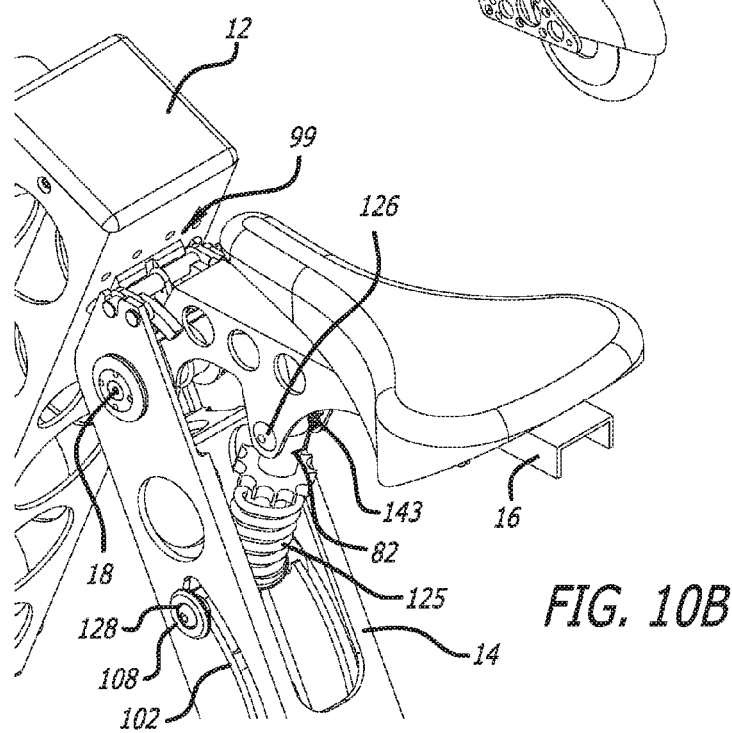

As shown in FIGS. 10*a* and 10*b*, in many embodiments the seat-bearing structural member (16) may also be pivotally connected with a resilient supporting member (82), such as, for example, a shock absorber to form a triangulated support structure that cantilevers the seat post into a riding position and dampens the shocks or bumps of the road such that the rider experiences a smoother ride. In such embodiments, the resilient supporting member may be pivotally interconnected (126) with the seat structural member (16) at one end, such as, for example, via a pivot pin, and slidingly interconnected (128) with the rear wheel-bearing structural member (14) at its second end. In such embodiments, the resilient supporting member (82) may slide within a channel or slot (102) formed into the rear wheel-bearing structural member between upper (108) and lower (106) locking positions.

Figure 10C:
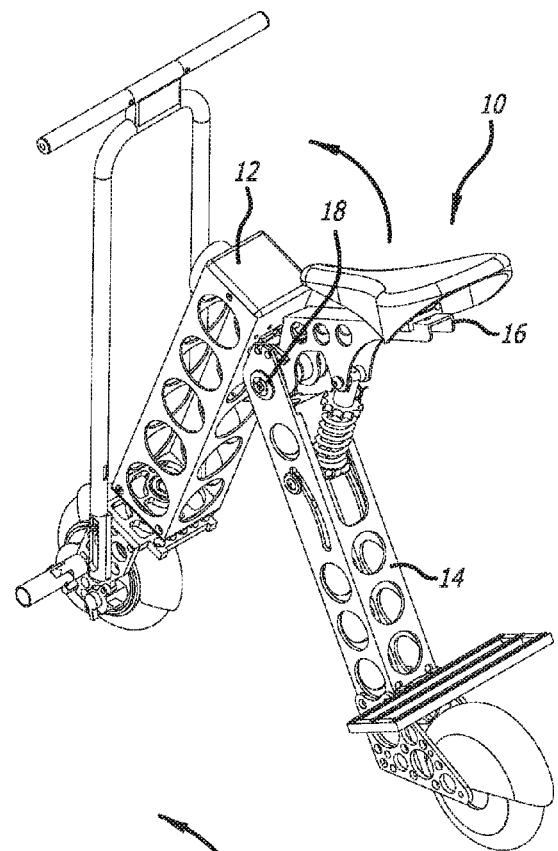
Figure 10D:
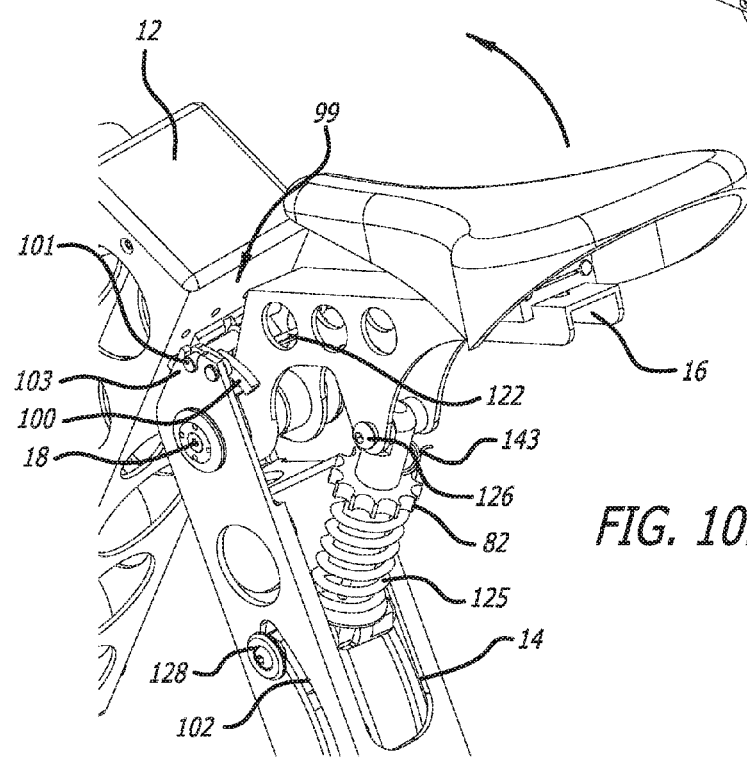
Figure 10E:
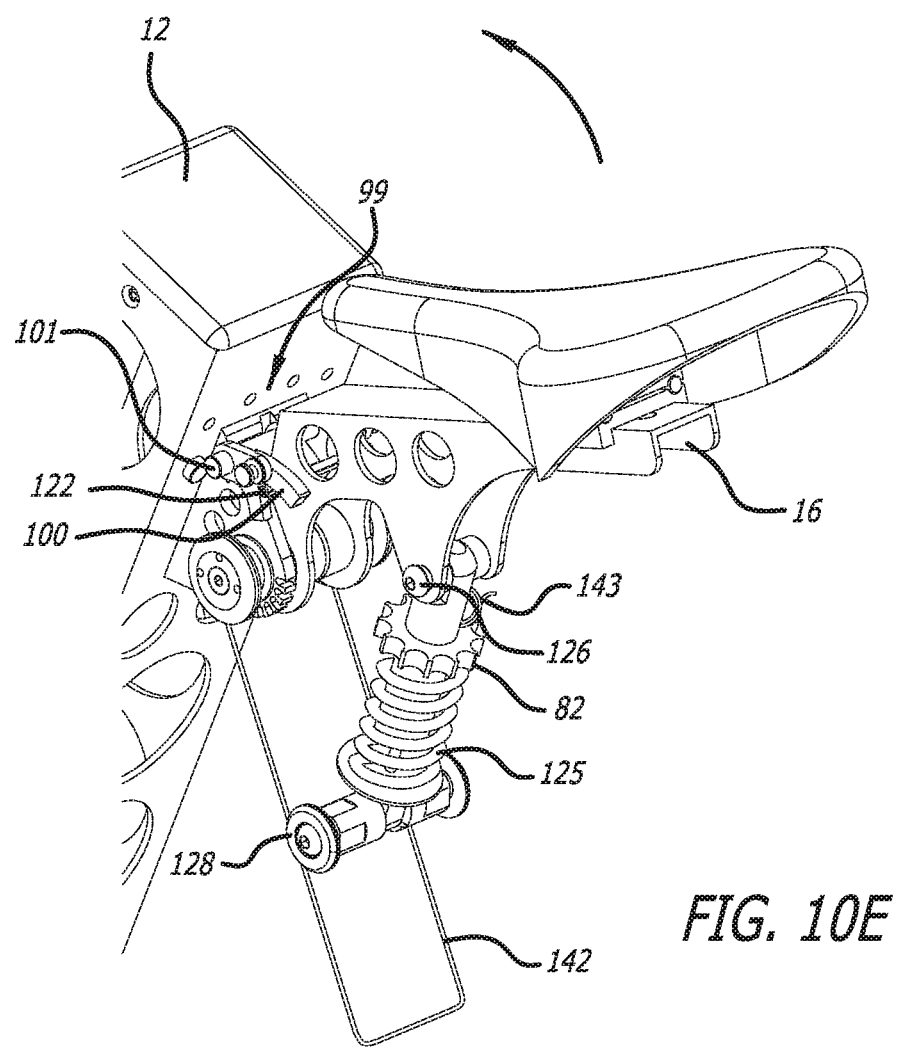

During operation of some embodiments, the locking mechanism (99) is disengaged from both the open/riding position and the closed/compacted position by pulling up on the seat-bearing post (16), as shown in FIGS. 10*c* to 10*e*. In some such embodiments, the locking mechanism (99) includes a pin and groove mechanism, wherein the seat lock disengagement pin (122) of the seat-bearing structural member (16) engages the structural member (100) on the rear locking mechanism to lift the rear locking pin (101) out of engagement with the locking grooves (64 and 103, not shown) on the front and rear structural members to allow the structural members to move between the locking positions. In addition, in some embodiments the sliding interconnection (128) on the seat-bearing support (82) is lifted free of notch (108) on the locking groove (102) to allow the sliding interconnection to slide along groove (102). In addition, in some embodiments a resilient spring (142) may be provided to apply a resilient guiding force to the sliding interconnection (128) of the seat-bearing structural member support within the groove (102) and notches (106 and 108), thereby assisting in directing it along the groove during operation, thereby advancing the movement and operation of the folding mechanism of the vehicle.

Figure 10F:
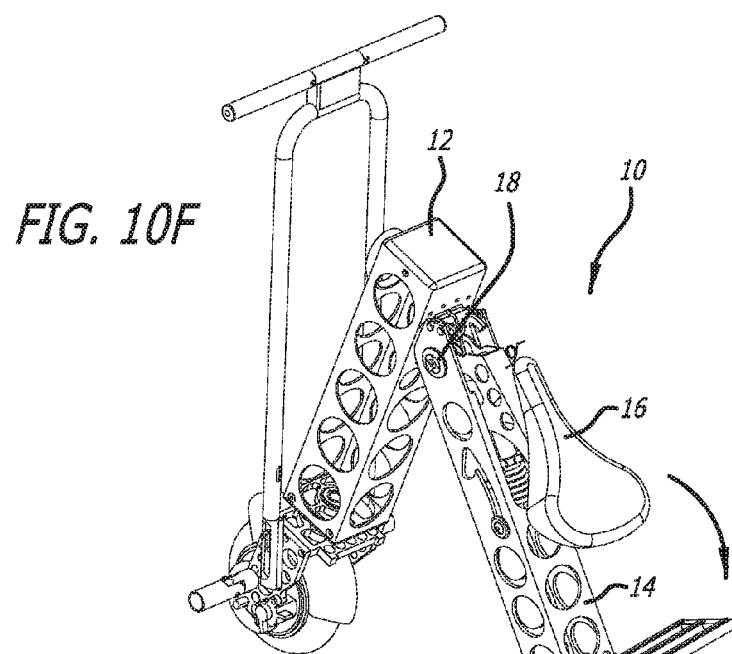
Figure 10G:
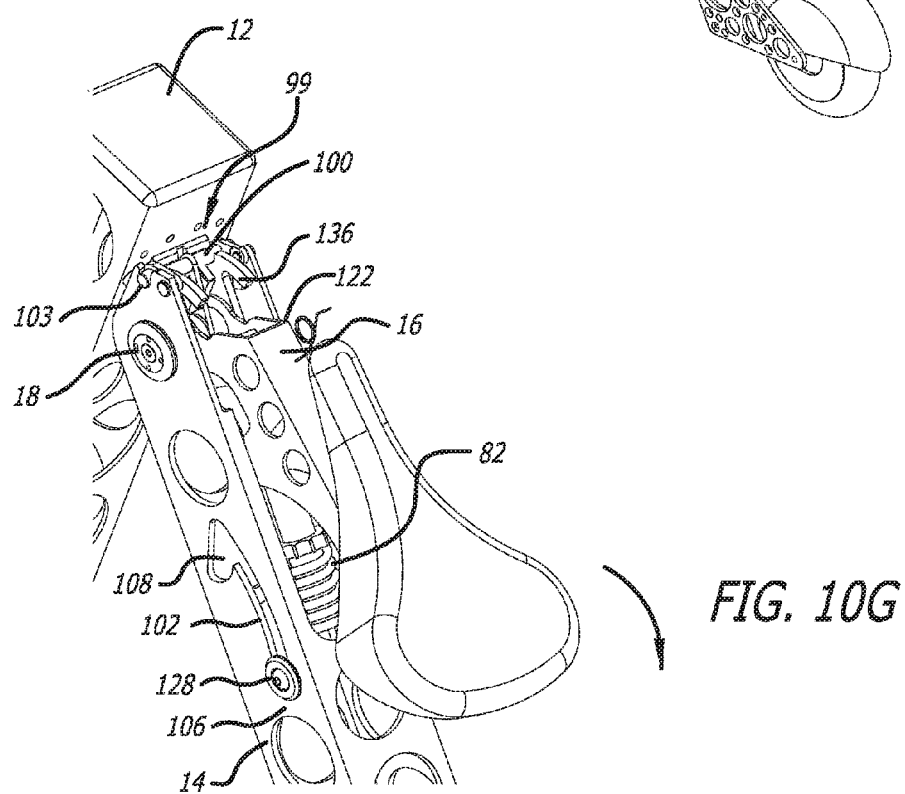
Figure 10H:
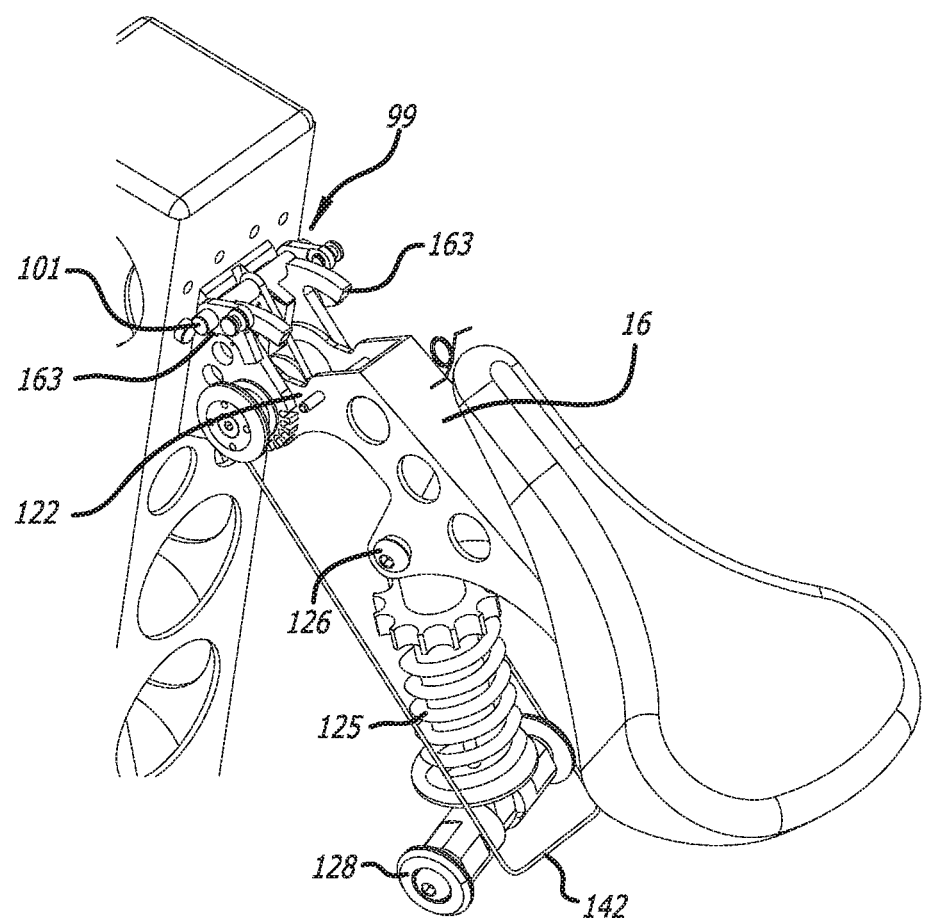

As shown in FIGS. 10*f* to 10*h*, once the locking mechanism (99) and the seat-bearing support (82) are disengaged by raising the seat up, the structural members may be pivoted from the open configuration to the closed configuration. In some embodiments, as the structural members (12, 14 and 16) pivot downward (as indicated by the arrow) the locking pin (101) slides along the top edge (136) of the front pivot hinge bracket (62). Likewise, in many embodiments, the resilient supporting member (82) slides within locking channel or slot (102) formed into the rear wheel-bearing structural member (14), said channel or slot delineating a path between closed and open positions of the mechanism.

As shown in FIGS. 10*i* to 10*k*, once the structural members reach their terminus in the closed/compact configuration wherein the structural members are adjacent in a roughly parallel alignment, the locking mechanism (99) reengages to lock the wheel-bearing structural members into the closed configuration. In particular, as shown in the figures, in many embodiments the seat locking pin (122) disengages the structural member (100) allowing the rear locking pin (101) to engage the second locking groove (64*b*) on the front pivot hinge bracket (62), as shown in FIG. 10*k*. The pin (101) also reengages the rear locking groove (103) on the rear wheel-bearing structural member (14) thereby locking the front and rear wheel-bearing structural members in the closed configuration where the axes of the structural members are roughly parallel such that a compact form is obtained. The seat-bearing structural member support element (82), may also be configured such that when said seat-bearing structural member (16) is pivoted into the locking position (106) along the locking groove (102), the resilient member (125) is placed into tension (as shown by arrows in FIG. 10*j*) such that a resilient locking force is applied to lock the seat-bearing structural member into position against the adjacent wheel-bearing structural member. In addition, in some embodiments a resilient spring (143) may be provided in association with the pivoting interconnection (126) to apply a resilient guiding force to the pivoting interconnection of the seat-bearing structural member support (82) thereby assisting in locking the seat-bearing structural member support into a closed position within the body of the rear wheel-bearing structural member (14) and, in turn, the seat-bearing structural member into a closed position against the adjacent rear wheel-bearing structural member (14) during a folding operation.

It should be understood that although the illustrated embodiments show specific configurations of locking mechanisms, including particular geometries, dispositions and configurations of pins, channels, grooves, notches, etc. that these elements could be modified substantially while maintaining the functionality of the vehicle folding mechanism such that a single cooperative pivot point and locking mechanism is provided capable of being engaged and operated to simultaneously folding the structural members of the vehicle from an open/riding position such that the seat is extended outward away from the structural structural member, and a second/closed position at which the seat is locked into a compact position where the seat is folded against or flush with the second structural structural member, via the manipulation of one of the structural members of the vehicle, such as, for example, the seat-bearing structural member.

Figure 11A:
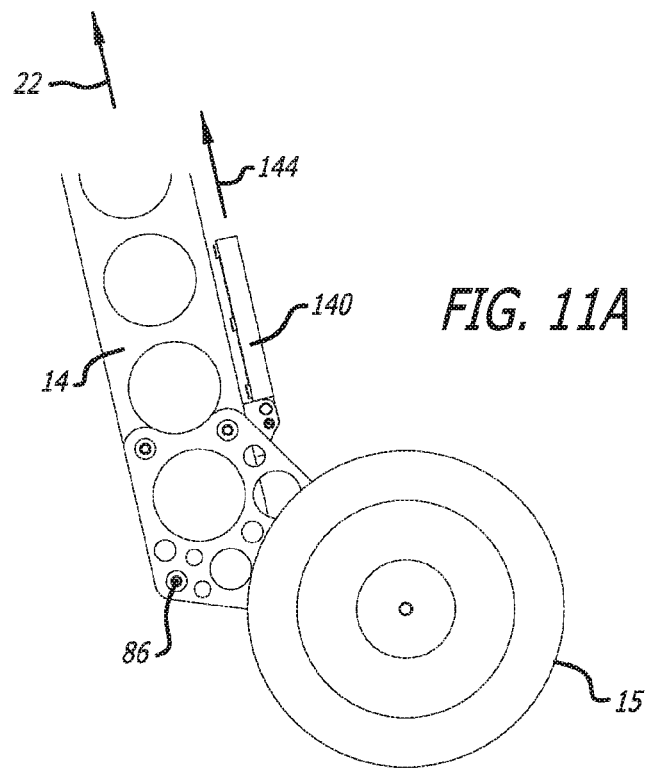
FIGS. 11a and 11b show side views of a foldable electric vehicle and the rear foldable luggage rack in a compact folded configuration (11a), and an open riding configuration (11b) in accordance with embodiments of the invention.
Figure 11B:
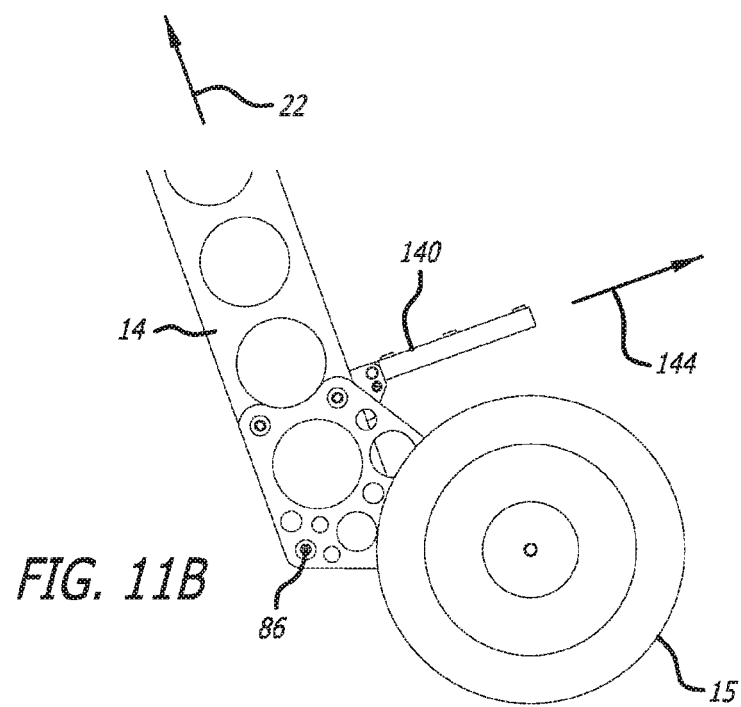

An optional element that may be provided on the vehicle (10) is a luggage rack (140). In many embodiments, the luggage rack comprises an elongated platform that may be disposed in any suitable location on the vehicle. In some embodiments, as shown in FIGS. 11a and 11b, the luggage rack (140) may be disposed along the length of the rear wheel-bearing structural member (in many embodiments at the lower end (86) of the structural member (14). Such a rack, in many embodiments may also be configured such that it is repositionable between open and compact configurations. In some embodiments the luggage rack may be pivotable between a closed position (shown in FIG. 11a) where the luggage rack is folded against the rear wheel-bearing structural member, and an open position (shown in FIG. 11b) where the luggage rack forms a platform suitable for the support of objects placed thereon, such an action may be mechanically coupled to the folding of the structural members or may be independently actuated. In some such embodiments, the position of the luggage rack (140) relative to the rear wheel-bearing structural member (14) may be defined by the axis (144) of the luggage rack. In one such embodiment, in the open position (11b) the axis (144) of the luggage rack forms an angle relative to the axis (22) of the rear wheel-bearing structural member, while in the closed position (11a) the axis of the luggage rack is substantially parallel to the axis of the rear wheel-bearing structural member. It should be understood that, although the luggage rack (140) is disposed on the rear wheel-bearing structural member (14) of the vehicle, it may be positioned anywhere along the vehicle such a suitable object supporting platform may be formed.

Figure 12:
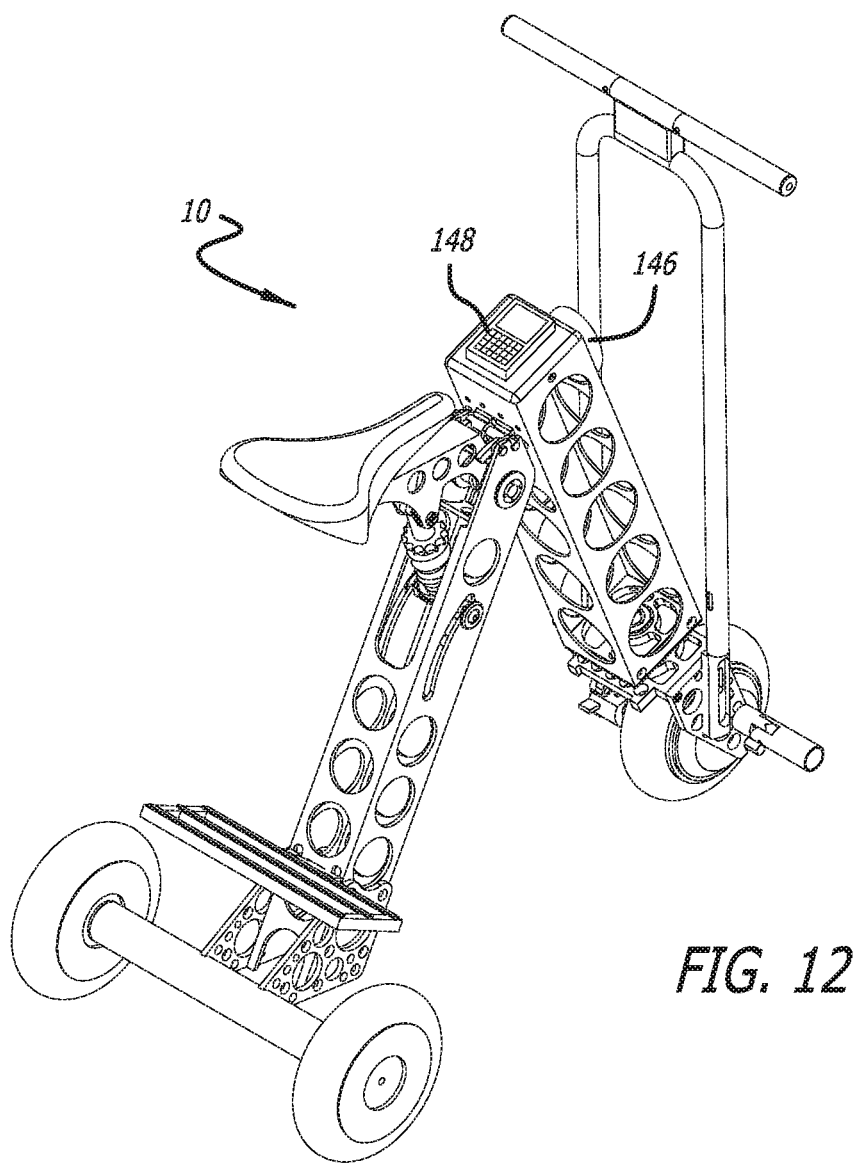
FIG. 12 provides a perspective view of a foldable electric vehicle having a personal electronic device docking station in accordance with embodiments of the invention.

In still other embodiments, as shown in FIG. 12, the vehicle (10) may include other electrical components including lights (146) and interconnections for accessories (148), such as, for example, mobile handsets or other personal electronics. The electronics interconnection may be disposed anywhere on the vehicle suitable for use. In some embodiments the electronics interconnection is place in signal communication with at least one sensor configured to deliver information on at least one vehicle parameter and deliver information from the at least one sensor to the personal electronic device. In some such embodiments the at least one vehicle parameter is selected from the group consisting of vehicle speed, energy consumption, energy reserve, mileage, and direction.

Figure 13A:
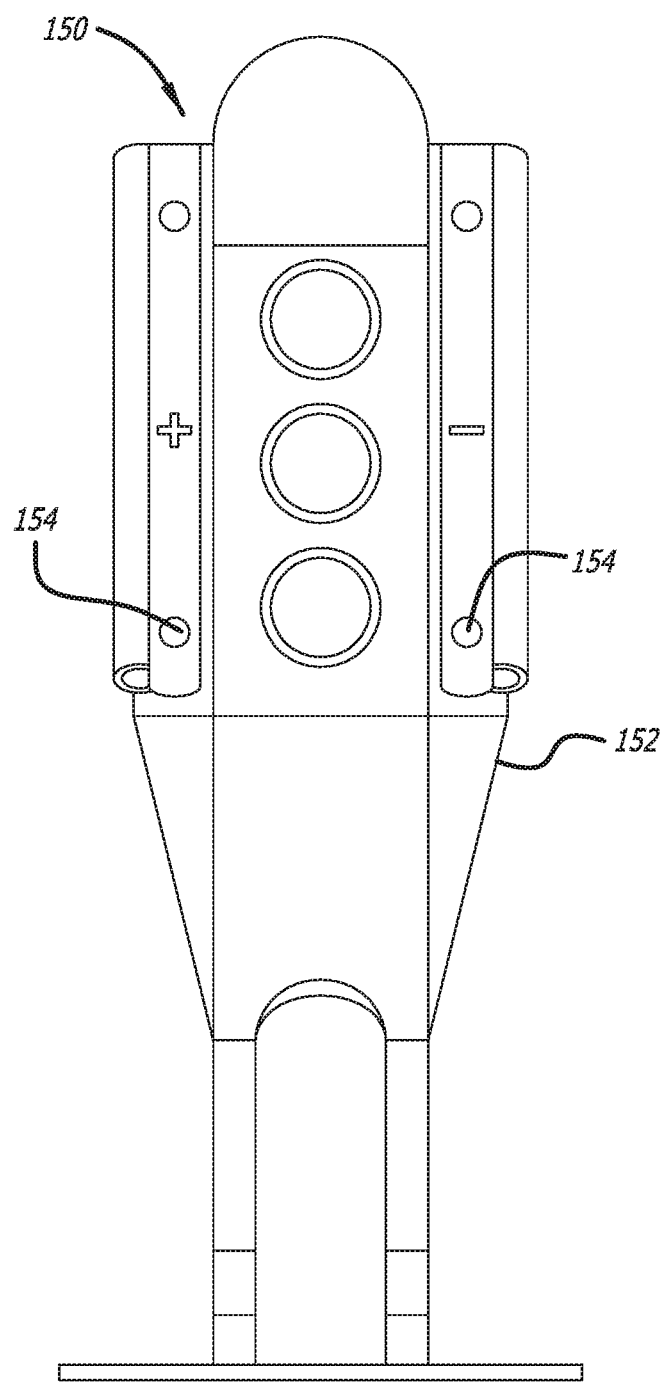
Figure 14A:
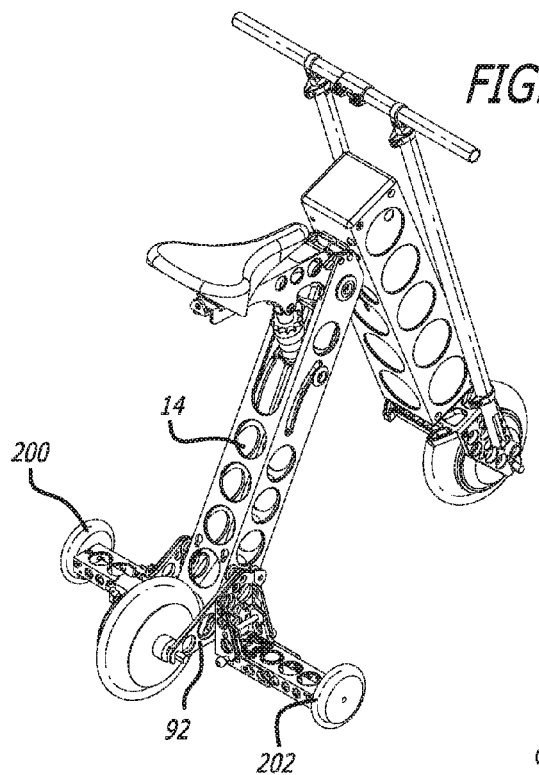
Figure 14B:
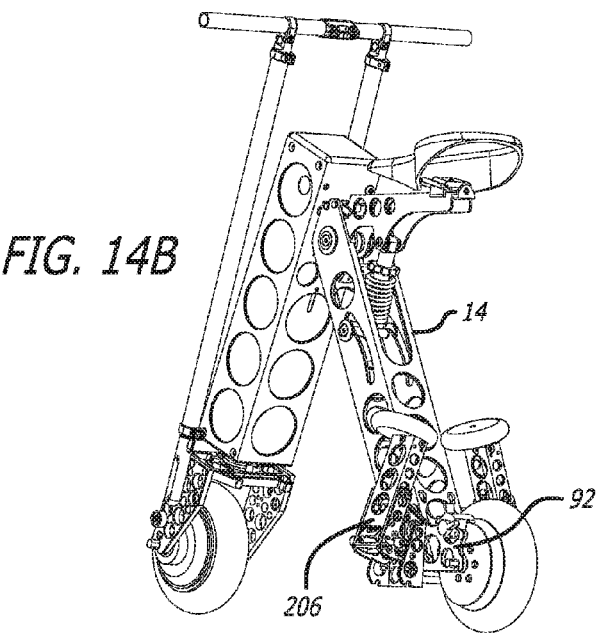
Figure 14C:
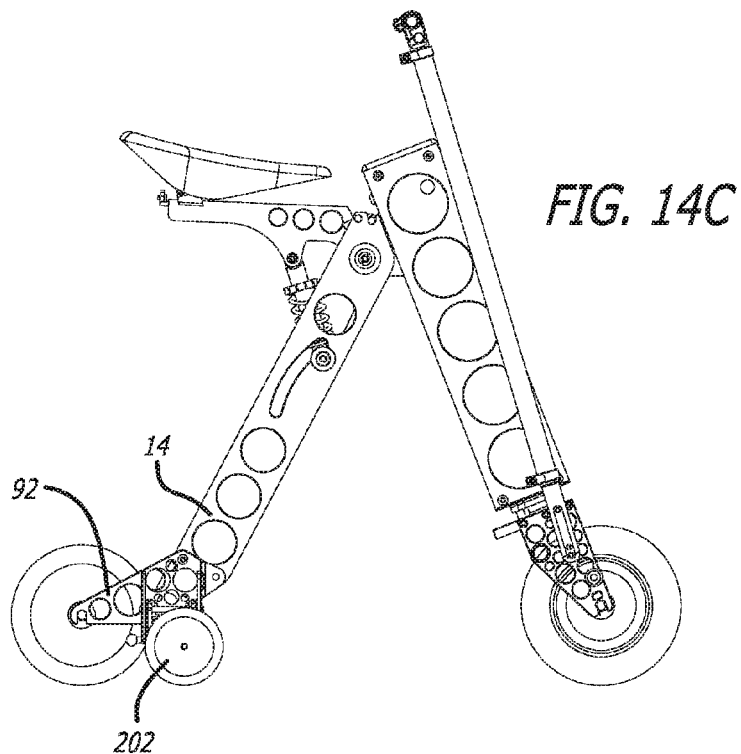
Figure 14D:
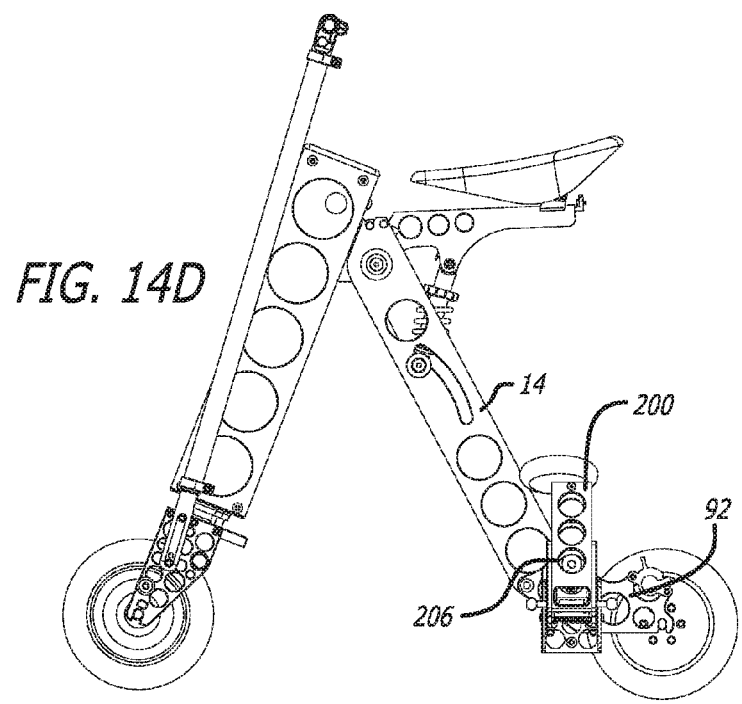

In embodiments, the disclosure is also directed to a charging station configured to electrically interconnect to the vehicle such that electrical power can be introduced to the power source via one or more electrical connectors disposed on a portion of the external structure of the vehicle. In some embodiments, the electrical connectors are disposed on the front structural structural member of the vehicle and the charging station is configured to engage the vehicle in a closed/compact configuration. In other embodiments, the charging station further includes vehicle securing assemblies for securely attaching and the locking the vehicle into a charging position where the electrical connectors on the charging station and vehicle are electrically interconnected. An exemplary charging station (150) for use with a foldable electric vehicle is also shown in FIGS. 13a and 13b, in many embodiments the charging station generally comprises a framework (152) having one or more charging contacts (154) that are configured to electrically interconnect with a foldable electric vehicle (156) to provide a power recharging source. Although one configuration of a charging station is shown in the figures, it will be understood that the location, number size and configuration of the charging contacts and vehicle interconnection may be altered to suit the specific design of the vehicle. In addition, although a single unit is described, in embodiments multiple charging stations can be provided and interconnected through a single central kiosk for controlling the stations, payments and control charging/availability.

Returning to the rear wheel-bearing structural member, as further shown in FIGS. 14a to 14f, in many embodiments, the rear wheel-bearing structural member (14) may comprise, at its lower end (92) one or more foldable wheel assemblies (200 & 202) that may be interconnected therewith on the outer lateral sides thereof. In some such embodiments, such an interconnection may comprise a hinged arm (206) such that the wheel assembly may pivot relative to the rear wheel-bearing structural member between at least extended (FIGS. 14a, 14c & 14e) and folded (FIGS. 14b, 14d & 14f) configurations, as will be described in greater detail below.

Although only two foldable wheels (200 and 202) are shown in FIGS. 14a to 14f, it should be understood that other embodiments may incorporate other number or configurations of foldable wheels. Foldable wheel assemblies in accordance to such embodiments may also be positioned anywhere along the length of the rear wheel-bearing structural member. In addition, the length that such foldable wheels extend outward laterally from the rear wheel-bearing structural member may vary and may be variable by incorporating suitable extendable hinged arms (206), such as, for example, arms that include telescoping structures. Finally, although the hinged arms (206) on which the foldable wheels are disposed in accordance with the embodiments provided in FIGS. 14a to 14f fold to a position directly against the rear wheel-bearing structural member, the hinged arms may be folded in to one or more angles relative to the rear wheel-bearing structural between a first angle at which the foldable wheel is disposed in contact against the ground (e.g., in some embodiments at a 90 degree angle to the outer wall of the rear wheel-bearing structural member) and a second angle at which the foldable wheel is not engaged in against the ground (e.g., in some embodiments at an angle that positions the hinged arm directly against the rear wheel-bearing structural member).

Figure 15A:
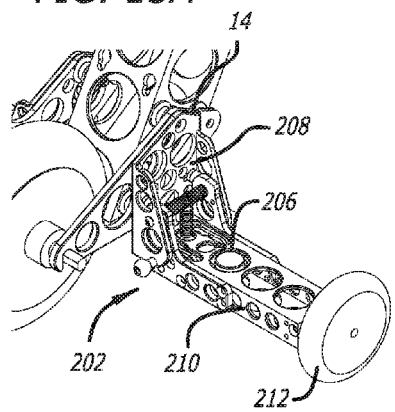
FIGS. 15a to 15f provide schematic views of the operation of the rear foldable wheels of FIGS. 14a to 14f in accordance with embodiments of the invention.
Figure 15B:
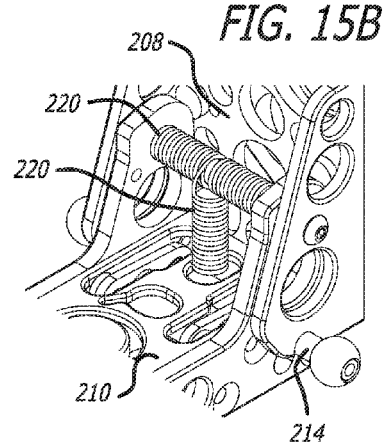
Figure 15C:
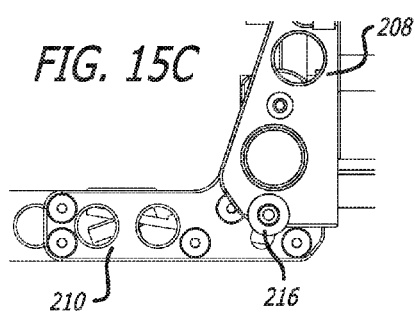
Figure 15D:
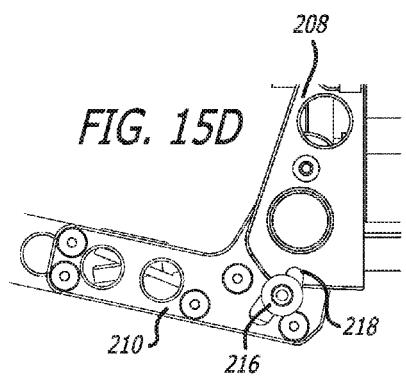
Figure 15E:
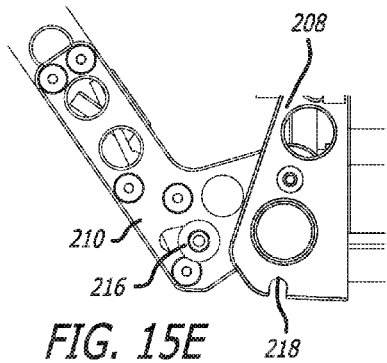
Figure 15F:
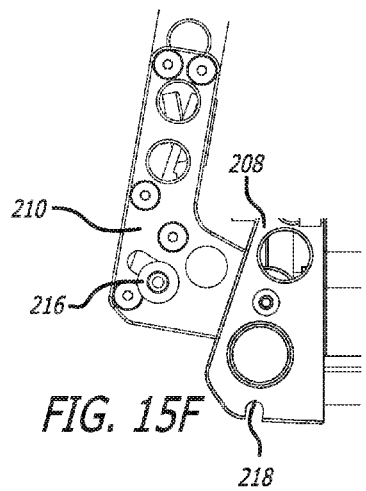

In many embodiments, as shown in FIGS. 15a to 15f, the foldable wheels (200 & 202) may each be comprised of a hinged arm (206) having an anchor portion (208) configured to be disposed proximal to the rear wheel-bearing structural member (14) and a wheel arm (210) pivotably interconnected with the anchor portion (208), extending laterally therefrom and having at least one wheel (212) disposed at the distal end thereof. In some embodiments, the anchor portion and wheel arm may by pivotably interconnected such that wheel arm rotates about an axis disposed within the anchor portion and oriented orthogonal to the longitudinal axis of the wheel arm, although other pivoting configurations may be contemplated such that the wheel of the wheel arm is movable into and out of a supporting position relative to the ground. Such a hinged arm (206) may also comprise a locking mechanism (214) configured disposed between the anchor portion (208) and the wheel arm (210) such that the locking mechanism cooperatively engages between the anchor portion and the wheel arm to prevent unintended movement of the wheel arm relative to the anchor portion when the wheel arm is extended laterally from the rear wheel-bearing structural member (14) such that the wheel is in supportive contact with the ground. In some embodiments, as shown in FIG. 15b, the locking mechanism (214) may comprise a movable pin (216) disposed on the wheel arm (210) configured to engage one or more cooperative locking grooves (218) on the anchor portion (208), front wheel-bearing structural member and cooperative locking portions on the seat-bearing structural member, as will be described in greater detail below.

The hinged arm (206) and/or locking mechanism (214) may incorporate one or more resilient members, as shown in FIGS. 15a and 15b. In many embodiments, the hinged arm (206) may incorporate a first resilient member (220) disposed between the anchor portion and the wheel arm and configured such that when said wheel arm (210) is pivoted into the folded position adjacent the rear wheel-bearing structural member (14) the resilient member is placed into tension such that a resilient force is applied to urge the wheel arm into position against the adjacent rear wheel-bearing structural member. In addition, in many embodiments the locking mechanism (214) may incorporate a second resilient member (222) interconnected with the movable pin (216) and to restrain the movable pin within the cooperative locking groove (218).

As described above, in many embodiments the foldable wheels (200 & 202) are mounted to the lower end (92) of the rear wheel-bearing structural member (14). As shown in FIGS. 14 and 15, these foldable wheels may comprise one or multiple wheels in accordance with embodiments of the vehicle. In many embodiments the foldable wheel incorporate a wheel bearing arm (210) that extends laterally outward from the rear wheel-bearing structural member a sufficient distance to serve as a standing platform for a user when disposed in an extended position where the foldable wheel is in a supportive position relative to the ground. Although not shown, in some embodiments the foldable wheels may include resilient members such as shock absorbing springs, to provide a shock dampening to the vehicle. In some such embodiments, the wheels of the rear wheel assembly may also be affixed to the rear wheel-bearing structural member in a configuration that would allow the wheels to move relative to the rear wheel-bearing structural member. In one such embodiment, the foldable wheels may be pivotally interconnected to the rear wheel-bearing structural member via a rear wheel pivot hinge such that the rider of the vehicle is capable of steering the vehicle by leaning in the desired direction of the turn.

As discussed briefly above, other accessories may be included with the foldable vehicle, including lights, charging connections, personal electronic docking connections, luggage racks, etc. Many embodiments, as shown in FIGS. 16a to 16c include a detachable anchor member (300) configured to provide one or more anchor points (302) (e.g., threaded holes, brackets, clasps, fixation devices, etc.) onto which one or more such accessories may be interconnected. The detachable anchor member (300) has an inward face (303) dimensioned and configured to be inserted into one or more fenestrations (304) that may be disposed within the outer walls (305) of the one or more structural members (306) and an outward face (308) dimensioned and configured to extend beyond the perimeter of the fenestration to engage the outer wall of the structural member when the inward face is inserted therein such that the anchor points (302) are disposed on an outward face (308) of the detachable anchor member such that they are accessible to the user.

Figure 17:
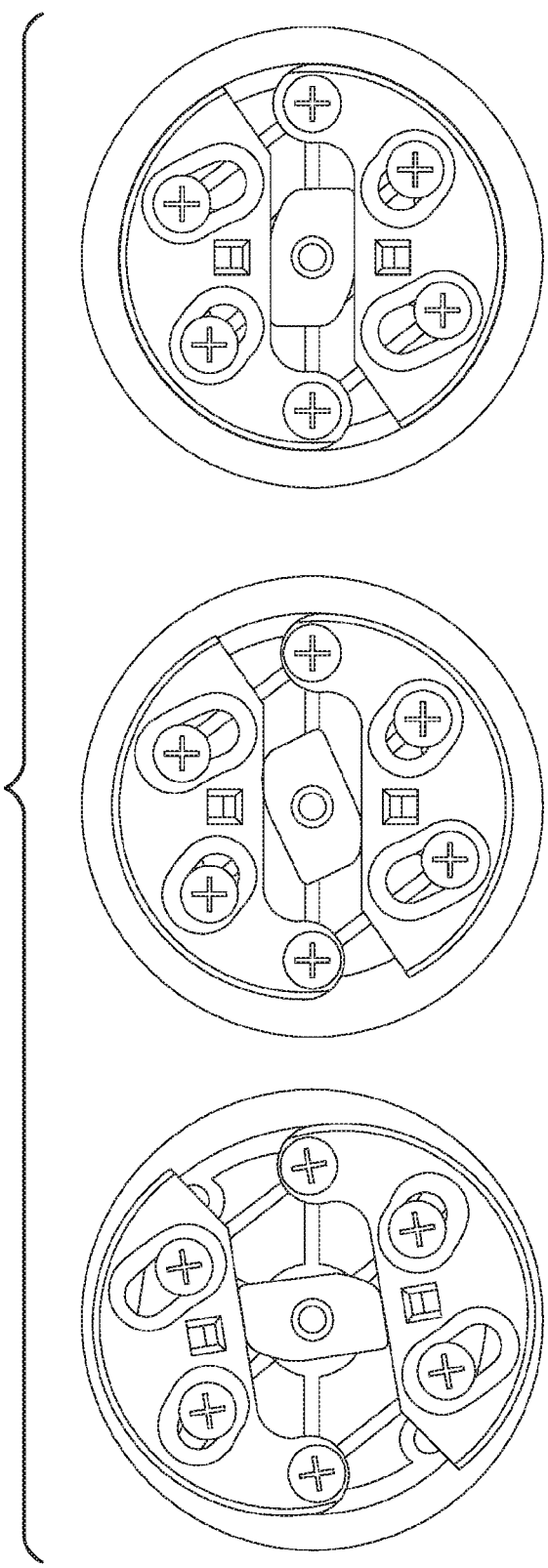
FIG. 17 provides schematic views of the detachable accessory anchor mechanism of FIGS. 16a to 16c in accordance with embodiments of the invention.
Figure 18B:
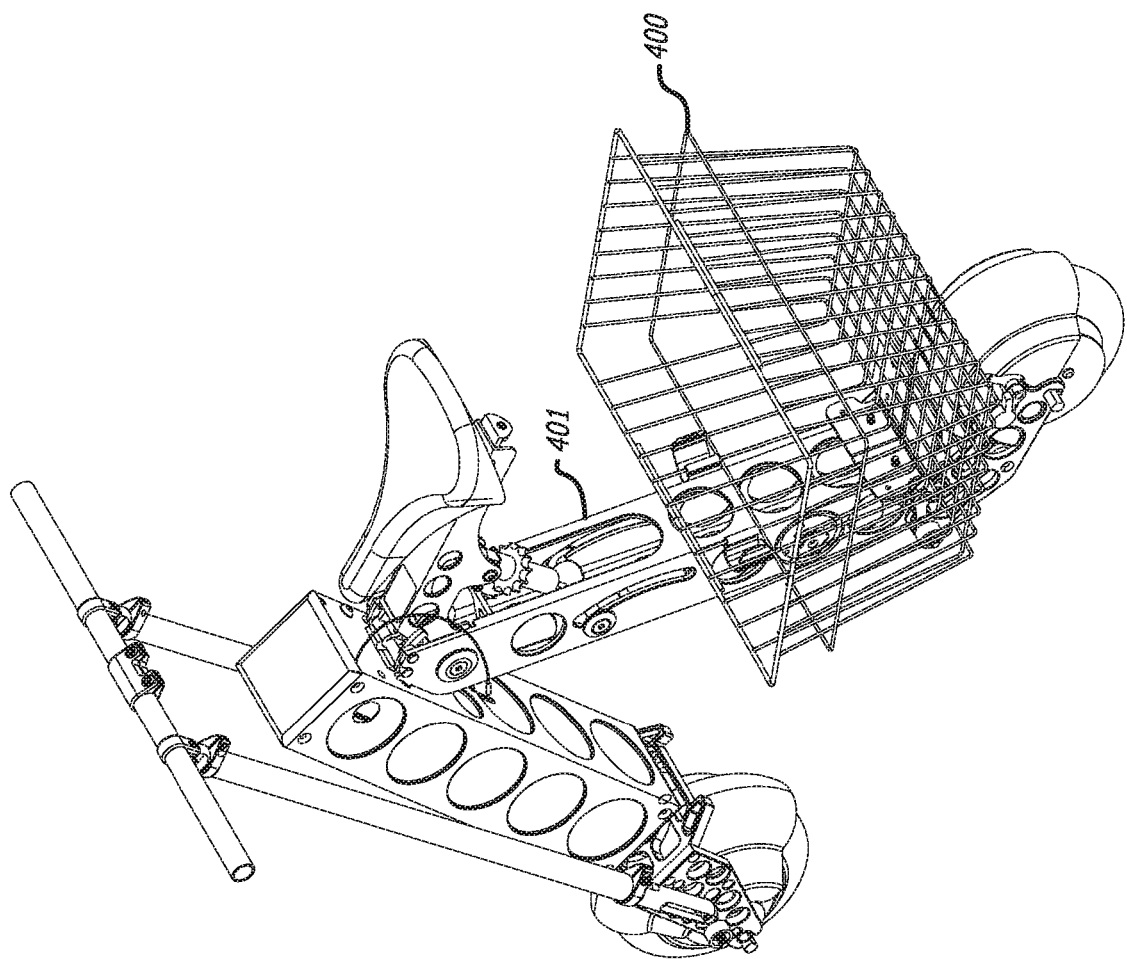

The detachable anchor member is further configured to cooperatively and lockingly engage within the fenestration. The locking engagement between the detachable anchor member and the structural member may be accomplish through any suitable mechanism. In many embodiments, as shown in FIGS. 16 and 17, the locking engagement may comprise an elongated locking cam (310) disposed on the inward face (303) and rotatably interconnected with a rotatable handle (312) disposed on the outward face (308) of the detachable anchor member (300) such that rotation of the rotatable handle results in a rotation of the locking cam. In some such embodiments, the locking cam (310) is disposed between at least two extendable locking arms (314) that are slidably related thereto such that a rotation of the locking cam into a first position urges the extendable locking arms radially outward from the center of the detachable anchor mechanism beyond the outer perimeter (315) of the inward face such that the extendable locking arms engage the walls of the structural member thereby locking the detachable anchor member within the fenestration. Although not shown, such the locking mechanism of the detachable anchor member may further comprise a resilient member (e.g., a return spring) interconnected between the at least two extendable locking arms such that an inward force is constantly applied to urge the at least two extendable locking arms together such that in the absence of the outward pressure of the locking cam the at least two extendable locking arms are urged toward each other into position within the outer perimeter of the inward face of the detachable member.

Figure 19:
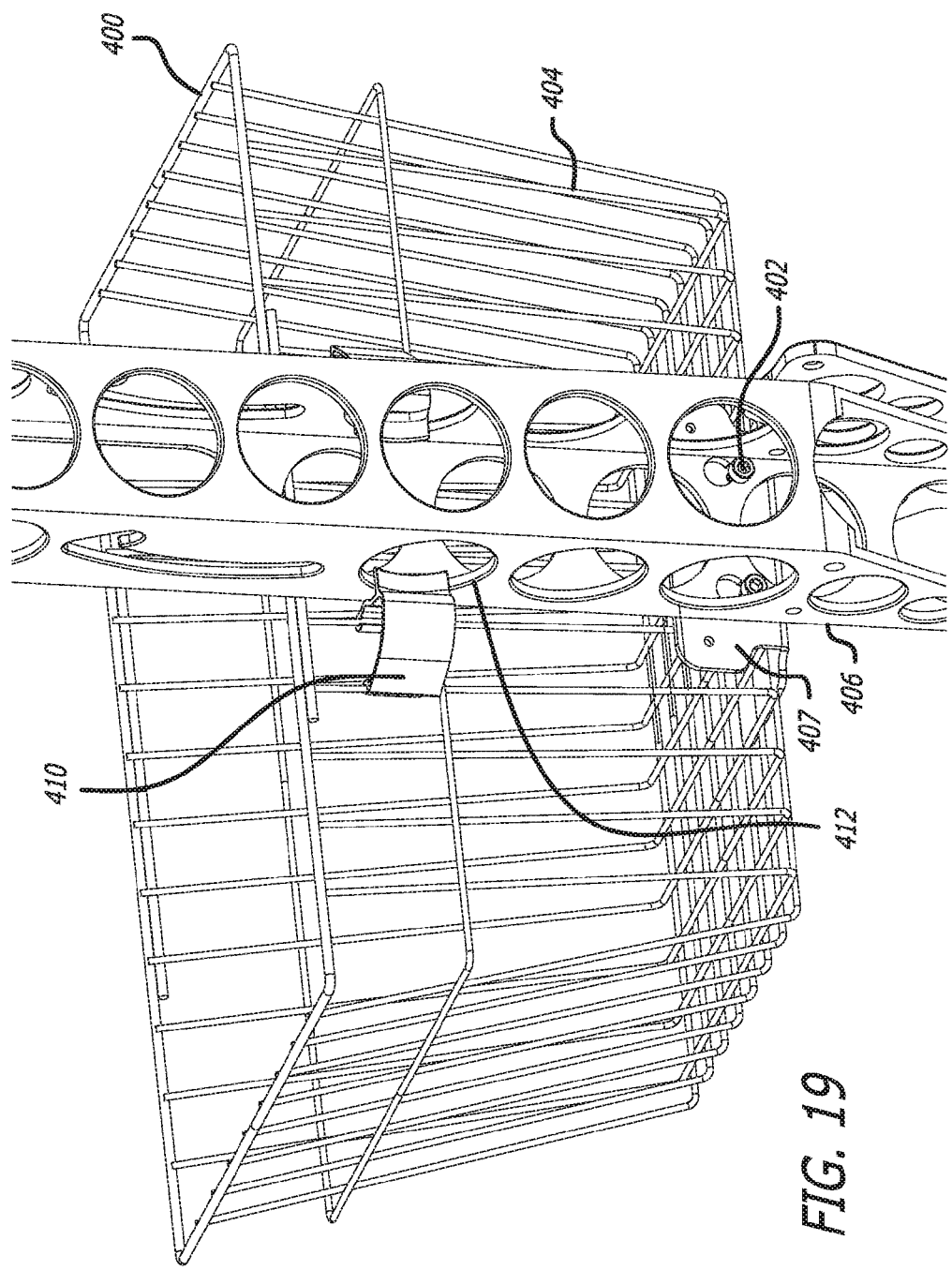
FIG. 19 provides a schematic view of an attachable accessory in accordance with embodiments of the invention.

In other embodiments an attachment could be provided that releasably engages with one support arm of the foldable electric vehicle and at least one fenestration of the support arm, as shown in FIGS. 18 to 21. In many embodiments, as shown in FIGS. 18a and 18b, the attachment may be a basket or other receptacle or attachable accessory (400) that may be releasably interconnected with one of the support arms (401) of the foldable electric vehicle. As shown in FIG. 19, in some embodiments the attachable accessory (400) includes at least one weight-bearing attachment point (e.g., screws, tabs, etc.) (402) disposed at or adjacent to a lower portion thereof on a side (404) of the attachable accessory disposed adjacent the support arm (406) of the foldable electric vehicle. The lower portion of the attachable accessory is herein defined as a portion of the attachable accessory at or below the mid-point of the accessory. In several embodiments a plurality of weight-bearing attachment points may be provided. Regardless of the number of weight-bearing attachment points provided, they are configured such that they, singularly or in combination, carry the primary load (e.g., weight) of the attachable accessory into the support arm of the frame of the foldable electric vehicle. In several other embodiments the weight-bearing elements may be incorporated with a supportive weight-bearing plate (407) interconnected with the weight-bearing attachment point or points (402) to transfer the load from the basket in the weight-bearing attachment point or points. In many embodiments, a secondary attachment clip (410) is also disposed along the same side (404) of the attachable accessory as the weight-bearing attachment point, but spaced apart and above the weight-bearing attachment point. In such embodiments, the secondary clip is configured to engage at least one portion of the attachable accessory and one of the fenestrations (412) on the support arm (406), such that the secondary clip (410) transfers secondary forces (e.g., upward and rotational) from the attachable accessory into the support arm of the foldable electric vehicle.

Figure 20A:
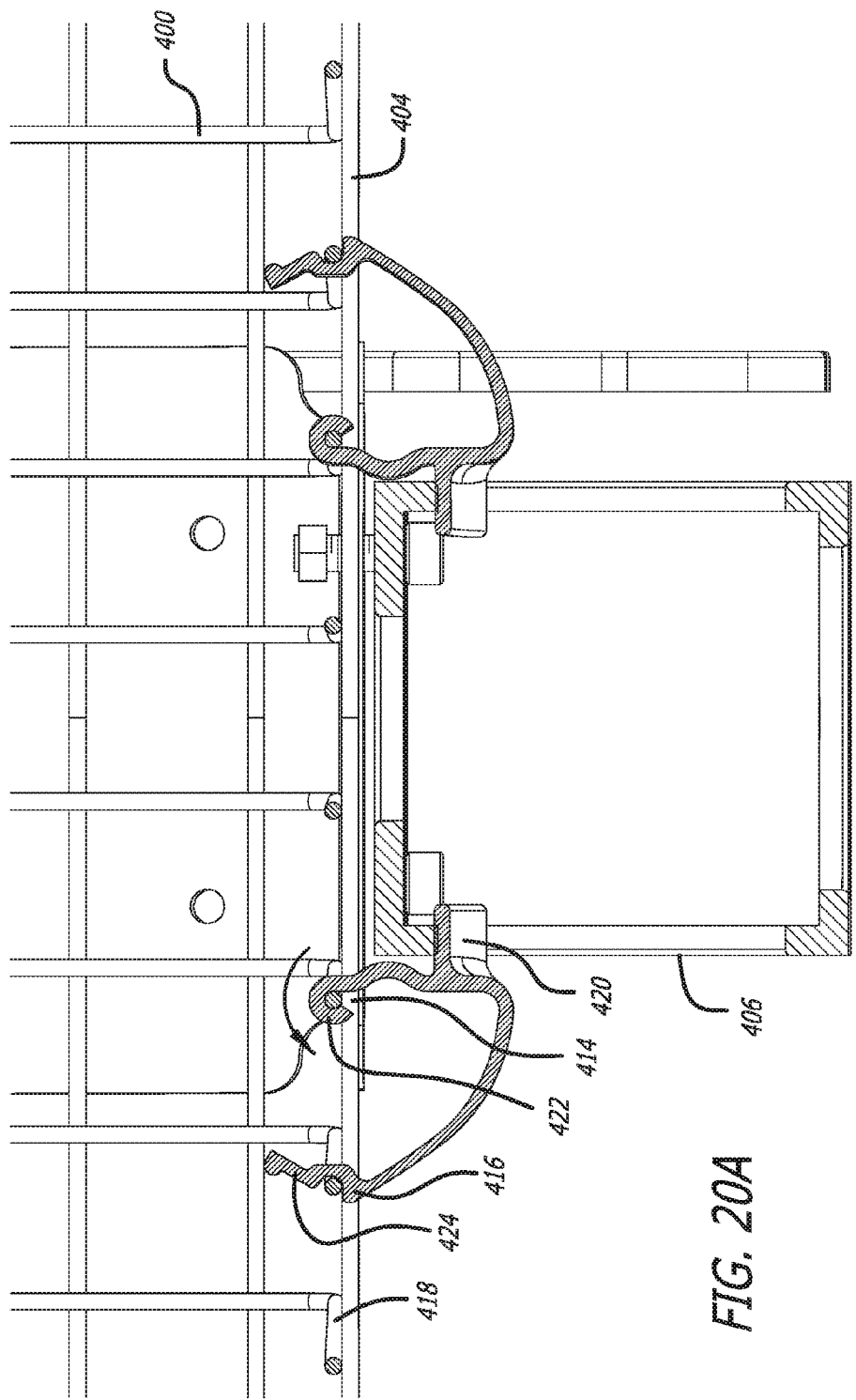
FIGS. 20a to 20c provide close-up schematic views of a secondary attachment clip in accordance with embodiments of the invention.

Turning now to the construction and operation of the secondary attachment clip, as shown in FIG. 20a, in many embodiments, the secondary attachment clip(s) (410) may comprise three interconnected arms, a set of attachment linkage arms (414 & 416) each configured to interconnect with elements (418) of the attachable accessory (400), such as, for example, the wires constituting the walls of a wire basket; and a second frame linkage arm (420) configured to interconnect with a fenestration (412) of the support arm (406) of the foldable electric vehicle. In some embodiments the attachment linkage arms (414 & 416) are disposed roughly parallel to each other and spaced apart at a distance such that the arms may interconnect with the elements (418) of the attachable accessory (400). In some embodiments the attachment linkage arms comprise a first attachment linkage arm (414) comprising a first attachment clip (422) configured to rotatably interconnect with one of the elements (418) of the attachable accessory, and a second attachment linkage arm (416) that is deformable relative to the first attachment linkage arm and having a second attachment clip (424) configured to interconnect with a second element (418) of the attachable accessory and apply a force there against such that the second attachment clip is releasably secured to the element of the attachable accessory. In some embodiments the interconnected attachment linkage arms form a roughly "C" or "U" shape having the frame linkage arm (420) attached proximal to the first attachment linkage arm. In still other embodiments the frame linkage arm (42) has a contoured face configured to cooperatively engage the wall of the fenestration (412) of the support arm (406) of the foldable electric vehicle.

Figure 20B:
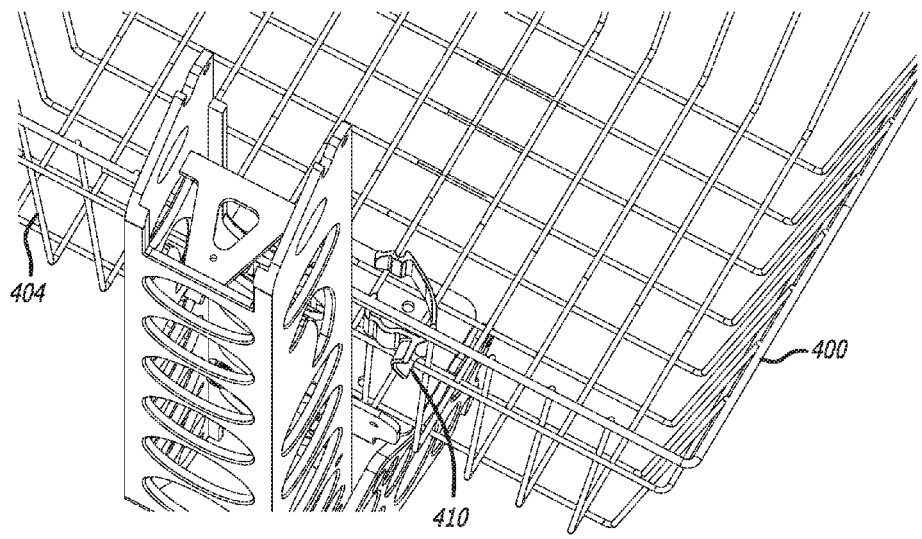
Figure 20C:
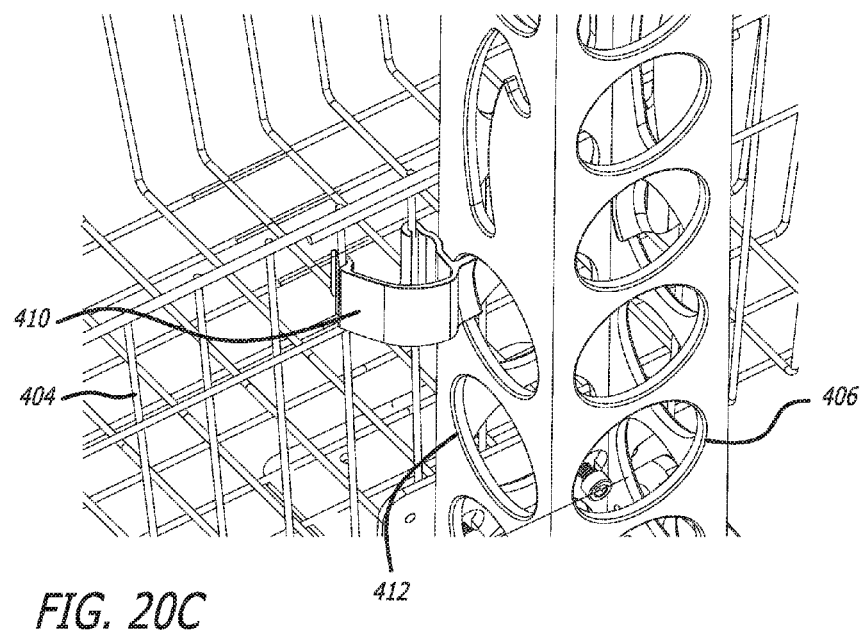

During operation, as shown in FIGS. 20b and 20c, the secondary attachment clip (410) is rotated about one element (418) of the attachable accessory (400) via the first attachment linkage arm (414) such that the second attachment linkage arm (416) engages a second element (418) of the attachable accessory (400) and the frame linkage arm (420) engages the wall of one fenestration (412) of the support arm (406).

Figure 21:
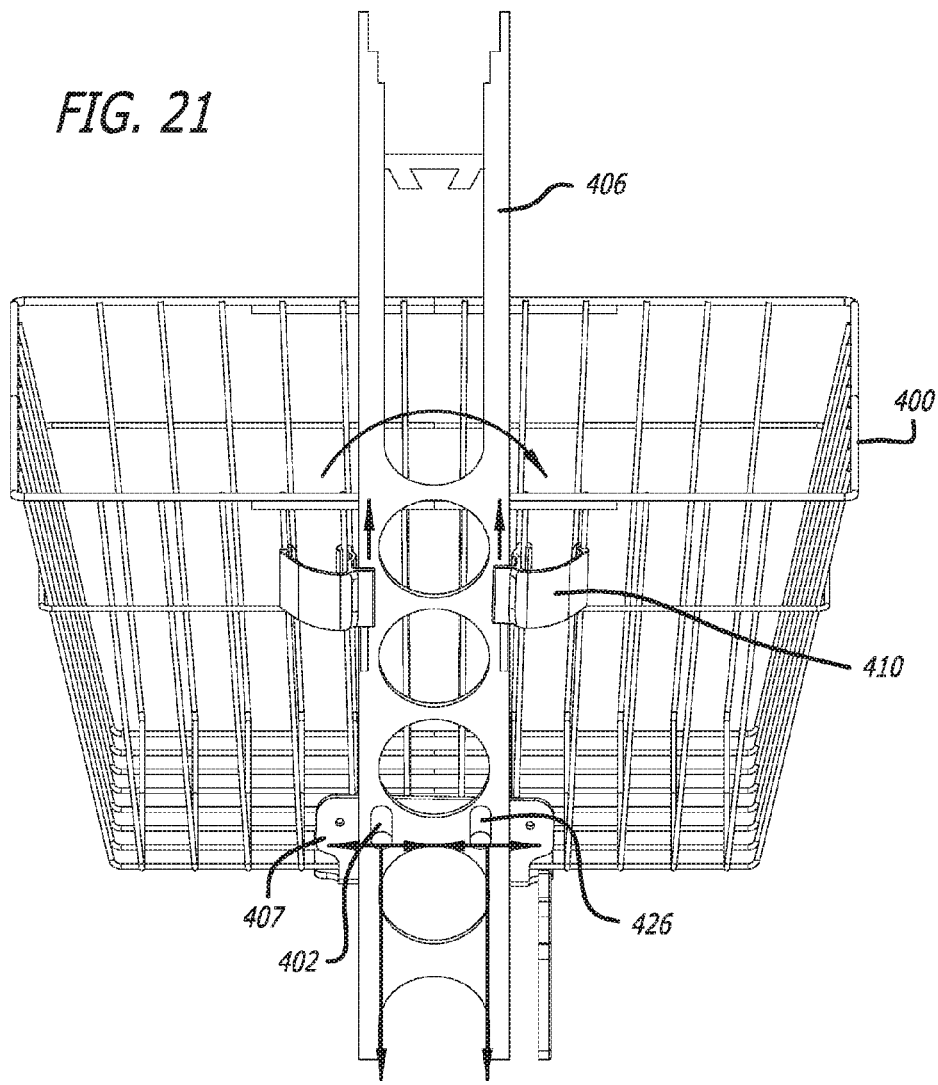
FIG. 21 provides a schematic view of the operation of an attachable accessory in accordance with embodiments of the invention.
Figure 22:
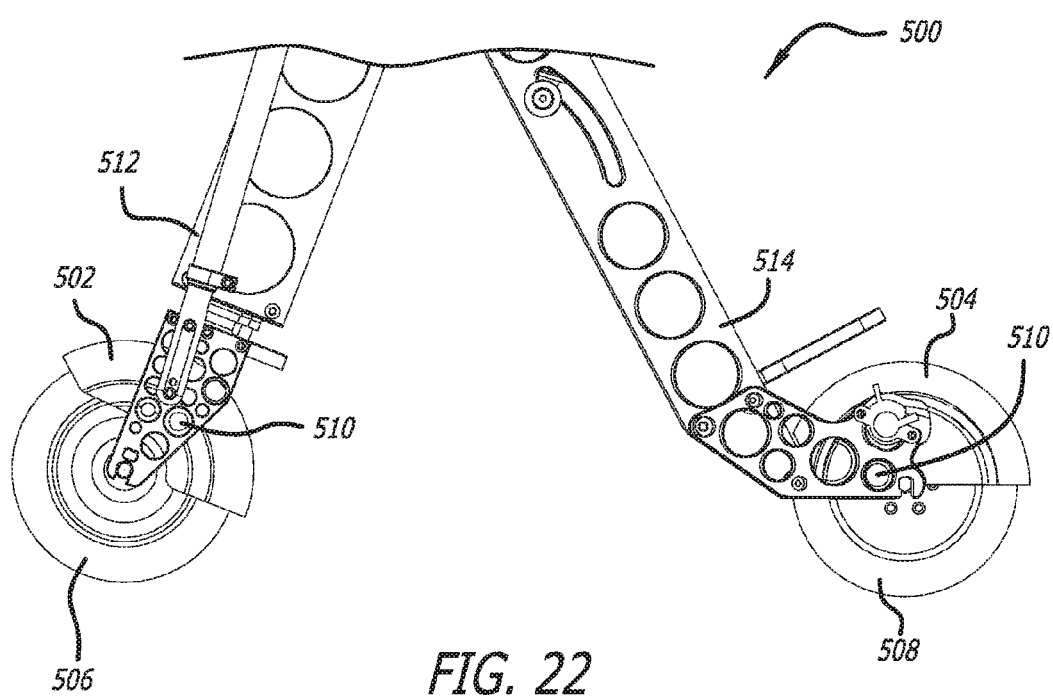
FIG. 22 provides a side view of an electric vehicle having detachable fenders in accordance with embodiments of the invention.
Figure 23:
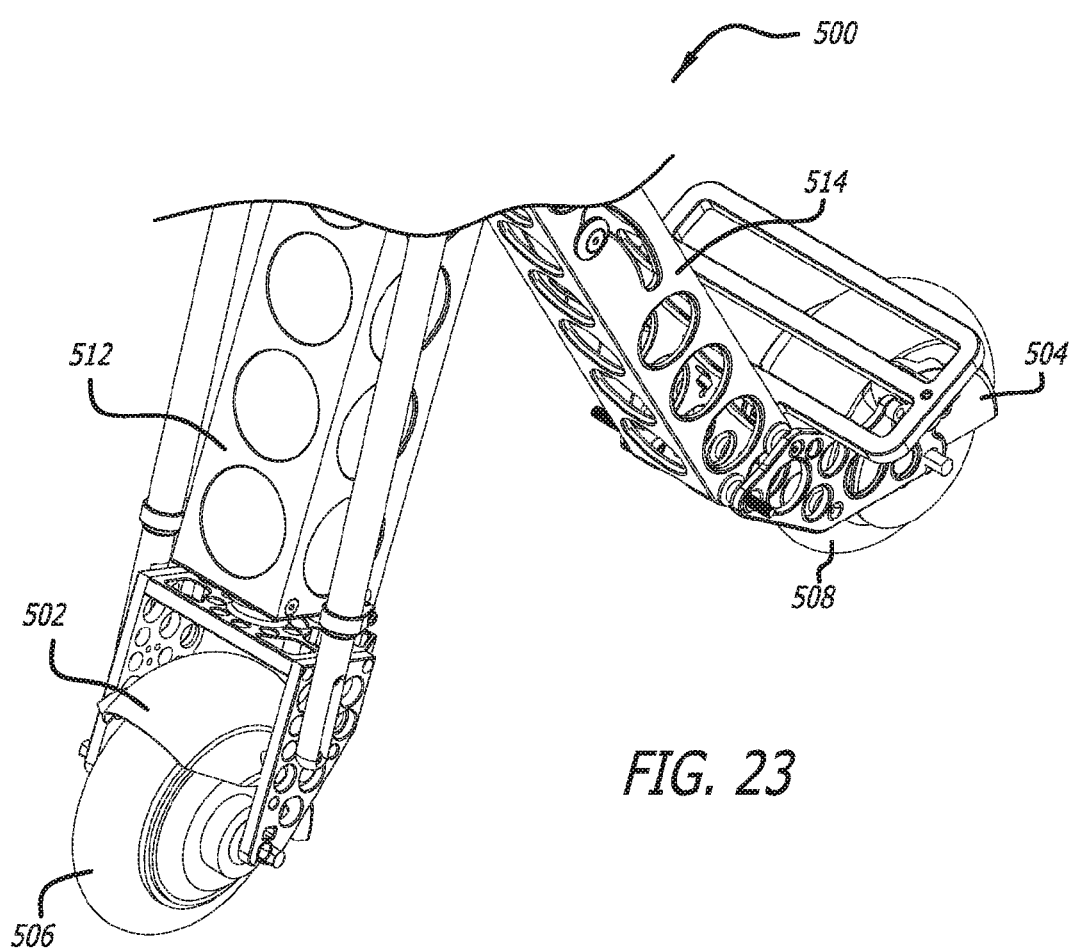
FIG. 23 provides a perspective view of an electric vehicle having detachable fenders in accordance with embodiments of the invention.

The overall operation of the attachable accessory (400) is shown in FIG. 21. In many embodiments the attachable accessory (400) is attached to the support arm (406) by inserting the weight-bearing attachment point/points (402) disposed on a weight-bearing plate (407) at the lower portion of the attachable accessory (e.g., plate), into cooperative attachment holes (426) on the support arm (406). In many embodiments the cooperative attachment holes (426) are formed as keyholes having a large upper opening that tapers to a smaller lower opening such that the attachment point/points (402) may be inserted through the large upper opening and then slid down into the smaller lower opening to engage and secure the attachment point/points therein. These attachment point/points (402) and the cooperative attachment holes (e.g., keyholes) (426) are configured to carry the primary load (weight) of the attachable accessory (e.g., basket) and the items that are loaded into it. With the weight-bearing attachments of the attachable accessory in place, the secondary attachment clips (410) at the top of the attachable accessory are swiveled around the elements of the attachable accessory (e.g., the wires of a basket) until the attachment linkage arms of the secondary attachment clip engages within an opening of the attachable accessory, and the frame linkage arm of the secondary attachment clip engages within a fenestration (412) of the support arm (406), thereby securing the secondary attachment clip in place. The secondary attachment clip, once secured in place, transfers the secondary forces, in upward and rotational direction, into the frame, thus securely attaching the basket thereto.

In still other embodiments detachable fender elements could be provided that releasably engage with at least one of the fenestrations on the front and/or rear support arms of the foldable electric vehicle, as shown in FIGS. 22 to 25. As shown schematically in FIGS. 22 and 23, in many embodiments the electric vehicle (500) may comprise a front (502) and rear (504) fender. In embodiments the fenders may be comprised of a single or multiple interconnected sections that form a fender element contoured to at least partially enclose the upper portion of one of either the front (506) or rear (508) wheels of the electric vehicle. In many embodiments each of the fenders have one or more attachment linkages (510) configured to engage one or more portions of the support arms (512 & 514) of the electric vehicle.

Figure 24:
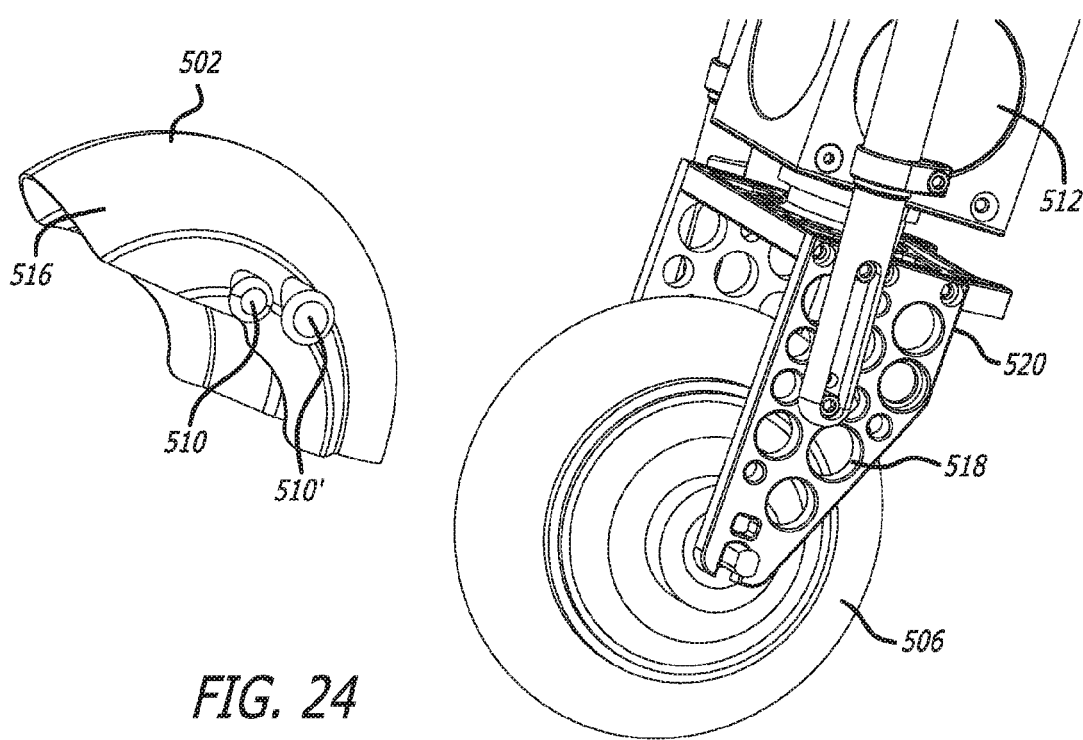
FIG. 24 provides a perspective view of a front fender detached from an electric vehicle in accordance with embodiments of the invention.

Turning now to the construction of the front fender, as shown in FIG. 24, in many embodiments the front fender (502) comprises a body (516) countoured to at least partially enclose the upper portion of the front wheel (506). The body includes at least one attachment linkage (510) configured to engage at least one fenestration (518) on the front support arm (512). In many embodiments the front fender comprises at least two attachment linkages (510 & 510') configured to engage at least two fenestrations on the front support arm (512) of the electric vehicle. In some embodiments, to engage the front fender into the front support arm at least the portion of the fender body (516) to which the at least one attachment linkage (510) is formed is resilient such that the attachment linkage/linkages (510 & 510') may be elastically deformed to fit between the fork arms (520) of the front support arm (512) and then resiliently expanded to securely attach within the at least one fenestration (518). In embodiments the fender (502) may be formed of a single unitary portion or two separate portions that may be engaged together to form a single portion. Although certain arrangements of attachment linkages (510) and fenestrations (518) are described in the embodiments shown in FIG. 24, it should be understood that any number of attachment linkages and fenestrations in any combination and arrangement may be utilized such that the position of the front fender (502) relative to the front support arm (512) and front wheel (506) are maintained in a stable position during use.

Figure 25:
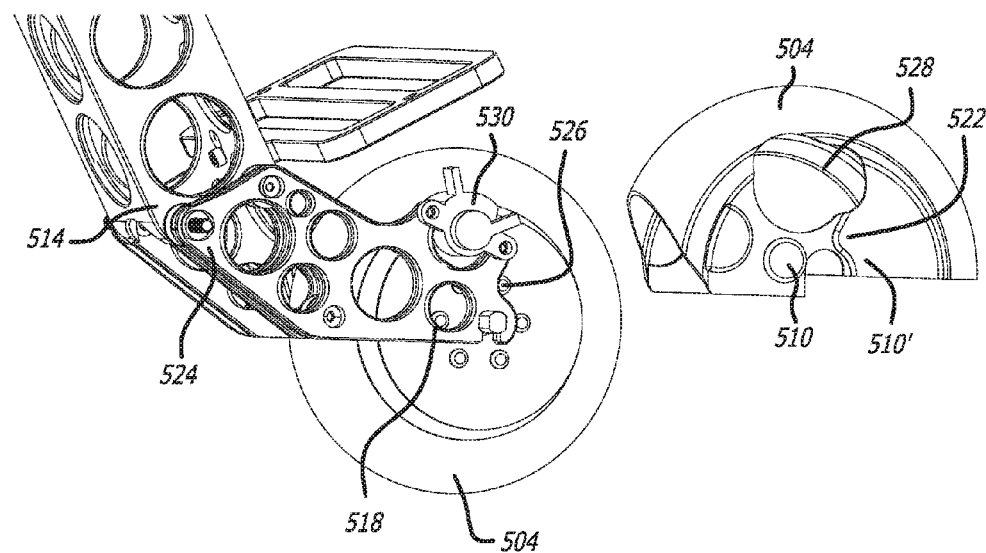
FIG. 25 provides a perspective view of a rear fender detached from an electric vehicle in accordance with embodiments of the invention.

Turning now to the construction of the rear fender, as shown in FIG. 25, in many embodiments the rear fender (504) comprises a body (522) countoured to at least partially enclose the upper portion of the front wheel (508). The body includes at least one attachment linkage (510) configured to engage at least one fenestration (518) on the rear support arm (514). In many embodiments the rear fender comprises at least two attachment linkages (510 & 510') configured to engage at least one fenestration and one other portion (511) (e.g., the rear wall of the rear support arm) on the rear support arm (514) of the electric vehicle. In some embodiments, to engage the rear fender into the rear support arm at least the portion of the fender body (522) to which the at least one attachment linkage (510) is formed is resilient such that the attachment linkage/linkages (510 & 510') may be elastically deformed to fit between the fork arms (524) of the rear support arm (514) and then resiliently expanded to securely attach with the at least one fenestration (518) and portion (526) of the rear support arm (514). In embodiments the fender (504) may be formed of a single unitary portion or two separate portions that may be engaged together to form a single portion. In some embodiments a cut-out (528) may be provided through which portions (530) of the electric vehicle (e.g., rear wheel, wheel mount, rear support arm, etc.) may extend when the rear fender is attached to the electric vehicle. Although certain arrangements of attachment linkages (510), fenestrations (518), and cut-outs (528) are described in the embodiments shown in FIG. 25, it should be understood that any number of attachment linkages and fenestrations (or support arm portions) in any combination and arrangement may be utilized such that the position of the rear fender (504) relative to the rear support arm (514) and rear wheel (508) are maintained in a stable position during use.

DOCTRINE OF EQUIVALENTS

As can be inferred from the above discussion, the above-mentioned concepts can be implemented in a variety of arrangements in accordance with embodiments of the invention. For example, though the foldable vehicle has been described in relation to an electric vehicle, it will be understood that the construction and folding mechanism described could be adapted for use with other propulsion types, including, for example, a gasoline powered internal combustion engine. Likewise, although the vehicle has been described in relation to two wheel-bearing structural members, it will be understood that any number of structural members could be used along with the proposed vehicle folding mechanism.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A vehicle comprising:
    two wheel-bearing structural members, a front wheel-bearing element having a front wheel assembly with at least one wheel, and a rear wheel-bearing element having a rear wheel assembly with at least one wheel; and
    wherein at least one of the structural members further comprises one or more fenestrations disposed in the walls thereof; and
    an attachable accessory having at least one weight-bearing attachment point disposed on a lower portion thereof and being cooperatively attachable to a wheel-bearing structural member, the at least one weight-bearing attachment point configured to carry the downward load from the attachable accessory; and
    at least one secondary attachment clip rotatably interconnected with an upper portion of the attachable accessory, the at least one secondary attachment clip having a first linkage releasably interconnecting the secondary attachment clip to the attachable accessory and a second linkage interconnecting the secondary attachment clip within at least one of the fenestrations.

2. The vehicle of claim 1, further comprising at least one anchor member disposed within at least one of the fenestrations such that at least an outer face thereof is accessible from the outside of the vehicle, said anchor member being detachably interconnected within the fenestration and having at least one accessory anchor disposed on the outer face thereof.

3. The vehicle of claim 2, wherein the at least one anchor member comprises a cam mechanism such that rotation of an element on the outer face of the anchor member extends one or more locking elements to engage the inner walls of the fenestration.

4. The vehicle of claim 1, wherein the attachable accessory is a wire basket, and wherein the attachment point and attachment clip are disposed between individual wire elements of the wire basket.

5. The vehicle of claim 1, further comprising at least one fender disposed to partially enclose at least an upper portion of one of either the front or rear wheels, the at least one fender comprising at least one attachment linkage configured to engage at least one fenestration in one of either the front or rear support arms such that the at least one fender is stably disposed in relation to at least the support arm and wheel to which the at least one fender is related.

6. The vehicle of claim 5, wherein the at least one fender is resiliently deformable.

7. The vehicle of claim 1, wherein the at least two wheel-bearing structural members have first and second ends and define wheel-bearing structural member longitudinal axes, each of said wheel-bearing structural members having a wheel-bearing structural member pivot hinge bracket disposed along the length thereof;
    at least one seat-bearing structural member having first and second ends and defining a seat-bearing structural member longitudinal axis, the seat-bearing structural member having a seating platform interconnected to the second end thereof and a seat-bearing pivot hinge bracket disposed along the length thereof; and
    wherein the at least two wheel-bearing structural member pivot hinge brackets and the seat-bearing pivot hinge bracket are configured to cooperatively interconnect to form a vehicle pivot hinge such that the structural members are pivotably interconnected about a single vehicle pivot point to move between at least two configurations:
    a first riding configuration wherein the longitudinal axes of the two wheel-bearing structural members and the seat-bearing structural members have angular offsets relative to each other, and
    a second folded configuration wherein the longitudinal axes of the two wheel-bearing structural members and the seat-bearing structural member are roughly parallel.

8. The vehicle of claim 1, wherein at least one of the wheels is driven by an electric motor.

* * * * *